(12) United States Patent
Kaltegaertner et al.

(10) Patent No.: US 12,443,336 B2
(45) Date of Patent: Oct. 14, 2025

(54) INTERACTIVE USER INTERFACE FOR DYNAMICALLY UPDATING DATA AND DATA ANALYSIS AND QUERY PROCESSING

(71) Applicant: Palantir Technologies Inc., Palo Alto, CA (US)

(72) Inventors: Helen Kaltegaertner, New York, NY (US); Alexandru Antihi, Palo Alto, CA (US); Adam Borochoff, New York, NY (US); Benjamin Duffield, New York, NY (US); Brandon Krieger, New York, NY (US); Caitlin Colgrove, Palo Alto, CA (US); Diran Li, New York, NY (US); Gabrielle Javitt, New York, NY (US); Gregory O'Connor, San Francisco, CA (US); Mark Schafer, New York, NY (US); Mark Elliot, New York, NY (US); Maria Franco, Abu Dhabi (AE); Matthew Lynch, Brooklyn, NY (US); Matthew Sills, San Francisco, CA (US); Nir Ackner, Palo Alto, CA (US); Punyashloka Biswal, Norwalk, CT (US); Phillip Chen, New York, NY (US); Sander Kromwijk, New York, NY (US); Shannon Scott, New York, NY (US); Samuel Szuflita, New York, NY (US); Stephanie Yu, New York, NY (US); Walker Burgin, Seattle, WA (US)

(73) Assignee: Palantir Technologies Inc., Denver, CO (US)

(*) Notice: Subject to any disclaimer, the term of this patent is extended or adjusted under 35 U.S.C. 154(b) by 0 days.

(21) Appl. No.: 15/784,004

(22) Filed: Oct. 13, 2017

(65) Prior Publication Data

US 2018/0039399 A1    Feb. 8, 2018

Related U.S. Application Data

(63) Continuation-in-part of application No. 15/092,964, filed on Apr. 7, 2016, now Pat. No. 10,157,200, (Continued)

(51) Int. Cl.
*G06F 3/04842* (2022.01)
*G06F 3/04817* (2022.01)
(Continued)

(52) U.S. Cl.
CPC ...... *G06F 3/04847* (2013.01); *G06F 3/04817* (2013.01); *G06F 3/0482* (2013.01);
(Continued)

(58) Field of Classification Search
CPC ...... G06F 14/248; G06F 16/248; G06F 17/30; G06F 3/0481; G06F 16/9027;
(Continued)

(56) References Cited

U.S. PATENT DOCUMENTS

| | | |
|---|---|---|
| 5,109,399 A | 4/1992 | Thompson |
| 5,329,108 A | 7/1994 | Lamoure |

(Continued)

FOREIGN PATENT DOCUMENTS

| | | |
|---|---|---|
| CN | 102546446 | 7/2012 |
| CN | 103167093 | 6/2013 |

(Continued)

OTHER PUBLICATIONS

"A First Look: Predicting Market Demand for Food Retail using a Huff Analysis," TRF Policy Solutions, Jul. 2012, pp. 30.
(Continued)

*Primary Examiner* — Cesar B Paula
*Assistant Examiner* — David Tan
(74) *Attorney, Agent, or Firm* — Knobbe, Martens, Olson & Bear, LLP

(57) ABSTRACT

The systems and methods described herein provide highly dynamic and interactive data analysis user interfaces which enable data analysts to quickly and efficiently explore large volume data sources. The data analysis system enables the user to investigate large volumes of data over many different paths of analysis while maintaining detailed and retraceable steps taken by the user over the course of an investigation, as captured via the user's queries and user interaction with the user interfaces provided by the data analysis system. Data analysis paths may involve exploration of high volume data sets, such as Internet proxy data, which may include trillions of rows of data. The data analyst may pursue a data analysis path that involves, among other things, applying filters, joining to other tables in a database, viewing interactive data visualizations, and so on. The data analysis system enables a user to refresh or insert a node in a workflow. The data analysis system further provides data editing, reporting, enrichment, expression language, and charting functionality.

18 Claims, 26 Drawing Sheets

Related U.S. Application Data which is a continuation of application No. 14/858,647, filed on Sep. 18, 2015, now Pat. No. 9,335,911.

(60) Provisional application No. 62/436,906, filed on Dec. 20, 2016, provisional application No. 62/097,327, filed on Dec. 29, 2014.

(51) Int. Cl.
  *G06F 3/0482* (2013.01)
  *G06F 3/04847* (2022.01)
  *G06F 16/248* (2019.01)
  *G06F 16/26* (2019.01)

(52) U.S. Cl.
  CPC ........ *G06F 3/04842* (2013.01); *G06F 16/248* (2019.01); *G06F 16/26* (2019.01)

(58) Field of Classification Search
  CPC .... G06F 16/26; G06F 3/04817; G06F 3/0482; G06F 3/04842; G06F 16/9024
  See application file for complete search history.

(56) References Cited

U.S. PATENT DOCUMENTS

| | | | |
|---|---|---|---|
| 5,414,809 A * | 5/1995 | Hogan | G06F 3/0481 |
| | | | 345/440 |
| 5,515,488 A | 5/1996 | Hoppe et al. | |
| 5,632,009 A | 5/1997 | Rao et al. | |
| 5,670,987 A | 9/1997 | Doi et al. | |
| 5,724,033 A * | 3/1998 | Burrows | H03M 7/30 |
| | | | 341/76 |
| 5,745,894 A * | 4/1998 | Burrows | G06F 16/38 |
| 5,781,704 A | 7/1998 | Rossmo | |
| 5,798,769 A | 8/1998 | Chiu et al. | |
| 5,845,300 A | 12/1998 | Comer | |
| 5,870,559 A | 2/1999 | Leshem et al. | |
| 6,057,757 A | 5/2000 | Arrowsmith et al. | |
| 6,088,032 A | 7/2000 | Mackinlay | |
| 6,091,956 A | 7/2000 | Hollenberg | |
| 6,144,962 A | 11/2000 | Weinberg et al. | |
| 6,161,098 A | 12/2000 | Wallman | |
| 6,178,382 B1 * | 1/2001 | Roederer | G01N 33/50 |
| | | | 435/69.3 |
| 6,219,053 B1 | 4/2001 | Tachibana et al. | |
| 6,232,971 B1 | 5/2001 | Haynes | |
| 6,247,019 B1 | 6/2001 | Davies | |
| 6,279,018 B1 | 8/2001 | Kudrolli et al. | |
| 6,341,310 B1 | 1/2002 | Leshem et al. | |
| 6,366,933 B1 | 4/2002 | Ball et al. | |
| 6,369,835 B1 | 4/2002 | Lin | |
| 6,430,305 B1 | 8/2002 | Decker | |
| 6,456,997 B1 | 9/2002 | Shukla | |
| 6,549,944 B1 | 4/2003 | Weinberg et al. | |
| 6,560,620 B1 | 5/2003 | Ching | |
| 6,581,068 B1 | 6/2003 | Bensoussan et al. | |
| 6,594,672 B1 | 7/2003 | Lampson et al. | |
| 6,631,496 B1 | 10/2003 | Li et al. | |
| 6,642,945 B1 | 11/2003 | Sharpe | |
| 6,674,434 B1 | 1/2004 | Chojnacki et al. | |
| 6,714,936 B1 | 3/2004 | Nevin, III | |
| 6,775,675 B1 | 8/2004 | Nwabueze et al. | |
| 6,820,135 B1 | 11/2004 | Dingman | |
| 6,828,920 B2 | 12/2004 | Owen et al. | |
| 6,839,745 B1 | 1/2005 | Dingari et al. | |
| 6,877,137 B1 | 4/2005 | Rivette et al. | |
| 6,900,807 B1 | 5/2005 | Liongosari et al. | |
| 6,976,210 B1 | 12/2005 | Silva et al. | |
| 6,978,419 B1 | 12/2005 | Kantrowitz | |
| 6,980,984 B1 | 12/2005 | Huffman et al. | |
| 6,985,950 B1 | 1/2006 | Hanson et al. | |
| 7,020,847 B1 | 3/2006 | Holzheuer | |
| 7,036,085 B2 | 4/2006 | Barros | |
| 7,043,702 B2 | 5/2006 | Chi et al. | |
| 7,055,110 B2 | 5/2006 | Kupka et al. | |
| 7,139,800 B2 | 11/2006 | Bellotti et al. | |
| 7,158,878 B2 | 1/2007 | Rasmussen et al. | |
| 7,162,475 B2 | 1/2007 | Ackerman | |
| 7,168,039 B2 | 1/2007 | Bertram | |
| 7,171,427 B2 | 1/2007 | Witowski et al. | |
| 7,269,786 B1 | 9/2007 | Malloy et al. | |
| 7,278,105 B1 | 10/2007 | Kitts | |
| 7,290,698 B2 | 11/2007 | Poslinski et al. | |
| 7,333,998 B2 | 2/2008 | Heckerman et al. | |
| 7,370,047 B2 | 5/2008 | Gorman | |
| 7,379,811 B2 | 5/2008 | Rasmussen et al. | |
| 7,379,903 B2 | 5/2008 | Caballero et al. | |
| 7,426,654 B2 | 9/2008 | Adams et al. | |
| 7,454,466 B2 | 11/2008 | Bellotti et al. | |
| 7,461,077 B1 | 12/2008 | Greenwood | |
| 7,467,375 B2 | 12/2008 | Tondreau et al. | |
| 7,487,139 B2 | 2/2009 | Fraleigh et al. | |
| 7,502,786 B2 | 3/2009 | Liu et al. | |
| 7,525,422 B2 | 4/2009 | Bishop et al. | |
| 7,529,727 B2 | 5/2009 | Arning et al. | |
| 7,529,734 B2 | 5/2009 | Dirisala | |
| 7,558,677 B2 | 7/2009 | Jones | |
| 7,574,409 B2 | 8/2009 | Patinkin | |
| 7,574,428 B2 | 8/2009 | Leiserowitz et al. | |
| 7,579,965 B2 | 8/2009 | Bucholz | |
| 7,596,285 B2 | 9/2009 | Brown et al. | |
| 7,614,006 B2 | 11/2009 | Molander | |
| 7,617,185 B2 | 11/2009 | Werner et al. | |
| 7,617,232 B2 | 11/2009 | Gabbert et al. | |
| 7,620,628 B2 | 11/2009 | Kapur et al. | |
| 7,624,122 B2 | 11/2009 | Gaurav et al. | |
| 7,627,812 B2 | 12/2009 | Chamberlain et al. | |
| 7,634,717 B2 | 12/2009 | Chamberlain et al. | |
| 7,703,021 B1 | 4/2010 | Flam | |
| 7,706,817 B2 | 4/2010 | Bamrah et al. | |
| 7,712,049 B2 | 5/2010 | Williams et al. | |
| 7,716,077 B1 | 5/2010 | Mikurak | |
| 7,725,530 B2 | 5/2010 | Sah et al. | |
| 7,725,547 B2 | 5/2010 | Albertson et al. | |
| 7,730,082 B2 | 6/2010 | Sah et al. | |
| 7,730,109 B2 | 6/2010 | Rohrs et al. | |
| 7,756,843 B1 | 7/2010 | Palmer | |
| 7,770,100 B2 | 8/2010 | Chamberlain et al. | |
| 7,788,064 B1 | 8/2010 | Hao et al. | |
| 7,805,457 B1 | 9/2010 | Viola et al. | |
| 7,809,703 B2 | 10/2010 | Balabhadrapatruni et al. | |
| 7,818,291 B2 | 10/2010 | Ferguson et al. | |
| 7,818,658 B2 | 10/2010 | Chen | |

(56) References Cited

U.S. PATENT DOCUMENTS

| | | |
|---|---|---|
| 7,870,493 B2 | 1/2011 | Pall et al. |
| 7,894,984 B2 | 2/2011 | Rasmussen et al. |
| 7,899,611 B2 | 3/2011 | Downs et al. |
| 7,899,796 B1 | 3/2011 | Borthwick et al. |
| 7,917,376 B2 | 3/2011 | Bellin et al. |
| 7,920,963 B2 | 4/2011 | Jouline et al. |
| 7,933,862 B2 | 4/2011 | Chamberlain et al. |
| 7,941,321 B2 | 5/2011 | Greenstein et al. |
| 7,961,188 B2 | 6/2011 | Tolle et al. |
| 7,962,281 B2 | 6/2011 | Rasmussen et al. |
| 7,962,495 B2 | 6/2011 | Jain et al. |
| 7,962,848 B2 | 6/2011 | Bertram |
| 7,970,240 B1 | 6/2011 | Chao et al. |
| 7,971,150 B2 | 6/2011 | Raskutti et al. |
| 7,984,374 B2 | 7/2011 | Caro et al. |
| 8,001,465 B2 | 8/2011 | Kudrolli et al. |
| 8,001,482 B2 | 8/2011 | Bhattiprolu et al. |
| 8,010,545 B2 | 8/2011 | Stefik et al. |
| 8,015,487 B2 | 9/2011 | Roy et al. |
| 8,019,749 B2 | 9/2011 | Leban |
| 8,024,778 B2 | 9/2011 | Cash et al. |
| 8,036,632 B1 | 10/2011 | Cona et al. |
| 8,036,971 B2 | 10/2011 | Aymeloglu et al. |
| 8,037,046 B2 | 10/2011 | Udezue et al. |
| 8,042,110 B1 | 10/2011 | Kawahara et al. |
| 8,046,283 B2 | 10/2011 | Burns |
| 8,054,756 B2 | 11/2011 | Chand et al. |
| 8,103,543 B1 | 1/2012 | Zwicky |
| 8,134,457 B2 | 3/2012 | Velipasalar et al. |
| 8,145,703 B2 | 3/2012 | Frishert et al. |
| 8,185,819 B2 | 5/2012 | Sah et al. |
| 8,214,361 B1 | 7/2012 | Sandler et al. |
| 8,214,490 B1 | 7/2012 | Vos et al. |
| 8,214,764 B2 | 7/2012 | Gemmell et al. |
| 8,225,201 B2 | 7/2012 | Michael |
| 8,229,902 B2 | 7/2012 | Vishniac et al. |
| 8,229,947 B2 | 7/2012 | Fujinaga |
| 8,230,333 B2 | 7/2012 | Decherd et al. |
| 8,249,885 B2 | 8/2012 | Berkowitz et al. |
| 8,271,461 B2 | 9/2012 | Pike et al. |
| 8,280,880 B1 | 10/2012 | Aymeloglu et al. |
| 8,290,838 B1 | 10/2012 | Thakur et al. |
| 8,290,926 B2 | 10/2012 | Ozzie et al. |
| 8,290,942 B2 | 10/2012 | Jones et al. |
| 8,301,464 B2 | 10/2012 | Cave et al. |
| 8,301,904 B1 | 10/2012 | Gryaznov |
| 8,302,855 B2 | 11/2012 | Ma et al. |
| 8,312,367 B2 | 11/2012 | Foster |
| 8,312,546 B2 | 11/2012 | Alme |
| 8,352,881 B2 | 1/2013 | Champion et al. |
| 8,368,695 B2 | 2/2013 | Howell et al. |
| 8,386,377 B1 | 2/2013 | Xiong et al. |
| 8,397,171 B2 | 3/2013 | Klassen et al. |
| 8,412,707 B1 | 4/2013 | Mianji |
| 8,447,722 B1 | 5/2013 | Ahuja et al. |
| 8,452,790 B1 | 5/2013 | Mianji |
| 8,463,036 B1 | 6/2013 | Ramesh et al. |
| 8,473,454 B2 | 6/2013 | Evanitsky et al. |
| 8,484,115 B2 | 7/2013 | Aymeloglu et al. |
| 8,489,331 B2 | 7/2013 | Kopf et al. |
| 8,489,641 B1 | 7/2013 | Seefeld et al. |
| 8,498,984 B1 | 7/2013 | Hwang et al. |
| 8,510,743 B2 | 8/2013 | Hackborn et al. |
| 8,514,082 B2 | 8/2013 | Cova et al. |
| 8,515,207 B2 | 8/2013 | Chau |
| 8,554,579 B2 | 10/2013 | Tribble et al. |
| 8,554,653 B2 | 10/2013 | Falkenborg et al. |
| 8,554,709 B2 | 10/2013 | Goodson et al. |
| 8,560,413 B1 | 10/2013 | Quarterman |
| 8,577,911 B1 | 11/2013 | Stepinski et al. |
| 8,589,273 B2 | 11/2013 | Creeden et al. |
| 8,595,234 B2 | 11/2013 | Siripuapu et al. |
| 8,620,641 B2 | 12/2013 | Farnsworth et al. |
| 8,639,757 B1 | 1/2014 | Zang et al. |
| 8,646,080 B2 | 2/2014 | Williamson et al. |
| 8,676,857 B1 | 3/2014 | Adams et al. |
| 8,688,573 B1 | 4/2014 | Ruknoic et al. |
| 8,689,108 B1 | 4/2014 | Duffield et al. |
| 8,713,467 B1 | 4/2014 | Goldenberg et al. |
| 8,726,379 B1 | 5/2014 | Stiansen et al. |
| 8,739,278 B2 | 5/2014 | Varghese |
| 8,742,934 B1 | 6/2014 | Sarpy et al. |
| 8,744,890 B1 | 6/2014 | Bernier |
| 8,745,516 B2 | 6/2014 | Mason et al. |
| 8,781,169 B2 | 7/2014 | Jackson et al. |
| 8,787,939 B2 | 7/2014 | Papakipos et al. |
| 8,788,407 B1 | 7/2014 | Singh et al. |
| 8,799,799 B1 | 8/2014 | Cervelli et al. |
| 8,806,355 B2 | 8/2014 | Twiss et al. |
| 8,812,960 B1 | 8/2014 | Sun et al. |
| 8,830,322 B2 | 9/2014 | Nerayoff et al. |
| 8,832,594 B1 | 9/2014 | Thompson et al. |
| 8,868,537 B1 | 10/2014 | Colgrove et al. |
| 8,917,274 B2 | 12/2014 | Ma et al. |
| 8,924,388 B2 | 12/2014 | Elliot et al. |
| 8,924,389 B2 | 12/2014 | Elliot et al. |
| 8,924,872 B1 | 12/2014 | Bogomolov et al. |
| 8,937,619 B2 | 1/2015 | Sharma et al. |
| 8,938,686 B1 | 1/2015 | Erenrich et al. |
| 8,949,164 B1 | 2/2015 | Mohler |
| 9,009,171 B1 | 4/2015 | Grossman et al. |
| 9,009,827 B1 | 4/2015 | Albertson et al. |
| 9,021,260 B1 | 4/2015 | Falk et al. |
| 9,021,384 B1 | 4/2015 | Beard et al. |
| 9,043,696 B1 | 5/2015 | Meiklejohn et al. |
| 9,043,894 B1 | 5/2015 | Dennison et al. |
| 9,069,842 B2 | 6/2015 | Melby |
| 9,100,428 B1 | 8/2015 | Visbal |
| 9,111,281 B2 | 8/2015 | Stibel et al. |
| 9,116,975 B2 | 8/2015 | Shankar et al. |
| 9,129,219 B1 | 9/2015 | Robertson et al. |
| 9,256,664 B2 | 2/2016 | Chakerian et al. |
| 9,280,618 B1 | 3/2016 | Bruce et al. |
| 9,286,373 B2 | 3/2016 | Elliot et al. |
| 9,335,911 B1 | 5/2016 | Elliot et al. |
| 9,361,007 B2 | 6/2016 | Dewan |
| 9,483,745 B2 | 11/2016 | Ackermann et al. |
| 9,870,389 B2 | 1/2018 | Elliot et al. |
| 10,157,200 B2 | 12/2018 | Elliot et al. |
| 10,656,779 B1 | 5/2020 | Rueter et al. |
| 10,678,783 B2 | 6/2020 | Elliot et al. |
| 11,119,762 B1 | 9/2021 | Bush et al. |
| 11,797,258 B2 | 10/2023 | Moy et al. |
| 2002/0033848 A1 | 3/2002 | Sciammarella et al. |
| 2002/0065708 A1 | 5/2002 | Senay et al. |
| 2002/0091707 A1 | 7/2002 | Keller |
| 2002/0095360 A1 | 7/2002 | Joao |
| 2002/0095658 A1 | 7/2002 | Shulman |
| 2002/0103705 A1 | 8/2002 | Brady |
| 2002/0116120 A1 | 8/2002 | Ruiz et al. |
| 2002/0147805 A1 | 10/2002 | Leshem et al. |
| 2002/0174201 A1 | 11/2002 | Ramer et al. |
| 2002/0194119 A1 | 12/2002 | Wright et al. |
| 2003/0028560 A1 | 2/2003 | Kudrolli et al. |
| 2003/0036848 A1 | 2/2003 | Sheha et al. |
| 2003/0039948 A1 | 2/2003 | Donahue |
| 2003/0097364 A1* | 5/2003 | Bata ................ G06F 16/84 |
| 2003/0126102 A1 | 7/2003 | Borthwick |
| 2003/0140106 A1 | 7/2003 | Raguseo |
| 2003/0144868 A1 | 7/2003 | MacIntyre et al. |
| 2003/0163352 A1 | 8/2003 | Surpin et al. |
| 2003/0200217 A1 | 10/2003 | Ackerman |
| 2003/0225755 A1 | 12/2003 | Iwayama et al. |
| 2003/0229848 A1 | 12/2003 | Arend et al. |
| 2004/0032432 A1 | 2/2004 | Baynger |
| 2004/0034570 A1 | 2/2004 | Davis |
| 2004/0064256 A1 | 4/2004 | Barinek et al. |
| 2004/0085318 A1 | 5/2004 | Hassler et al. |
| 2004/0095349 A1 | 5/2004 | Bito et al. |
| 2004/0111410 A1 | 6/2004 | Burgoon et al. |
| 2004/0111480 A1 | 6/2004 | Yue |
| 2004/0126840 A1 | 7/2004 | Cheng et al. |
| 2004/0143602 A1 | 7/2004 | Ruiz et al. |
| 2004/0143796 A1 | 7/2004 | Lerner et al. |

(56) References Cited

U.S. PATENT DOCUMENTS

| | | |
|---|---|---|
| 2004/0153418 A1 | 8/2004 | Hanweck |
| 2004/0163039 A1 | 8/2004 | Gorman |
| 2004/0186845 A1* | 9/2004 | Fukui ................ G06F 16/2246 |
| 2004/0193600 A1 | 9/2004 | Kaasten et al. |
| 2004/0221223 A1 | 11/2004 | Yu et al. |
| 2004/0236688 A1 | 11/2004 | Bozeman |
| 2004/0260702 A1 | 12/2004 | Cragun et al. |
| 2004/0267746 A1 | 12/2004 | Marcjan et al. |
| 2005/0010472 A1 | 1/2005 | Quatse et al. |
| 2005/0027705 A1 | 2/2005 | Sadri et al. |
| 2005/0028094 A1 | 2/2005 | Allyn |
| 2005/0039119 A1 | 2/2005 | Parks et al. |
| 2005/0065811 A1 | 3/2005 | Chu et al. |
| 2005/0080769 A1 | 4/2005 | Gemmell |
| 2005/0080770 A1 | 4/2005 | Lueder et al. |
| 2005/0086207 A1 | 4/2005 | Heuer et al. |
| 2005/0125715 A1 | 6/2005 | Di Franco et al. |
| 2005/0154628 A1 | 7/2005 | Eckart et al. |
| 2005/0154769 A1 | 7/2005 | Eckart et al. |
| 2005/0162523 A1 | 7/2005 | Darrell et al. |
| 2005/0166144 A1 | 7/2005 | Gross |
| 2005/0180330 A1 | 8/2005 | Shapiro |
| 2005/0182793 A1 | 8/2005 | Keenan et al. |
| 2005/0183005 A1 | 8/2005 | Denoue et al. |
| 2005/0210409 A1 | 9/2005 | Jou |
| 2005/0246327 A1 | 11/2005 | Yeung et al. |
| 2005/0251786 A1 | 11/2005 | Citron et al. |
| 2006/0026120 A1 | 2/2006 | Carolan et al. |
| 2006/0026170 A1 | 2/2006 | Kreitler et al. |
| 2006/0031209 A1 | 2/2006 | Ahlberg et al. |
| 2006/0059139 A1 | 3/2006 | Robinson |
| 2006/0074881 A1 | 4/2006 | Vembu et al. |
| 2006/0080283 A1 | 4/2006 | Shipman |
| 2006/0080619 A1 | 4/2006 | Carlson et al. |
| 2006/0093222 A1 | 5/2006 | Saffer et al. |
| 2006/0117055 A1* | 6/2006 | Doyle ................ G06F 11/3414 |
| | | 714/E11.193 |
| 2006/0129746 A1 | 6/2006 | Porter |
| 2006/0139375 A1 | 6/2006 | Rasmussen et al. |
| 2006/0142949 A1 | 6/2006 | Helt |
| 2006/0143034 A1 | 6/2006 | Rothermel |
| 2006/0143075 A1 | 6/2006 | Carr et al. |
| 2006/0143079 A1 | 6/2006 | Basak et al. |
| 2006/0143205 A1* | 6/2006 | Fuchs ................ G06F 16/168 |
| 2006/0149596 A1 | 7/2006 | Surpin et al. |
| 2006/0203337 A1 | 9/2006 | White |
| 2006/0218637 A1 | 9/2006 | Thomas et al. |
| 2006/0241974 A1 | 10/2006 | Chao et al. |
| 2006/0242040 A1 | 10/2006 | Rader et al. |
| 2006/0242630 A1 | 10/2006 | Koike et al. |
| 2006/0271277 A1 | 11/2006 | Hu et al. |
| 2006/0279630 A1 | 12/2006 | Aggarwal et al. |
| 2007/0000999 A1 | 1/2007 | Kubo et al. |
| 2007/0011150 A1 | 1/2007 | Frank |
| 2007/0011304 A1 | 1/2007 | Error |
| 2007/0016363 A1 | 1/2007 | Huang et al. |
| 2007/0038646 A1 | 2/2007 | Thota |
| 2007/0038962 A1 | 2/2007 | Fuchs et al. |
| 2007/0057966 A1 | 3/2007 | Ohno et al. |
| 2007/0078832 A1 | 4/2007 | Ott et al. |
| 2007/0083541 A1 | 4/2007 | Fraleigh et al. |
| 2007/0088596 A1 | 4/2007 | Berkelhamer et al. |
| 2007/0094389 A1 | 4/2007 | Nussey et al. |
| 2007/0112737 A1 | 5/2007 | Carlson et al. |
| 2007/0150369 A1 | 6/2007 | Zivin |
| 2007/0150801 A1 | 6/2007 | Chidlovskii et al. |
| 2007/0156673 A1 | 7/2007 | Maga |
| 2007/0162454 A1 | 7/2007 | D'Albora et al. |
| 2007/0174760 A1 | 7/2007 | Chamberlain et al. |
| 2007/0185867 A1 | 8/2007 | Maga |
| 2007/0192122 A1 | 8/2007 | Routson et al. |
| 2007/0192265 A1 | 8/2007 | Chopin et al. |
| 2007/0198571 A1 | 8/2007 | Ferguson et al. |
| 2007/0208497 A1 | 9/2007 | Downs et al. |
| 2007/0208498 A1 | 9/2007 | Barker et al. |
| 2007/0208736 A1 | 9/2007 | Tanigawa et al. |
| 2007/0233709 A1 | 10/2007 | Abnous |
| 2007/0240062 A1 | 10/2007 | Christena et al. |
| 2007/0266336 A1 | 11/2007 | Nojima et al. |
| 2007/0284433 A1 | 12/2007 | Domenica et al. |
| 2007/0294643 A1 | 12/2007 | Kyle |
| 2008/0040275 A1 | 2/2008 | Paulsen et al. |
| 2008/0040684 A1 | 2/2008 | Crump |
| 2008/0051989 A1 | 2/2008 | Welsh |
| 2008/0052142 A1 | 2/2008 | Bailey et al. |
| 2008/0065655 A1 | 3/2008 | Chakravarthy et al. |
| 2008/0065665 A1 | 3/2008 | Pomroy et al. |
| 2008/0069081 A1 | 3/2008 | Chand et al. |
| 2008/0077597 A1 | 3/2008 | Butler |
| 2008/0077642 A1 | 3/2008 | Carbone et al. |
| 2008/0082486 A1 | 4/2008 | Lermant et al. |
| 2008/0103996 A1 | 5/2008 | Forman et al. |
| 2008/0104019 A1 | 5/2008 | Nath |
| 2008/0126951 A1 | 5/2008 | Sood et al. |
| 2008/0148398 A1 | 6/2008 | Mezack et al. |
| 2008/0155440 A1 | 6/2008 | Trevor et al. |
| 2008/0162616 A1 | 7/2008 | Gross et al. |
| 2008/0195417 A1 | 8/2008 | Surpin et al. |
| 2008/0195608 A1 | 8/2008 | Clover |
| 2008/0208735 A1 | 8/2008 | Balet et al. |
| 2008/0222295 A1 | 9/2008 | Robinson et al. |
| 2008/0243711 A1 | 10/2008 | Aymeloglu et al. |
| 2008/0249983 A1 | 10/2008 | Meisels et al. |
| 2008/0255973 A1 | 10/2008 | El Wade et al. |
| 2008/0263468 A1 | 10/2008 | Cappione et al. |
| 2008/0267107 A1 | 10/2008 | Rosenberg |
| 2008/0270328 A1 | 10/2008 | Lafferty et al. |
| 2008/0276167 A1 | 11/2008 | Michael |
| 2008/0278311 A1 | 11/2008 | Grange et al. |
| 2008/0288306 A1 | 11/2008 | MacIntyre et al. |
| 2008/0288475 A1 | 11/2008 | Kim et al. |
| 2008/0294663 A1 | 11/2008 | Heinley et al. |
| 2008/0301559 A1 | 12/2008 | Martinsen et al. |
| 2008/0301643 A1 | 12/2008 | Appleton et al. |
| 2008/0313132 A1 | 12/2008 | Hao et al. |
| 2008/0313281 A1 | 12/2008 | Scheidl et al. |
| 2009/0002492 A1 | 1/2009 | Velipasalar et al. |
| 2009/0027418 A1 | 1/2009 | Maru et al. |
| 2009/0030915 A1 | 1/2009 | Winter et al. |
| 2009/0037912 A1 | 2/2009 | Stoitsev et al. |
| 2009/0043762 A1 | 2/2009 | Shiverick et al. |
| 2009/0055251 A1 | 2/2009 | Shah et al. |
| 2009/0076845 A1 | 3/2009 | Bellin et al. |
| 2009/0088964 A1 | 4/2009 | Schaaf et al. |
| 2009/0094166 A1 | 4/2009 | Aymeloglu et al. |
| 2009/0094270 A1 | 4/2009 | Alirez et al. |
| 2009/0106178 A1 | 4/2009 | Chu |
| 2009/0112745 A1 | 4/2009 | Stefanescu |
| 2009/0119309 A1 | 5/2009 | Gibson et al. |
| 2009/0125359 A1 | 5/2009 | Knapic |
| 2009/0125369 A1 | 5/2009 | Kloostra et al. |
| 2009/0125459 A1 | 5/2009 | Norton et al. |
| 2009/0132921 A1 | 5/2009 | Hwangbo et al. |
| 2009/0132953 A1 | 5/2009 | Reed et al. |
| 2009/0143052 A1 | 6/2009 | Bates et al. |
| 2009/0144262 A1 | 6/2009 | White et al. |
| 2009/0144274 A1 | 6/2009 | Fraleigh et al. |
| 2009/0157732 A1 | 6/2009 | Hao et al. |
| 2009/0164934 A1 | 6/2009 | Bhattiprolu et al. |
| 2009/0171939 A1 | 7/2009 | Athsani et al. |
| 2009/0172511 A1 | 7/2009 | Decherd et al. |
| 2009/0172821 A1 | 7/2009 | Daira et al. |
| 2009/0177962 A1 | 7/2009 | Gusmorino et al. |
| 2009/0179892 A1 | 7/2009 | Tsuda et al. |
| 2009/0187464 A1 | 7/2009 | Bai et al. |
| 2009/0187546 A1 | 7/2009 | Whyte et al. |
| 2009/0187548 A1 | 7/2009 | Ji et al. |
| 2009/0222400 A1 | 9/2009 | Kupershmidt et al. |
| 2009/0222759 A1 | 9/2009 | Drieschner |
| 2009/0222760 A1 | 9/2009 | Halverson et al. |
| 2009/0234720 A1 | 9/2009 | George et al. |
| 2009/0249244 A1 | 10/2009 | Robinson et al. |
| 2009/0254572 A1 | 10/2009 | Redlich et al. |
| 2009/0254842 A1 | 10/2009 | Leacock et al. |

(56) References Cited

U.S. PATENT DOCUMENTS

| | | |
|---|---|---|
| 2009/0254970 A1 | 10/2009 | Agarwal et al. |
| 2009/0259636 A1 | 10/2009 | Labrou et al. |
| 2009/0271343 A1 | 10/2009 | Vaiciulis et al. |
| 2009/0281839 A1 | 11/2009 | Lynn et al. |
| 2009/0287470 A1 | 11/2009 | Farnsworth et al. |
| 2009/0292626 A1 | 11/2009 | Oxford |
| 2009/0307049 A1 | 12/2009 | Elliott et al. |
| 2009/0310816 A1* | 12/2009 | Freire .................. G06F 16/22 382/100 |
| 2009/0313463 A1 | 12/2009 | Pang et al. |
| 2009/0319418 A1 | 12/2009 | Herz |
| 2009/0319515 A1 | 12/2009 | Minton et al. |
| 2009/0319891 A1 | 12/2009 | MacKinlay |
| 2010/0004857 A1 | 1/2010 | Pereira et al. |
| 2010/0011282 A1 | 1/2010 | Dollard et al. |
| 2010/0030722 A1 | 2/2010 | Goodson et al. |
| 2010/0031141 A1 | 2/2010 | Summers et al. |
| 2010/0037212 A1* | 2/2010 | Meijer .................. G06F 8/427 717/142 |
| 2010/0042922 A1 | 2/2010 | Bradateanu et al. |
| 2010/0057622 A1 | 3/2010 | Faith et al. |
| 2010/0057716 A1 | 3/2010 | Stefik et al. |
| 2010/0070448 A1* | 3/2010 | Omoigui ............ H01L 27/1463 706/47 |
| 2010/0070523 A1 | 3/2010 | Delgo et al. |
| 2010/0070842 A1 | 3/2010 | Aymeloglu et al. |
| 2010/0070845 A1 | 3/2010 | Facemire et al. |
| 2010/0070897 A1 | 3/2010 | Aymeloglu et al. |
| 2010/0076979 A1 | 3/2010 | Wang et al. |
| 2010/0098318 A1 | 4/2010 | Anderson |
| 2010/0100963 A1 | 4/2010 | Mahaffey |
| 2010/0103124 A1 | 4/2010 | Kruzeniski et al. |
| 2010/0106752 A1 | 4/2010 | Eckardt et al. |
| 2010/0114887 A1 | 5/2010 | Conway et al. |
| 2010/0114916 A1 | 5/2010 | Cooke |
| 2010/0122152 A1 | 5/2010 | Chamberlain et al. |
| 2010/0131457 A1 | 5/2010 | Heimendinger |
| 2010/0131502 A1 | 5/2010 | Fordham |
| 2010/0161735 A1 | 6/2010 | Sharma |
| 2010/0162176 A1 | 6/2010 | Dunton |
| 2010/0191563 A1 | 7/2010 | Schlaifer et al. |
| 2010/0198684 A1 | 8/2010 | Eraker et al. |
| 2010/0199225 A1 | 8/2010 | Coleman et al. |
| 2010/0211535 A1 | 8/2010 | Rosenberger |
| 2010/0228812 A1 | 9/2010 | Uomini |
| 2010/0235915 A1 | 9/2010 | Memon et al. |
| 2010/0250412 A1 | 9/2010 | Wagner |
| 2010/0262688 A1 | 10/2010 | Hussain et al. |
| 2010/0280857 A1 | 11/2010 | Liu et al. |
| 2010/0293174 A1 | 11/2010 | Bennett et al. |
| 2010/0306713 A1 | 12/2010 | Geisner et al. |
| 2010/0312837 A1 | 12/2010 | Bodapati et al. |
| 2010/0313119 A1 | 12/2010 | Baldwin et al. |
| 2010/0318924 A1 | 12/2010 | Frankel et al. |
| 2010/0321399 A1 | 12/2010 | Ellren et al. |
| 2010/0325526 A1 | 12/2010 | Ellis et al. |
| 2010/0325581 A1 | 12/2010 | Finkelstein et al. |
| 2010/0330801 A1 | 12/2010 | Rouh |
| 2011/0004498 A1 | 1/2011 | Readshaw |
| 2011/0029526 A1 | 2/2011 | Knight et al. |
| 2011/0040776 A1 | 2/2011 | Najm et al. |
| 2011/0047159 A1 | 2/2011 | Baid et al. |
| 2011/0060753 A1 | 3/2011 | Shaked et al. |
| 2011/0061013 A1 | 3/2011 | Bilicki et al. |
| 2011/0066933 A1 | 3/2011 | Ludwig |
| 2011/0074811 A1 | 3/2011 | Hanson et al. |
| 2011/0078055 A1 | 3/2011 | Faribault et al. |
| 2011/0078173 A1 | 3/2011 | Seligmann et al. |
| 2011/0093327 A1 | 4/2011 | Fordyce, III et al. |
| 2011/0099133 A1 | 4/2011 | Chang et al. |
| 2011/0117878 A1 | 5/2011 | Barash et al. |
| 2011/0119100 A1 | 5/2011 | Ruhl et al. |
| 2011/0137766 A1 | 6/2011 | Rasmussen et al. |
| 2011/0153384 A1 | 6/2011 | Horne et al. |
| 2011/0161096 A1 | 6/2011 | Buehler et al. |
| 2011/0167105 A1 | 7/2011 | Ramakrishnan et al. |
| 2011/0170799 A1 | 7/2011 | Carrino et al. |
| 2011/0173032 A1 | 7/2011 | Payne et al. |
| 2011/0173093 A1 | 7/2011 | Psota et al. |
| 2011/0185316 A1 | 7/2011 | Reid et al. |
| 2011/0208565 A1 | 8/2011 | Ross et al. |
| 2011/0208724 A1 | 8/2011 | Jones et al. |
| 2011/0213655 A1 | 9/2011 | Henkin |
| 2011/0218934 A1 | 9/2011 | Elser |
| 2011/0218955 A1 | 9/2011 | Tang |
| 2011/0219450 A1 | 9/2011 | McDougal et al. |
| 2011/0225198 A1 | 9/2011 | Edwards et al. |
| 2011/0238495 A1 | 9/2011 | Kang |
| 2011/0238553 A1 | 9/2011 | Raj et al. |
| 2011/0251951 A1 | 10/2011 | Kolkowtiz |
| 2011/0258158 A1 | 10/2011 | Resende et al. |
| 2011/0270604 A1 | 11/2011 | Qi et al. |
| 2011/0270705 A1 | 11/2011 | Parker |
| 2011/0270834 A1 | 11/2011 | Sokolan et al. |
| 2011/0289397 A1 | 11/2011 | Eastmond et al. |
| 2011/0289407 A1 | 11/2011 | Naik et al. |
| 2011/0289420 A1 | 11/2011 | Morioka et al. |
| 2011/0291851 A1 | 12/2011 | Whisenant |
| 2011/0295649 A1 | 12/2011 | Fine |
| 2011/0296300 A1* | 12/2011 | Parker .................. G06Q 10/101 715/256 |
| 2011/0310005 A1 | 12/2011 | Chen et al. |
| 2011/0314007 A1 | 12/2011 | Dassa et al. |
| 2011/0314024 A1 | 12/2011 | Chang et al. |
| 2011/0314148 A1 | 12/2011 | Petersen et al. |
| 2012/0004904 A1 | 1/2012 | Shin et al. |
| 2012/0011238 A1 | 1/2012 | Rathod |
| 2012/0011245 A1 | 1/2012 | Gillette et al. |
| 2012/0019559 A1 | 1/2012 | Siler et al. |
| 2012/0022945 A1 | 1/2012 | Falkenborg et al. |
| 2012/0036013 A1 | 2/2012 | Neuhaus et al. |
| 2012/0036434 A1 | 2/2012 | Oberstein |
| 2012/0050293 A1 | 3/2012 | Carlhian et al. |
| 2012/0054284 A1 | 3/2012 | Rakshit |
| 2012/0059853 A1 | 3/2012 | Jagota |
| 2012/0066166 A1 | 3/2012 | Curbera et al. |
| 2012/0066296 A1 | 3/2012 | Appleton et al. |
| 2012/0072825 A1 | 3/2012 | Sherkin et al. |
| 2012/0079363 A1 | 3/2012 | Folting et al. |
| 2012/0084117 A1 | 4/2012 | Tavares et al. |
| 2012/0084118 A1 | 4/2012 | Bai et al. |
| 2012/0084287 A1 | 4/2012 | Lakshminarayan et al. |
| 2012/0089606 A1 | 4/2012 | Eshwar et al. |
| 2012/0102074 A1 | 4/2012 | Mital et al. |
| 2012/0106801 A1 | 5/2012 | Jackson |
| 2012/0117082 A1 | 5/2012 | Koperda et al. |
| 2012/0131512 A1 | 5/2012 | Takeuchi et al. |
| 2012/0137235 A1 | 5/2012 | Ts et al. |
| 2012/0144335 A1 | 6/2012 | Abeln et al. |
| 2012/0154402 A1 | 6/2012 | Mital et al. |
| 2012/0158527 A1 | 6/2012 | Cannelongo et al. |
| 2012/0159307 A1 | 6/2012 | Chung et al. |
| 2012/0159362 A1 | 6/2012 | Brown et al. |
| 2012/0159399 A1 | 6/2012 | Bastide et al. |
| 2012/0170847 A1 | 7/2012 | Tsukidate |
| 2012/0173381 A1 | 7/2012 | Smith |
| 2012/0173985 A1 | 7/2012 | Peppel |
| 2012/0180002 A1 | 7/2012 | Campbell et al. |
| 2012/0196557 A1 | 8/2012 | Reich et al. |
| 2012/0196558 A1 | 8/2012 | Reich et al. |
| 2012/0197651 A1 | 8/2012 | Robinson et al. |
| 2012/0203708 A1 | 8/2012 | Psota et al. |
| 2012/0208636 A1 | 8/2012 | Feige |
| 2012/0215784 A1 | 8/2012 | King et al. |
| 2012/0221511 A1 | 8/2012 | Gibson et al. |
| 2012/0221553 A1 | 8/2012 | Wittmer et al. |
| 2012/0221580 A1 | 8/2012 | Barney |
| 2012/0226523 A1 | 9/2012 | Weiss |
| 2012/0245976 A1 | 9/2012 | Kumar et al. |
| 2012/0246148 A1 | 9/2012 | Dror |
| 2012/0254129 A1 | 10/2012 | Wheeler et al. |
| 2012/0266245 A1 | 10/2012 | McDougal et al. |
| 2012/0284345 A1 | 11/2012 | Costenaro et al. |

(56) References Cited

U.S. PATENT DOCUMENTS

| | | | |
|---|---|---|---|
| 2012/0290575 A1* | 11/2012 | Hu | G06F 16/9535 707/737 |
| 2012/0290879 A1 | 11/2012 | Shibuya et al. | |
| 2012/0296907 A1 | 11/2012 | Long et al. | |
| 2012/0304244 A1 | 11/2012 | Xie et al. | |
| 2012/0311684 A1 | 12/2012 | Paulsen et al. | |
| 2012/0323829 A1 | 12/2012 | Stokes et al. | |
| 2012/0323888 A1 | 12/2012 | Osann, Jr. | |
| 2012/0323889 A1 | 12/2012 | Marum et al. | |
| 2012/0330801 A1 | 12/2012 | McDougal et al. | |
| 2012/0330973 A1 | 12/2012 | Ghuneim et al. | |
| 2013/0006426 A1 | 1/2013 | Healey et al. | |
| 2013/0006725 A1 | 1/2013 | Simanek et al. | |
| 2013/0006916 A1 | 1/2013 | McBride et al. | |
| 2013/0016106 A1 | 1/2013 | Yip et al. | |
| 2013/0018796 A1 | 1/2013 | Kolhatkar et al. | |
| 2013/0024268 A1 | 1/2013 | Manickavelu | |
| 2013/0046635 A1 | 2/2013 | Grigg et al. | |
| 2013/0046842 A1 | 2/2013 | Muntz et al. | |
| 2013/0054306 A1 | 2/2013 | Bhalla | |
| 2013/0055145 A1 | 2/2013 | Antony et al. | |
| 2013/0057551 A1 | 3/2013 | Ebert et al. | |
| 2013/0060786 A1 | 3/2013 | Serrano et al. | |
| 2013/0061169 A1 | 3/2013 | Pearcy et al. | |
| 2013/0073377 A1 | 3/2013 | Heath | |
| 2013/0073454 A1 | 3/2013 | Busch | |
| 2013/0078943 A1 | 3/2013 | Biage et al. | |
| 2013/0086482 A1 | 4/2013 | Parsons | |
| 2013/0096988 A1 | 4/2013 | Grossman et al. | |
| 2013/0097482 A1 | 4/2013 | Marantz et al. | |
| 2013/0101159 A1 | 4/2013 | Chao et al. | |
| 2013/0110746 A1 | 5/2013 | Ahn | |
| 2013/0110822 A1 | 5/2013 | Ikeda et al. | |
| 2013/0110877 A1 | 5/2013 | Bonham et al. | |
| 2013/0111320 A1 | 5/2013 | Campbell et al. | |
| 2013/0117651 A1 | 5/2013 | Waldman et al. | |
| 2013/0150004 A1 | 6/2013 | Rosen | |
| 2013/0151148 A1 | 6/2013 | Parundekar et al. | |
| 2013/0151388 A1 | 6/2013 | Falkenborg et al. | |
| 2013/0151453 A1 | 6/2013 | Bhanot et al. | |
| 2013/0157234 A1 | 6/2013 | Gulli et al. | |
| 2013/0166348 A1 | 6/2013 | Scotto | |
| 2013/0166480 A1 | 6/2013 | Popescu et al. | |
| 2013/0166550 A1 | 6/2013 | Buchmann et al. | |
| 2013/0176321 A1 | 7/2013 | Mitchell et al. | |
| 2013/0179420 A1 | 7/2013 | Park et al. | |
| 2013/0185245 A1 | 7/2013 | Anderson | |
| 2013/0185307 A1 | 7/2013 | El-Yaniv et al. | |
| 2013/0218879 A1 | 8/2013 | Park et al. | |
| 2013/0224696 A1 | 8/2013 | Wolfe et al. | |
| 2013/0225212 A1 | 8/2013 | Khan | |
| 2013/0226318 A1 | 8/2013 | Procyk | |
| 2013/0226953 A1 | 8/2013 | Markovich et al. | |
| 2013/0232045 A1 | 9/2013 | Tai et al. | |
| 2013/0238616 A1 | 9/2013 | Rose et al. | |
| 2013/0246170 A1 | 9/2013 | Gross et al. | |
| 2013/0246537 A1 | 9/2013 | Gaddala | |
| 2013/0246597 A1 | 9/2013 | Iizawa et al. | |
| 2013/0251233 A1 | 9/2013 | Yang et al. | |
| 2013/0262527 A1 | 10/2013 | Hunter et al. | |
| 2013/0262528 A1 | 10/2013 | Foit | |
| 2013/0263019 A1 | 10/2013 | Castellanos et al. | |
| 2013/0267207 A1 | 10/2013 | Hao et al. | |
| 2013/0268520 A1 | 10/2013 | Fisher et al. | |
| 2013/0279757 A1 | 10/2013 | Kephart | |
| 2013/0282696 A1 | 10/2013 | John et al. | |
| 2013/0288719 A1 | 10/2013 | Alonzo | |
| 2013/0290011 A1 | 10/2013 | Lynn et al. | |
| 2013/0290825 A1 | 10/2013 | Arndt et al. | |
| 2013/0297619 A1 | 11/2013 | Chandrasekaran et al. | |
| 2013/0304770 A1 | 11/2013 | Boero et al. | |
| 2013/0311375 A1 | 11/2013 | Priebatsch | |
| 2013/0318604 A1 | 11/2013 | Coates et al. | |
| 2014/0012796 A1 | 1/2014 | Petersen et al. | |
| 2014/0019936 A1 | 1/2014 | Cohanoff | |
| 2014/0032506 A1 | 1/2014 | Hoey et al. | |
| 2014/0033010 A1 | 1/2014 | Richardt et al. | |
| 2014/0040371 A1 | 2/2014 | Gurevich et al. | |
| 2014/0047319 A1 | 2/2014 | Eberlein | |
| 2014/0047357 A1 | 2/2014 | Alfaro et al. | |
| 2014/0053091 A1 | 2/2014 | Hou et al. | |
| 2014/0058914 A1 | 2/2014 | Song et al. | |
| 2014/0059038 A1 | 2/2014 | McPherson et al. | |
| 2014/0067611 A1 | 3/2014 | Adachi et al. | |
| 2014/0068487 A1 | 3/2014 | Steiger et al. | |
| 2014/0074855 A1 | 3/2014 | Zhao et al. | |
| 2014/0081685 A1 | 3/2014 | Thacker et al. | |
| 2014/0095273 A1 | 4/2014 | Tang et al. | |
| 2014/0095509 A1 | 4/2014 | Patton | |
| 2014/0108068 A1 | 4/2014 | Williams | |
| 2014/0108380 A1 | 4/2014 | Gotz et al. | |
| 2014/0108985 A1 | 4/2014 | Scott et al. | |
| 2014/0123279 A1 | 5/2014 | Bishop et al. | |
| 2014/0129261 A1 | 5/2014 | Bothwell et al. | |
| 2014/0136285 A1 | 5/2014 | Carvalho | |
| 2014/0143009 A1 | 5/2014 | Brice et al. | |
| 2014/0149436 A1 | 5/2014 | Bahrami et al. | |
| 2014/0156527 A1 | 6/2014 | Grigg et al. | |
| 2014/0157172 A1 | 6/2014 | Peery et al. | |
| 2014/0164502 A1 | 6/2014 | Khodorenko et al. | |
| 2014/0189536 A1 | 7/2014 | Lange et al. | |
| 2014/0189870 A1 | 7/2014 | Singla et al. | |
| 2014/0195515 A1 | 7/2014 | Baker et al. | |
| 2014/0195887 A1 | 7/2014 | Ellis et al. | |
| 2014/0214579 A1 | 7/2014 | Shen et al. | |
| 2014/0214810 A1 | 7/2014 | Takeda | |
| 2014/0222521 A1 | 8/2014 | Chait | |
| 2014/0222793 A1 | 8/2014 | Sadkin et al. | |
| 2014/0229554 A1 | 8/2014 | Grunin et al. | |
| 2014/0244388 A1 | 8/2014 | Manouchehri et al. | |
| 2014/0250377 A1 | 9/2014 | Bisca et al. | |
| 2014/0258246 A1 | 9/2014 | Lo Faro et al. | |
| 2014/0267294 A1 | 9/2014 | Ma | |
| 2014/0267295 A1 | 9/2014 | Sharma | |
| 2014/0279824 A1 | 9/2014 | Tamayo | |
| 2014/0280056 A1 | 9/2014 | Kelly | |
| 2014/0282160 A1 | 9/2014 | Zarpas | |
| 2014/0310266 A1 | 10/2014 | Greenfield | |
| 2014/0316911 A1 | 10/2014 | Gross | |
| 2014/0333651 A1 | 11/2014 | Cervelli et al. | |
| 2014/0337071 A1* | 11/2014 | Stiffler | G06Q 10/06311 705/7.13 |
| 2014/0337772 A1 | 11/2014 | Cervelli et al. | |
| 2014/0344230 A1 | 11/2014 | Krause et al. | |
| 2014/0351070 A1 | 11/2014 | Christner et al. | |
| 2014/0358829 A1 | 12/2014 | Hurwitz | |
| 2014/0366132 A1 | 12/2014 | Stiansen et al. | |
| 2014/0372956 A1 | 12/2014 | Bisca et al. | |
| 2015/0019394 A1 | 1/2015 | Unser et al. | |
| 2015/0046870 A1 | 2/2015 | Goldenberg et al. | |
| 2015/0073929 A1 | 3/2015 | Psota et al. | |
| 2015/0073954 A1 | 3/2015 | Braff | |
| 2015/0089424 A1 | 3/2015 | Duffield et al. | |
| 2015/0095773 A1 | 4/2015 | Gonsalves et al. | |
| 2015/0100897 A1 | 4/2015 | Sun et al. | |
| 2015/0100907 A1 | 4/2015 | Erenrich et al. | |
| 2015/0106170 A1 | 4/2015 | Bonica | |
| 2015/0106379 A1 | 4/2015 | Elliot et al. | |
| 2015/0134599 A1 | 5/2015 | Banerjee et al. | |
| 2015/0134666 A1 | 5/2015 | Gattiker et al. | |
| 2015/0135256 A1 | 5/2015 | Hoy et al. | |
| 2015/0169709 A1 | 6/2015 | Kara et al. | |
| 2015/0169726 A1 | 6/2015 | Kara et al. | |
| 2015/0170077 A1 | 6/2015 | Kara et al. | |
| 2015/0178825 A1 | 6/2015 | Huerta | |
| 2015/0178877 A1 | 6/2015 | Bogomolov et al. | |
| 2015/0186821 A1 | 7/2015 | Wang et al. | |
| 2015/0187036 A1 | 7/2015 | Wang et al. | |
| 2015/0188872 A1 | 7/2015 | White | |
| 2015/0220252 A1 | 8/2015 | Mital et al. | |
| 2015/0227295 A1 | 8/2015 | Meiklejohn et al. | |
| 2015/0242401 A1 | 8/2015 | Liu | |
| 2015/0302036 A1 | 10/2015 | Kumar et al. | |
| 2015/0309719 A1 | 10/2015 | Ma et al. | |

(56) References Cited

U.S. PATENT DOCUMENTS

| | | | |
|---|---|---|---|
| 2015/0317342 | A1 | 11/2015 | Grossman et al. |
| 2015/0324868 | A1 | 11/2015 | Kaftan et al. |
| 2015/0338233 | A1 | 11/2015 | Cervelli et al. |
| 2015/0379413 | A1 | 12/2015 | Robertson et al. |
| 2016/0004610 | A1* | 1/2016 | Knight .................. G06F 11/203 714/4.11 |
| 2016/0004764 | A1 | 1/2016 | Chakerian et al. |
| 2016/0034463 | A1 | 2/2016 | Brewer |
| 2016/0048566 | A1* | 2/2016 | Meng .................. G06F 16/2465 706/12 |
| 2016/0098385 | A1 | 4/2016 | Burke et al. |
| 2016/0110055 | A1* | 4/2016 | Sullivan .............. G06F 3/04842 715/771 |
| 2016/0180557 | A1 | 6/2016 | Yousaf et al. |
| 2016/0231915 | A1 | 8/2016 | Nhan et al. |
| 2016/0267063 | A1* | 9/2016 | Rajvanshi ............. G06F 40/137 |
| 2017/0069118 | A1 | 3/2017 | Stewart |
| 2017/0102863 | A1 | 4/2017 | Elliot et al. |
| 2017/0116259 | A1 | 4/2017 | Elliot et al. |
| 2018/0052597 | A1 | 2/2018 | Stokes et al. |
| 2018/0081935 | A1 | 3/2018 | Papale et al. |
| 2018/0129369 | A1 | 5/2018 | Kim et al. |
| 2018/0260985 | A1 | 9/2018 | Ding et al. |
| 2019/0087454 | A1 | 3/2019 | Elliot et al. |
| 2019/0227824 | A1 | 7/2019 | Kuchoor |
| 2021/0117051 | A1 | 4/2021 | McRaven et al. |

FOREIGN PATENT DOCUMENTS

| | | |
|---|---|---|
| CN | 102054015 | 5/2014 |
| DE | 102014103482 | 9/2014 |
| DE | 102014204827 | 9/2014 |
| DE | 102014204830 | 9/2014 |
| DE | 102014204834 | 9/2014 |
| DE | 102014215621 | 2/2015 |
| EP | 1672527 | 6/2006 |
| EP | 2487610 | 8/2012 |
| EP | 2551799 | 1/2013 |
| EP | 2560134 | 2/2013 |
| EP | 2778977 | 9/2014 |
| EP | 2835745 | 2/2015 |
| EP | 2835770 | 2/2015 |
| EP | 2838039 | 2/2015 |
| EP | 2846241 | 3/2015 |
| EP | 2851852 | 3/2015 |
| EP | 2858014 | 4/2015 |
| EP | 2858018 | 4/2015 |
| EP | 2863326 | 4/2015 |
| EP | 2863346 | 4/2015 |
| EP | 2869211 | 5/2015 |
| EP | 2881868 | 6/2015 |
| EP | 2884439 | 6/2015 |
| EP | 2884440 | 6/2015 |
| EP | 2889814 | 7/2015 |
| EP | 2891992 | 7/2015 |
| EP | 2892197 | 7/2015 |
| EP | 2911078 | 8/2015 |
| EP | 2911100 | 8/2015 |
| EP | 2940603 | 11/2015 |
| EP | 2940609 | 11/2015 |
| EP | 2963595 | 1/2016 |
| EP | 2996053 | 3/2016 |
| EP | 3035214 | 6/2016 |
| EP | 3038002 | 6/2016 |
| EP | 3040885 | 7/2016 |
| EP | 3340078 | 6/2018 |
| EP | 3809277 | 4/2021 |
| GB | 2516155 | 1/2015 |
| GB | 2518745 | 4/2015 |
| NL | 2012778 | 11/2014 |
| NL | 2013306 | 2/2015 |
| NZ | 624557 | 12/2014 |
| WO | WO 2000/009529 | 2/2000 |
| WO | WO 2002/065353 | 8/2002 |
| WO | WO 2005/104736 | 11/2005 |
| WO | WO 2005/116851 | 12/2005 |
| WO | WO 2008/064207 | 5/2008 |
| WO | WO 2009/061501 | 5/2009 |
| WO | WO 2010/000014 | 1/2010 |
| WO | WO 2010/030913 | 3/2010 |
| WO | WO 2012/061162 | 5/2012 |
| WO | WO 2013/010157 | 1/2013 |
| WO | WO 2013/102892 | 7/2013 |

OTHER PUBLICATIONS

"A Quick Guide to UniProtKB Swiss-Prot & TrEMBL," Sep. 2011, pp. 2.

"A Word About Banks and the Laundering of Drug Money," Aug. 18, 2012, http://www.golemxiv.co.uk/2012/08/a-word-about-banks-and-the-laundering-of-drug-money/.

About 80 Minutes, "Palantir in a Number of Parts—Part 6—Graph," Mar. 21, 2013, pp. 1-6.

Acklen, Laura, "Absolute Beginner's Guide to Microsoft Word 2003," Dec. 24, 2003, pp. 15-18, 34-41, 308-316.

Alur et al., "Chapter 2: IBM InfoSphere DataStage Stages," IBM InfoSphere DataStage Data Flow and Job Design, Jul. 1, 2008, pp. 35-137.

Amnet, "5 Great Tools for Visualizing Your Twitter Followers," posted Aug. 4, 2010, http://www.amnetblog.com/component/content/article/115-5-grate-tools-for-visualizing-your-twitter-followers.html.

Ananiev et al., "The New Modality API," http://web.archive.org/web/20061211011958/http://java.sun.com/developer/technicalArticles/J2SE/Desktop/javase6/modality/ Jan. 21, 2006, p. 8.

Appacts, "Smart Thinking for Super Apps," <http://www.appacts.com> Printed Jul. 18, 2013 in 4 pages.

Apsalar, "Data Powered Mobile Advertising," "Free Mobile App Analytics" and various analytics related screen shots <http://apsalar.com> Printed Jul. 18, 2013 in 8 pages.

Bluttman et al., "Excel Formulas and Functions for Dummies," 2005, Wiley Publishing, Inc., pp. 280, 284-286.

Boyce, Jim, "Microsoft Outlook 2010 Inside Out," Aug. 1, 2010, retrieved from the internet https://capdtron.files.wordpress.com/2013/01/outlook-2010-inside_out.pdf.

Bugzilla@Mozilla, "Bug 18726—[feature] Long-click means of invoking contextual menus not supported," http://bugzilla.mozilla.org/show_bug.cgi?id=18726 printed Jun. 13, 2013 in 11 pages.

Canese et al., "Chapter 2: PubMed: The Bibliographic Database," The NCBI Handbook, Oct. 2002, pp. 1-10.

Capptain—Pilot Your Apps, <http://www.capptain.com> Printed Jul. 18, 2013 in 6 pages.

Celik, Tantek, "Css Basic User Interface Module Level 3 (CSS3 UI)," Section 8 Resizing and Overflow, Jan. 17, 2012, retrieved from internet http://www.w3.org/TR/2012/WD-css3-ui-20120117/#resizing-amp-overflow retrieved on May 18, 2015.

Chaudhuri et al., "An Overview of Business Intelligence Technology," Communications of the ACM, Aug. 2011, vol. 54, No. 8.

Chen et al., "Bringing Order to the Web: Automatically Categorizing Search Results," CHI 2000,|Proceedings of the SIGCHI conference on Human Factors in Computing Systems, Apr. 1-6, 2000, The Hague, The Netherlands, pp. 145-152.

Chung, Chin-Wan, "Dataplex: An Access to Heterogeneous Distributed Databases," Communications of the ACM, Association for Computing Machinery, Inc., vol. 33, No. 1, Jan. 1, 1990, pp. 70-80.

Cohn, et al., "Semi-supervised clustering with user feedback," Constrained Clustering: Advances in Algorithms, Theory, and Applications 4.1 (2003): 17-32.

Conner, Nancy, "Google Apps: The Missing Manual," May 1, 2008, pp. 15.

Countly Mobile Analytics, <http://count.ly/> Printed Jul. 18, 2013 in 9 pages.

Definition "Identify", downloaded Jan. 22, 2015, 1 page.

Definition "Overlay", downloaded Jan. 22, 2015, 1 page.

Delcher et al., "Identifying Bacterial Genes and Endosymbiont DNA with Glimmer," BioInformatics, vol. 23, No. 6, 2007, pp. 673-679.

(56) References Cited

OTHER PUBLICATIONS

Distimo—App Analytics, <http://www.distimo.com/app-analytics> Printed Jul. 18, 2013 in 5 pages.
Dramowicz, Ela, "Retail Trade Area Analysis Using the Huff Model," Directions Magazine, Jul. 2, 2005 in 10 pages, http://www.directionsmag.com/articles/retail-trade-area-analysis-using-the-huff-model/123411.
"The FASTA Program Package," fasta-36.3.4, Mar. 25, 2011, pp. 29.
Flurry Analytics, <http://www.flurry.com/> Printed Jul. 18, 2013 in 14 pages.
Gesher, Ari, "Palantir Screenshots in the Wild: Swing Sightings," The Palantir Blog, Sep. 11, 2007, pp. 1-12.
Gill et al., "Computerised Linking of Medical Records: Methodological Guidelines," Journal of Epidemiology and Community Health, 1993, vol. 47, pp. 316-319.
GIS-NET 3 Public _ Department of Regional Planning. Planning & Zoning Information for Unincorporated LA County. Retrieved Oct. 2, 2013 from http://gis.planning.lacounty.gov/GIS-NET3_Public/Viewer.html.
Glaab et al., "EnrichNet: Network-Based Gene Set Enrichment Analysis," Bioinformatics 28.18 (2012): pp. i451-i457.
Google Analytics Official Website—Web Analytics & Reporting, <http://www.google.com/analytics.index.html> Printed Jul. 18, 2013 in 22 pages.
Gorr et al., "Crime Hot Spot Forecasting: Modeling and Comparative Evaluation", Grant 98-IJ-CX-K005, May 6, 2002, 37 pages.
Goswami, Gautam, "Quite Writly Said!," One Brick at a Time, Aug. 21, 2005, pp. 7.
Griffith, Daniel A., "A Generalized Huff Model," Geographical Analysis, Apr. 1982, vol. 14, No. 2, pp. 135-144.
Gu et al., "Record Linkage: Current Practice and Future Directions," Jan. 15, 2004, pp. 32.
Hansen et al., "Analyzing Social Media Networks with NodeXL: Insights from a Connected World", Chapter 4, pp. 53-67 and Chapter 10, pp. 143-164, published Sep. 2010.
Hardesty, "Privacy Challenges: Analysis: It's Surprisingly Easy to Identify Individuals from Credit-Card Metadata," MIT News On Campus and Around the World, MIT News Office, Jan. 29, 2015, 3 pages.
Hibbert et al., "Prediction of Shopping Behavior Using a Huff Model Within a GIS Framework," Healthy Eating in Context, Mar. 18, 2011, pp. 16.
Hogue et al., "Thresher: Automating the Unwrapping of Semantic Content from the World Wide Web," 14th International Conference on World Wide Web, WWW 2005: Chiba, Japan, May 10-14, 2005, pp. 86-95.
Hua et al., "A Multi-attribute Data Structure with Parallel Bloom Filters for Network Services", HiPC 2006, LNCS 4297, pp. 277-288, 2006.
Huang et al., "Systematic and Integrative Analysis of Large Gene Lists Using DAVID Bioinformatics Resources," Nature Protocols, 4.1, 2008, 44-57.
Huff et al., "Calibrating the Huff Model Using ArcGIS Business Analyst," ESRI, Sep. 2008, pp. 33.
Huff, David L., "Parameter Estimation in the Huff Model," ESRI, ArcUser, Oct.-Dec. 2003, pp. 34-36.
"HunchLab: Heat Map and Kernel Density Calculation for Crime Analysis," Azavea Journal, printed from www.azavea.com/blogs/newsletter/v4i4/kernel-density-capabilities-added-to-hunchlab/ on Sep. 9, 2014, 2 pages.
Hur et al., "SciMiner: web-based literature mining tool for target identification and functional enrichment analysis," Bioinformatics 25.6 (2009): pp. 838-840.
IBM, "Determining Business Object Structure," IBM, 2004, 9 pages.
Kahan et al., "Annotea: an Open RDF Infrastructure for Shared Web Annotations", Computer Networks, Elsevier Science Publishers B.V., vol. 39, No. 5, dated Aug. 5, 2002, pp. 589-608.
Keylines.com, "An Introduction to KeyLines and Network Visualization," Mar. 2014, <http://keylines.com/wp-content/uploads/2014/03/KeyLines-White-Paper.pdf> downloaded May 12, 2014 in 8 pages.
Keylines.com, "KeyLines Datasheet," Mar. 2014, <http://keylines.com/wp-content/uploads/2014/03/KeyLines-datasheet.pdf> downloaded May 12, 2014 in 2 pages.
Keylines.com, "Visualizing Threats: Improved Cyber Security Through Network Visualization," Apr. 2014, <http://keylines.com/wp-content/uploads/2014/04/Visualizing-Threats1.pdf> downloaded May 12, 2014 in 10 pages.
Kitts, Paul, "Chapter 14: Genome Assembly and Annotation Process," The NCBI Handbook, Oct. 2002, pp. 1-21.
Kontagent Mobile Analytics, <http://www.kontagent.com/> Printed Jul. 18, 2013 in 9 pages.
Li et al., "Interactive Multimodal Visual Search on Mobile Device," IEEE Transactions on Multimedia, vol. 15, No. 3, Apr. 1, 2013, pp. 594-607.
Liu, Tianshun, "Combining GIS and the Huff Model to Analyze Suitable Locations for a New AsianSupermarket in the Minneapolis and St. Paul, Minnesota USA," Papers in Resource Analysis, 2012, vol. 14, pp. 8.
Localytics—Mobile App Marketing & Analytics, <http://www.localytics.com/> Printed Jul. 18, 2013 in 12 pages.
Madden, Tom, "Chapter 16: The BLAST Sequence Analysis Tool," The NCBI Handbook, Oct. 2002, pp. 1-15.
Manno et al., "Introducing Collaboration in Single-user Applications through the Centralized Control Architecture," 2010, pp. 10.
Manske, "File Saving Dialogs," <http://www.mozilla.org/editor/ui_specs/FileSaveDialogs.html>, Jan. 20, 1999, pp. 7.
Map of San Jose, CA. Retrieved Oct. 2, 2013 from http://maps.yahoo.com.
Map of San Jose, CA. Retrieved Oct. 2, 2013 from http://maps.bing.com.
Map of San Jose, CA. Retrieved Oct. 2, 2013 from http://maps.google.com.
Microsoft—Developer Network, "Getting Started with VBA in Word 2010," Apr. 2010, <http://msdn.microsoft.com/en-us/library/ff604039%28v=office.14%29.aspx> as printed Apr. 4, 2014 in 17 pages.
Microsoft Office—Visio, "About connecting shapes," <http://office.microsoft.com/en-us/visio-help/about-connecting-shapes-HP085050369.aspx> printed Aug. 4, 2011 in 6 pages.
Microsoft Office—Visio, "Add and glue connectors with the Connector tool," <http://office.microsoft.com/en-us/visio-help/add-and-glue-connectors-with-the-connector-tool-HA010048532.aspx?CTT=1> printed Aug. 4, 2011 in 1 page.
Mixpanel—Mobile Analytics, <https://mixpanel.com/> Printed Jul. 18, 2013 in 13 pages.
Mizrachi, Ilene, "Chapter 1: GenBank: The Nuckeotide Sequence Database," The NCBI Handbook, Oct. 2002, pp. 1-14.
"Money Laundering Risks and E-Gaming: A European Overview and Assessment," 2009, http://www.cf.ac.uk/socsi/resources/Levi_Final_Money_Laundering_Risks_egaming.pdf.
Nierman, "Evaluating Structural Similarity in XML Documents", 6 pages, 2002.
Nolan et al., "MCARTA: A Malicious Code Automated Run-Time Analysis Framework," Homeland Security, 2012 IEEE Conference on Technologies for, Nov. 13, 2012, pp. 13-17.
Olanoff, Drew, "Deep Dive with the New Google Maps for Desktop with Google Earth Integration, It's More than Just a Utility," May 15, 2013, pp. 1-6, retrieved from the internet: http://web.archive.org/web/20130515230641/http://techcrunch.com/2013/05/15/deep-dive-with-the-new-google-maps-for-desktop-with-google-earth-integration-its-more-than-just-a-utility/.
Open Web Analytics (OWA), <http://www.openwebanalytics.com/> Printed Jul. 19, 2013 in 5 pages.
Palantir Technologies, "Palantir Labs—Timeline," Oct. 1, 2010, retrieved from the internet https://www.youtube.com/watch?v=JCgDW5bru9M.
Palmas et al., "An Edge-Bunding Layout for Interactive Parallel Coordinates" 2014 IEEE Pacific Visualization Symposium, pp. 57-64.

(56) References Cited

OTHER PUBLICATIONS

Perdisci et al., "Behavioral Clustering of HTTP-Based Malware and Signature Generation Using Malicious Network Traces," USENIX, Mar. 18, 2010, pp. 1-14.
Piwik—Free Web Analytics Software. <http://piwik.org/> Printed Jul. 19, 2013 in18 pages.
"Potential Money Laundering Warning Signs," snapshot taken 2003, https://web.archive.org/web/20030816090055/http://finsolinc.com/ANTI-MONEY%20LAUNDERING%20TRAINING%20GUIDES.pdf.
Quest, "Toad for Oracle 11.6—Guide to Using Toad," Sep. 24, 2012, pp. 1-162.
"Refresh CSS Ellipsis When Resizing Container—Stack Overflow," Jul. 31, 2013, retrieved frominternet http://stackoverflow.com/questions/17964681/refresh-css-ellipsis-when-resizing-container, retrieved on May 18, 2015.
Rouse, Margaret, "OLAP Cube," <http://searchdatamanagement.techtarget.com/definition/OLAP-cube>, Apr. 28, 2012, pp. 16.
"SAP BusinessObjects Explorer Online Help," Mar. 19, 2012, retrieved on Apr. 21, 2016 http://help.sap.com/businessobject/product_guides/boexir4/en/xi4_exp_user_en.pdf.
Shi et al., "A Scalable Implementation of Malware Detection Based on Network Connection Behaviors," 2013 International Conference on Cyber-Enabled Distributed Computing and Knowledge Discovery, IEEE, Oct. 10, 2013, pp. 59-66.
Sigrist, et al., "PROSITE, a Protein Domain Database for Functional Characterization and Annotation," Nucleic Acids Research, 2010, vol. 38, pp. D161-D166.
Sirotkin et al., "Chapter 13: The Processing of Biological Sequence Data at NCBI," The NCBI Handbook, Oct. 2002, pp. 1-11.
StatCounter—Free Invisible Web Tracker, Hit Counter and Web Stats, <http://statcounter.com/> Printed Jul. 19, 2013 in 17 pages.
Symantec Corporation, "E-Security Begins with Sound Security Policies," Announcement Symantec, Jun. 14, 2001.
TestFlight—Beta Testing On The Fly, <http://testflightapp.com/> Printed Jul. 18, 2013 in 3 pages.
Thompson, Mick, "Getting Started with GEO," Getting Started with GEO, Jul. 26, 2011.
trak.io, <http://trak.io/> printed Jul. 18, 2013 in 3 pages.
Umagandhi et al., "Search Query Recommendations Using Hybrid User Profile with Query Logs," International Journal of Computer Applications, vol. 80, No. 10, Oct. 1, 2013, pp. 7-18.
UserMetrix, <http://usermetrix.com/android-analytics> printed Jul. 18, 2013 in 3 pages.
"Using Whois Based Geolocation and Google Maps API for Support Cybercrime Investigations," http://wseas.us/e-library/conferences/2013/Dubrovnik/TELECIRC/TELECIRC-32.pdf.
Valentini et al., "Ensembles of Learning Machines", M. Marinaro and R. Tagliaferri (Eds.): Wirn Vietri 2002, LNCS 2486, pp. 3-20.
Vose et al., "Help File for ModelRisk Version 5," 2007, Vose Software, pp. 349-353. [Uploaded in 2 Parts].
Wang et al., "Research on a Clustering Data De-Duplication Mechanism Based on Bloom Filter," IEEE 2010, 5 pages.
Wikipedia, "Federated Database System," Sep. 7, 2013, retrieved from the internet on Jan. 27, 2015 http://en.wikipedia.org/w/index.php?title=Federated_database_system&oldid=571954221.
Wikipedia, "Multimap," Jan. 1, 2013, https://en.wikipedia.org/w/index.php?title=Multimap&oldid=530800748.
Wikipedia, "Mobile Web," Jan. 23, 2015, retrieved from the internet on Mar. 15, 2016 https://en.wikipedia.org/w/index.php?title=Mobile_Web&oldid=643800164.
Winkler, William E., "Bureau of the Census Statistical Research Division Record Linkage Software and Methods for Merging Administrative Lists," Statistical Research Report Series No. RR2001/03, Jul. 23, 2001, https://www.census.gov/srd/papers/pdf/rr2001-03.pdf, retrieved on Mar. 9, 2016.
Wright et al., "Palantir Technologies VAST 2010 Challenge Text Records _ Investigations into Arms Dealing," Oct. 29, 2010, pp. 1-10.
Yang et al., "HTML Page Analysis Based on Visual Cues", A129, pp. 859-864, 2001.
Zheng et al., "Goeast: a web-based software toolkit for Gene Ontology enrichment analysis," Nucleic acids research 36.suppl 2 (2008): pp. W385-W363.
Notice of Acceptance for Australian Patent Application No. 2014250678 dated Oct. 7, 2015.
Notice of Allowance for U.S. Appl. No. 12/556,318 dated Nov. 2, 2015.
Notice of Allowance for U.S. Appl. No. 13/247,987 dated Mar. 17, 2016.
Notice of Allowance for U.S. Appl. No. 14/102,394 dated Aug. 25, 2014.
Notice of Allowance for U.S. Appl. No. 14/108,187 dated Aug. 29, 2014.
Notice of Allowance for U.S. Appl. No. 14/135,289 dated Oct. 14, 2014.
Notice of Allowance for U.S. Appl. No. 14/148,568 dated Aug. 26, 2015.
Notice of Allowance for U.S. Appl. No. 14/192,767 dated Dec. 16, 2014.
Notice of Allowance for U.S. Appl. No. 14/192,767 dated Apr. 20, 2015.
Notice of Allowance for U.S. Appl. No. 14/225,084 dated May 4, 2015.
Notice of Allowance for U.S. Appl. No. 14/268,964 dated Dec. 3, 2014.
Notice of Allowance for U.S. Appl. No. 14/294,098 dated Dec. 29, 2014.
Notice of Allowance for U.S. Appl. No. 14/319,161 dated May 4, 2015.
Notice of Allowance for U.S. Appl. No. 14/323,935 dated Oct. 1, 2015.
Notice of Allowance for U.S. Appl. No. 14/326,738 dated Nov. 18, 2015.
Notice of Allowance for U.S. Appl. No. 14/451,221 dated Aug. 4, 2015.
Notice of Allowance for U.S. Appl. No. 14/473,552 dated Jul. 24, 2015.
Notice of Allowance for U.S. Appl. No. 14/473,860 dated Feb. 27, 2015.
Notice of Allowance for U.S. Appl. No. 14/473,860 dated Jan. 5, 2015.
Notice of Allowance for U.S. Appl. No. 14/479,863 dated Mar. 31, 2015.
Notice of Allowance for U.S. Appl. No. 14/483,527 dated Apr. 29, 2016.
Notice of Allowance for U.S. Appl. No. 14/486,991 dated May 1, 2015.
Notice of Allowance for U.S. Appl. No. 14/504,103 dated May 18, 2015.
Notice of Allowance for U.S. Appl. No. 14/552,336 dated Nov. 3, 2015.
Notice of Allowance for U.S. Appl. No. 14/579,752 dated Apr. 4, 2016.
Notice of Allowance for U.S. Appl. No. 14/616,080 dated Apr. 2, 2015.
Notice of Allowance for U.S. Appl. No. 14/676,621 dated Feb. 10, 2016.
Notice of Allowance for U.S. Appl. No. 14/746,671 dated Jan. 21, 2016.
Notice of Allowance for U.S. Appl. No. 14/858,647 dated Mar. 4, 2016.
Notice of Allowance for U.S. Appl. No. 15/398,113 dated Jun. 30, 2017.
Official Communication for Australian Patent Application No. 2014201511 dated Feb. 27, 2015.
Official Communication for Australian Patent Application No. 2014202442 dated Mar. 19, 2015.
Official Communication for Australian Patent Application No. 2014210604 dated Jun. 5, 2015.
Official Communication for Australian Patent Application No. 2014210614 dated Jun. 5, 2015.

(56) References Cited

OTHER PUBLICATIONS

Official Communication for Australian Patent Application No. 2014213553 dated May 7, 2015.
Official Communication for Australian Patent Application No. 2014250678 dated Jun. 17, 2015.
Official Communication for European Patent Application No. 14158861.6 dated Jun. 16, 2014.
Official Communication for European Patent Application No. 14159464.8 dated Jul. 31, 2014.
Official Communication for European Patent Application No. 14180142.3 dated Feb. 6, 2015.
Official Communication for European Patent Application No. 14180281.9 dated Jan. 26, 2015.
Official Communication for European Patent Application No. 14180321.3 dated Apr. 17, 2015.
Official Communication for European Patent Application No. 14180432.8 dated Jun. 23, 2015.
Official Communication for European Patent Application No. 14186225.0 dated Feb. 13, 2015.
Official Communication for European Patent Application No. 14187739.9 dated Jul. 6, 2015.
Official Communication for European Patent Application No. 14187996.5 dated Feb. 12, 2015.
Official Communication for European Patent Application No. 14187996.5 dated Feb. 19, 2016.
Official Communication for European Patent Application No. 14189344.6 dated Feb. 20, 2015.
Official Communication for European Patent Application No. 14189344.6 dated Feb. 29, 2016.
Official Communication for European Patent Application No. 14189347.9 dated Mar. 4, 2015.
Official Communication for European Patent Application No. 14189802.3 dated May 11, 2015.
Official Communication for European Patent Application No. 14191540.5 dated May 27, 2015.
Official Communication for European Patent Application No. 14197879.1 dated Apr. 28, 2015.
Official Communication for European Patent Application No. 14197895.7 dated Apr. 28, 2015.
Official Communication for European Patent Application No. 14197938.5 dated Apr. 28, 2015.
Official Communication for European Patent Application No. 14199182.8 dated Mar. 13, 2015.
Official Communication for European Patent Application No. 14200246.8 dated May 29, 2015.
Official Communication for European Patent Application No. 14200298.9 dated May 13, 2015.
Official Communication for European Patent Application No. 15155845.9 dated Oct. 6, 2015.
Official Communication for European Patent Application No. 15155846.7 dated Jul. 8, 2015.
Official Communication for European Patent Application No. 15165244.3 dated Aug. 27, 2015.
Official Communication for European Patent Application No. 15175106.2 dated Nov. 5, 2015.
Official Communication for European Patent Application No. 15175151.8 dated Nov. 25, 2015.
Official Communication for European Patent Application No. 15181419.1 dated Sep. 29, 2015.
Official Communication for European Patent Application No. 15183721.8 dated Nov. 23, 2015.
Official Communication for European Patent Application No. 15184764.7 dated Dec. 14, 2015.
Official Communication for European Patent Application No. 15200073.3 dated Mar. 30, 2016.
Official Communication for European Patent Application No. 15201924.6 dated Apr. 25, 2016.
Official Communication for European Patent Application No. 15202919.5 dated May 9, 2016.
Official Communication for European Patent Application No. 16152984.7 dated Mar. 24, 2016.
Official Communication for Great Britain Patent Application No. 1404457.2 dated Aug. 14, 2014.
Official Communication for Great Britain Patent Application No. 1404486.1 dated May 21, 2015.
Official Communication for Great Britain Patent Application No. 1404486.1 dated Aug. 27, 2014.
Official Communication for Great Britain Patent Application No. 1404489.5 dated May 21, 2015.
Official Communication for Great Britain Patent Application No. 1404489.5 dated Aug. 27, 2014.
Official Communication for Great Britain Patent Application No. 1404499.4 dated Jun. 11, 2015.
Official Communication for Great Britain Patent Application No. 1404499.4 dated Aug. 20, 2014.
Official Communication for Great Britain Patent Application No. 1404574.4 dated Dec. 18, 2014.
Official Communication for Great Britain Patent Application No. 1408025.3 dated Nov. 6, 2014.
Official Communication for Great Britain Patent Application No. 1411984.6 dated Dec. 22, 2014.
Official Communication for Great Britain Patent Application No. 1413935.6 dated Jan. 27, 2015.
Official Communication for Netherlands Patent Application No. 2012417 dated Sep. 18, 2015.
Official Communication for Netherlands Patent Application No. 2012421 dated Sep. 18, 2015.
Official Communication for Netherlands Patent Application No. 2012437 dated Sep. 18, 2015.
Official Communication for Netherlands Patent Application No. 2012438 dated Sep. 21, 2015.
Official Communication for Netherlands Patent Application No. 2013306 dated Apr. 24, 2015.
Official Communication for New Zealand Patent Application No. 622473 dated Jun. 19, 2014.
Official Communication for New Zealand Patent Application No. 622473 dated Mar. 27, 2014.
Official Communication for New Zealand Patent Application No. 622513 dated Apr. 3, 2014.
Official Communication for New Zealand Patent Application No. 622517 dated Apr. 3, 2014.
Official Communication for New Zealand Patent Application No. 624557 dated May 14, 2014.
Official Communication for New Zealand Patent Application No. 627962 dated Aug. 5, 2014.
Official Communication for New Zealand Patent Application No. 628161 dated Aug. 25, 2014.
Official Communication for New Zealand Patent Application No. 628263 dated Aug. 12, 2014.
Official Communication for New Zealand Patent Application No. 628495 dated Aug. 19, 2014.
Official Communication for New Zealand Patent Application No. 628585 dated Aug. 26, 2014.
Official Communication for New Zealand Patent Application No. 628840 dated Aug. 28, 2014.
Official Communication for U.S. Appl. No. 12/556,318 dated Jul. 2, 2015.
Official Communication for U.S. Appl. No. 13/247,987 dated Apr. 2, 2015.
Official Communication for U.S. Appl. No. 13/247,987 dated Sep. 22, 2015.
Official Communication for U.S. Appl. No. 13/827,491 dated Dec. 1, 2014.
Official Communication for U.S. Appl. No. 13/827,491 dated Jun. 22, 2015.
Official Communication for U.S. Appl. No. 13/827,491 dated Mar. 30, 2016.
Official Communication for U.S. Appl. No. 13/827,491 dated Oct. 9, 2015.
Official Communication for U.S. Appl. No. 13/831,791 dated Feb. 11, 2016.

(56) References Cited

OTHER PUBLICATIONS

Official Communication for U.S. Appl. No. 13/831,791 dated Mar. 4, 2015.
Official Communication for U.S. Appl. No. 13/831,791 dated Aug. 6, 2015.
Official Communication for U.S. Appl. No. 13/835,688 dated Jun. 17, 2015.
Official Communication for U.S. Appl. No. 13/835,688 dated Sep. 30, 2015.
Official Communication for U.S. Appl. No. 13/839,026 dated Aug. 4, 2015.
Official Communication for U.S. Appl. No. 14/102,394 dated Mar. 27, 2014.
Official Communication for U.S. Appl. No. 14/108,187 dated Apr. 17, 2014.
Official Communication for U.S. Appl. No. 14/108,187 dated Mar. 20, 2014.
Official Communication for U.S. Appl. No. 14/134,558 dated Oct. 7, 2015.
Official Communication for U.S. Appl. No. 14/135,289 dated Apr. 16, 2014.
Official Communication for U.S. Appl. No. 14/135,289 dated Jul. 7, 2014.
Official Communication for U.S. Appl. No. 14/141,252 dated Apr. 14, 2016.
Official Communication for U.S. Appl. No. 14/141,252 dated Oct. 8, 2015.
Official Communication for U.S. Appl. No. 14/148,568 dated Oct. 22, 2014.
Official Communication for U.S. Appl. No. 14/148,568 dated Mar. 26, 2015.
Official Communication for U.S. Appl. No. 14/148,568 dated Mar. 27, 2014.
Official Communication for U.S. Appl. No. 14/192,767 dated Sep. 24, 2014.
Official Communication for U.S. Appl. No. 14/192,767 dated May 6, 2014.
Official Communication for U.S. Appl. No. 14/196,814 dated Aug. 13, 2014.
Official Communication for U.S. Appl. No. 14/196,814 dated May 5, 2015.
Official Communication for U.S. Appl. No. 14/196,814 dated Oct. 7, 2015.
Official Communication for U.S. Appl. No. 14/225,006 dated Sep. 10, 2014.
Official Communication for U.S. Appl. No. 14/225,006 dated Sep. 2, 2015.
Official Communication for U.S. Appl. No. 14/225,006 dated Dec. 21, 2015.
Official Communication for U.S. Appl. No. 14/225,006 dated Feb. 27, 2015.
Official Communication for U.S. Appl. No. 14/225,084 dated Sep. 11, 2015.
Official Communication for U.S. Appl. No. 14/225,084 dated Sep. 2, 2014.
Official Communication for U.S. Appl. No. 14/225,084 dated Feb. 20, 2015.
Official Communication for U.S. Appl. No. 14/225,084 dated Feb. 26, 2016.
Official Communication for U.S. Appl. No. 14/225,084 dated Jan. 4, 2016.
Official Communication for U.S. Appl. No. 14/225,160 dated Feb. 11, 2015.
Official Communication for U.S. Appl. No. 14/225,160 dated Aug. 12, 2015.
Official Communication for U.S. Appl. No. 14/225,160 dated Jun. 16, 2016.
Official Communication for U.S. Appl. No. 14/225,160 dated May 20, 2015.
Official Communication for U.S. Appl. No. 14/225,160 dated Apr. 22, 2016.
Official Communication for U.S. Appl. No. 14/225,160 dated Oct. 22, 2014.
Official Communication for U.S. Appl. No. 14/225,160 dated Jan. 25, 2016.
Official Communication for U.S. Appl. No. 14/225,160 dated Jul. 29, 2014.
Official Communication for U.S. Appl. No. 14/268,964 dated Jul. 11, 2014.
Official Communication for U.S. Appl. No. 14/268,964 dated Sep. 3, 2014.
Official Communication for U.S. Appl. No. 14/289,596 dated Jul. 18, 2014.
Official Communication for U.S. Appl. No. 14/289,596 dated Jan. 26, 2015.
Official Communication for U.S. Appl. No. 14/289,596 dated Apr. 30, 2015.
Official Communication for U.S. Appl. No. 14/289,596 dated Aug. 5, 2015.
Official Communication for U.S. Appl. No. 14/289,599 dated Jul. 22, 2014.
Official Communication for U.S. Appl. No. 14/289,599 dated May 29, 2015.
Official Communication for U.S. Appl. No. 14/289,599 dated Sep. 4, 2015.
Official Communication for U.S. Appl. No. 14/294,098 dated Aug. 15, 2014.
Official Communication for U.S. Appl. No. 14/294,098 dated Nov. 6, 2014.
Official Communication for U.S. Appl. No. 14/306,138 dated Sep. 14, 2015.
Official Communication for U.S. Appl. No. 14/306,138 dated Mar. 17, 2016.
Official Communication for U.S. Appl. No. 14/306,138 dated Feb. 18, 2015.
Official Communication for U.S. Appl. No. 14/306,138 dated Sep. 23, 2014.
Official Communication for U.S. Appl. No. 14/306,138 dated Dec. 24, 2015.
Official Communication for U.S. Appl. No. 14/306,138 dated May 26, 2015.
Official Communication for U.S. Appl. No. 14/306,138 dated Dec. 3, 2015.
Official Communication for U.S. Appl. No. 14/306,147 dated Feb. 19, 2015.
Official Communication for U.S. Appl. No. 14/306,147 dated Dec. 24, 2015.
Official Communication for U.S. Appl. No. 14/306,147 dated Aug. 7, 2015.
Official Communication for U.S. Appl. No. 14/306,147 dated Sep. 9, 2014.
Official Communication for U.S. Appl. No. 14/306,154 dated Feb. 1, 2016.
Official Communication for U.S. Appl. No. 14/306,154 dated Mar. 11, 2015.
Official Communication for U.S. Appl. No. 14/306,154 dated May 15, 2015.
Official Communication for U.S. Appl. No. 14/306,154 dated Nov. 16, 2015.
Official Communication for U.S. Appl. No. 14/306,154 dated Mar. 17, 2016.
Official Communication for U.S. Appl. No. 14/306,154 dated Jul. 6, 2015.
Official Communication for U.S. Appl. No. 14/306,154 dated Sep. 9, 2014.
Official Communication for U.S. Appl. No. 14/319,161 dated Jan. 23, 2015.
Official Communication for U.S. Appl. No. 14/319,765 dated Feb. 1, 2016.
Official Communication for U.S. Appl. No. 14/319,765 dated Sep. 10, 2015.

(56) References Cited

OTHER PUBLICATIONS

Official Communication for U.S. Appl. No. 14/319,765 dated Jun. 16, 2015.
Official Communication for U.S. Appl. No. 14/319,765 dated Nov. 25, 2014.
Official Communication for U.S. Appl. No. 14/319,765 dated Feb. 4, 2015.
Official Communication for U.S. Appl. No. 14/323,935 dated Jun. 22, 2015.
Official Communication for U.S. Appl. No. 14/323,935 dated Nov. 28, 2014.
Official Communication for U.S. Appl. No. 14/323,935 dated Mar. 31, 2015.
Official Communication for U.S. Appl. No. 14/326,738 dated Dec. 2, 2014.
Official Communication for U.S. Appl. No. 14/326,738 dated Jul. 31, 2015.
Official Communication for U.S. Appl. No. 14/326,738 dated Mar. 31, 2015.
Official Communication for U.S. Appl. No. 14/451,221 dated Oct. 21, 2014.
Official Communication for U.S. Appl. No. 14/451,221 dated Apr. 6, 2015.
Official Communication for U.S. Appl. No. 14/463,615 dated Sep. 10, 2015.
Official Communication for U.S. Appl. No. 14/463,615 dated Nov. 13, 2014.
Official Communication for U.S. Appl. No. 14/463,615 dated May 21, 2015.
Official Communication for U.S. Appl. No. 14/463,615 dated Jan. 28, 2015.
Official Communication for U.S. Appl. No. 14/463,615 dated Dec. 9, 2015.
Official Communication for U.S. Appl. No. 14/473,552 dated Feb. 24, 2015.
Official Communication for U.S. Appl. No. 14/473,860 dated Nov. 4, 2014.
Official Communication for U.S. Appl. No. 14/479,863 dated Dec. 26, 2014.
Official Communication for U.S. Appl. No. 14/483,527 dated Jun. 22, 2015.
Official Communication for U.S. Appl. No. 14/483,527 dated Jan. 28, 2015.
Official Communication for U.S. Appl. No. 14/483,527 dated Oct. 28, 2015.
Official Communication for U.S. Appl. No. 14/486,991 dated Mar. 10, 2015.
Official Communication for U.S. Appl. No. 14/490,612 dated Aug. 18, 2015.
Official Communication for U.S. Appl. No. 14/490,612 dated Jan. 27, 2015.
Official Communication for U.S. Appl. No. 14/490,612 dated Mar. 31, 2015.
Official Communication for U.S. Appl. No. 14/504,103 dated Mar. 31, 2015.
Official Communication for U.S. Appl. No. 14/504,103 dated Feb. 5, 2015.
Official Communication for U.S. Appl. No. 14/552,336 dated Jul. 20, 2015.
Official Communication for U.S. Appl. No. 14/562,524 dated Nov. 10, 2015.
Official Communication for U.S. Appl. No. 14/562,524 dated Sep. 14, 2015.
Official Communication for U.S. Appl. No. 14/571,098 dated Nov. 10, 2015.
Official Communication for U.S. Appl. No. 14/571,098 dated Mar. 11, 2015.
Official Communication for U.S. Appl. No. 14/571,098 dated Feb. 23, 2016.
Official Communication for U.S. Appl. No. 14/571,098 dated Aug. 24, 2015.
Official Communication for U.S. Appl. No. 14/571,098 dated Aug. 5, 2015.
Official Communication for U.S. Appl. No. 14/579,752 dated Aug. 19, 2015.
Official Communication for U.S. Appl. No. 14/579,752 dated May 26, 2015.
Official Communication for U.S. Appl. No. 14/579,752 dated Dec. 9, 2015.
Official Communication for U.S. Appl. No. 14/631,633 dated Sep. 10, 2015.
Official Communication for U.S. Appl. No. 14/631,633 dated Feb. 3, 2016.
Official Communication for U.S. Appl. No. 14/639,606 dated Oct. 16, 2015.
Official Communication for U.S. Appl. No. 14/639,606 dated May 18, 2015.
Official Communication for U.S. Appl. No. 14/639,606 dated Jul. 24, 2015.
Official Communication for U.S. Appl. No. 14/639,606 dated Apr. 5, 2016.
Official Communication for U.S. Appl. No. 14/676,621 dated Oct. 29, 2015.
Official Communication for U.S. Appl. No. 14/676,621 dated Jul. 30, 2015.
Official Communication for U.S. Appl. No. 14/726,353 dated Mar. 1, 2016.
Official Communication for U.S. Appl. No. 14/726,353 dated Sep. 10, 2015.
Official Communication for U.S. Appl. No. 14/746,671 dated Nov. 12, 2015.
Official Communication for U.S. Appl. No. 14/746,671 dated Sep. 28, 2015.
Official Communication for U.S. Appl. No. 14/800,447 dated Dec. 10, 2015.
Official Communication for U.S. Appl. No. 14/800,447 dated Mar. 3, 2016.
Official Communication for U.S. Appl. No. 14/813,749 dated Sep. 28, 2015.
Official Communication for U.S. Appl. No. 14/813,749 dated Apr. 8, 2016.
Official Communication for U.S. Appl. No. 14/842,734 dated Nov. 19, 2015.
Official Communication for U.S. Appl. No. 14/929,584 dated May 25, 2016.
Official Communication for U.S. Appl. No. 14/929,584 dated Feb. 4, 2016.
Official Communication for U.S. Appl. No. 15/398,113 dated Feb. 17, 2017.
Restriction Requirement for U.S. Appl. No. 13/839,026 dated Apr. 2, 2015.
Notice of Allowance for U.S. Appl. No. 15/398,113 dated Nov. 21, 2017.
Anonymous, "Persistent data structure—Wikipedia", Aug. 13, 2016, pp. 1-9, Retrieved from the Internet: URL: https://en.wikipedia.org/w/index.php?title=Persistent-data-structure&oldid=734240973, retrieved on Feb. 9, 2018.
Brooks et al., "Hoptrees: Branching History Navigation for Hierarchies," Sep. 2, 2013, Network and Parallel Computing, pp. 316-333.
Driscoll, James et al: "Making Data Structures Persistent", Journal of Computer and System Sciences, vol. 38, Feb. 1, 1989, pp. 86-124.
Karger, David, "Lecture 2: Persistent Data 1-15 Structures, MIT Course on Advanced Algorithms", Sep. 9, 2005, pp. 1-5, Retrieved from the Internet URL: https://ocw.mit.edu/courses/electrical-engineering-and-computer-science/6-854j-advanced-algorithms-fall-2005/lecture-notes /persistent.pdf, retrieved on Feb. 9, 2018.
Official Communication for European Patent Application No. 15202919.5 dated Jun. 12, 2017.
Official Communication for European Patent Application No. 17208655.5 dated Mar. 6, 2018.

(56) References Cited

OTHER PUBLICATIONS

Official Communication for European Patent Application No. 15202919.5 dated May 3, 2018.
Notice of Allowance for U.S. Appl. No. 15/092,964 dated Aug. 13, 2018.
Official Communication for European Patent Application No. 17208655.5 dated Nov. 19, 2020, 7 pages.
Official Communication for European Patent Application No. 17208655.5 dated Dec. 18, 2020, 6 pages.
Official Communication for European Patent Application No. 17208655.5 dated Oct. 19, 2021, 13 pages.
Official Communication for European Patent Application No. 20202243.0 dated Mar. 12, 2021, 10 pages.
Official Communication for European Patent Application No. 20202243.0 dated Feb. 7, 2024, 15 pages.
Armand Ruiz, "Watson Analytics, SPSS Modeler and Esri ArcGIS," available at https://www.youtube.com/watch?v=fk49hw4OrN4, as published on Jul. 28, 2015.
Esri News, "IBM and Esri Team Up to Offer Cognitive Analyrics and IoT in the IBM Cloud," http://www.esri.com/esri-news/releases/16-4qtr/IBM-and-esri-team-up-to-offer-cognitive-analytics-and-iot-in-the-IBM-cloud, as published on Oct. 26, 2016, in 2 pages.
Goyal, Manish, "Announcing our largest release of Watson Developer Cloud services," IBM developerWorks/Developer Centers, posted Sep. 24, 2015 in 6 pages, https://developer.ibm.com/watson/blog/2015/09/24/announcing-our-largest-release-of-watson-developer-cloud-services/.
IBM Analytics Communities, "Creating a map visualization for UK coordinates," https://community.watsonanalytics.com/discussions/questions/3753/creating-a-map-visualisation-for-uk-coordinates.html, as printed Mar. 9, 2017 in 1 page.
IBM Analytics Communities, "Is IBM SPSS statistics now integrated to WatsonAnalytics?" https://community.watsonanalytics.com/discussions/questions/1464/is-ibm-spss-statistics-now-integrated-to-watsonana.html, as printed Mar. 7, 2017 in 2 pages.
IBM Analytics, "IBM SPSS software and Watson Analytics: A powerful combo for the cognitive age," available at https://www.youtube.com/watch?v=AvYctzFf8gc, as published on Apr. 14, 2016.
IBM Knowledge Center, "Merge Node," https://www.IBM.com/support/knowledgecenter/en/SS3RA7_15.0.0/com.IBM.spss.modeler.help/merge_overview.htm[IBM.com], as printed Feb. 14, 2017 in 1 page.
IBM Knowledge Center, "New features in IBM SPSS Modeler Professional," https://www.ibm.com/support/knowledgecenter/en/SS3RA7_15.0.0/com.ibm.spss.modeler.help/whatsnew_features_pro.htm[ibm.com], as printed Feb. 14, 2017 in 2 pages.
IBM Knowledge Center, "Overview—What's new in IBM Watson Explorer Content Analytics Version 10.0," https://www.ibm.com/support/knowledgecenter/en/SS8NLW_10.0.0/com.IBM.discovery.es.nav.doc/iiysawhatsnew.htm, as printed Mar. 6, 2017 in 4 pages.
IBM Predictive Analytics, https://www.ibm.com/analytics/us/en/technology/predictive-analytics/, as printed Feb. 15, 2017 in 12 pages.
IBM SPSS Modeler, https://www.ibm.com/us-en/marketplace/spss-modeler, as printed Feb. 15, 2017 in 5 pages.
IBM Support, "Software lifecycle—Watson Explorer 10.0.0," https://www-01.ibm.com/software/support/lifecycleapp/PLCDetail.wss?q45=T283072T66911H98, as printed Mar. 7, 2017 in 1 page.
Yates, Rob, "Introducing the IBM Watson Natural Language Classifier," IBM developerWorks/DeveloperCenters, posted Jul. 10, 2015 in 4 pages, https://developer.ibm.com/watson/blog/2015/07/10/the-ibm-watson-natural-language-classifier/.
Official Communication for European Patent Application No. 20202243.0 dated May 15, 2023, 9 pages.
U.S. Appl. No. 19/223,472, filed May 30, 2025, Object-Centric Data Analysis System and Associated Graphical User Interfaces.

\* cited by examiner

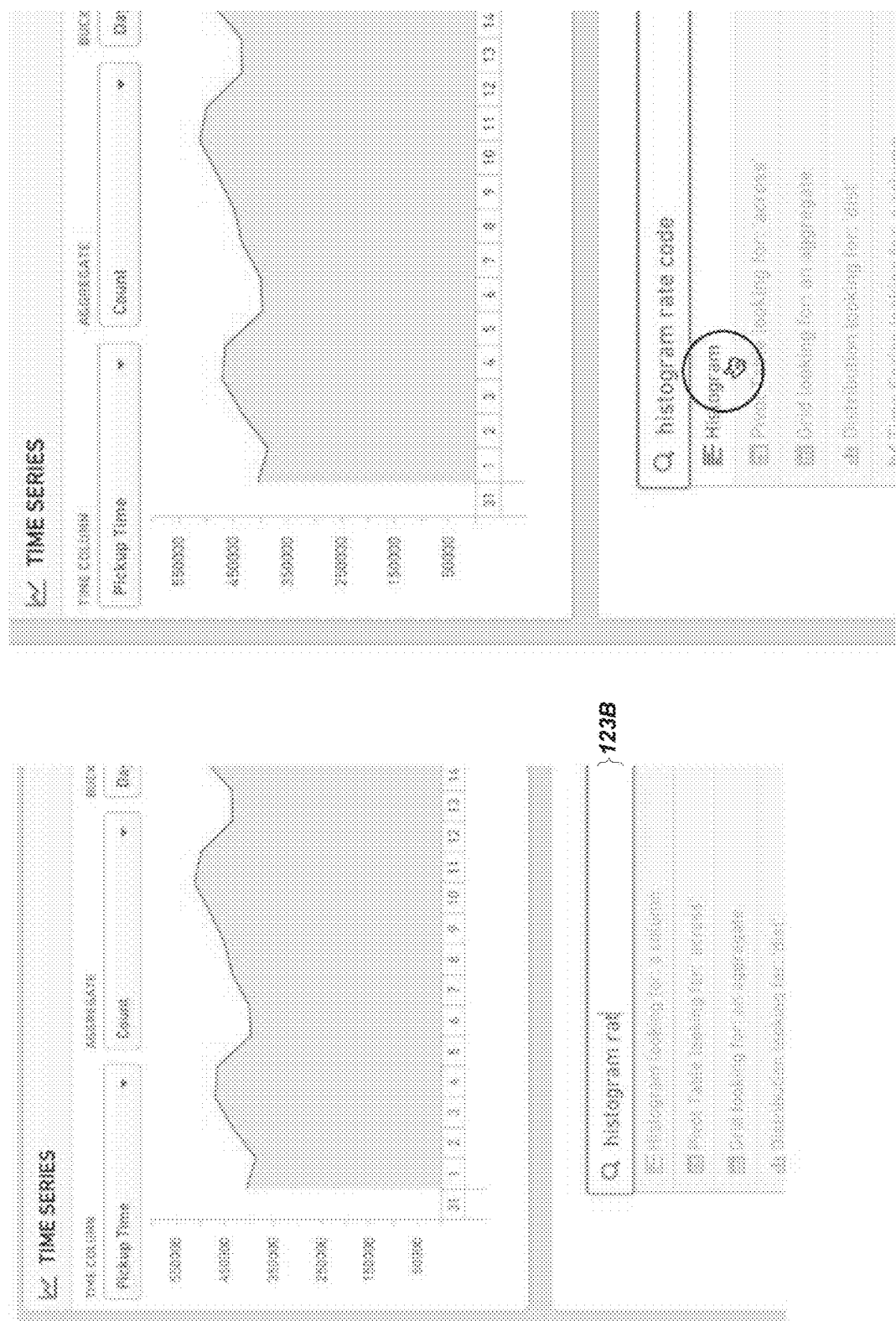

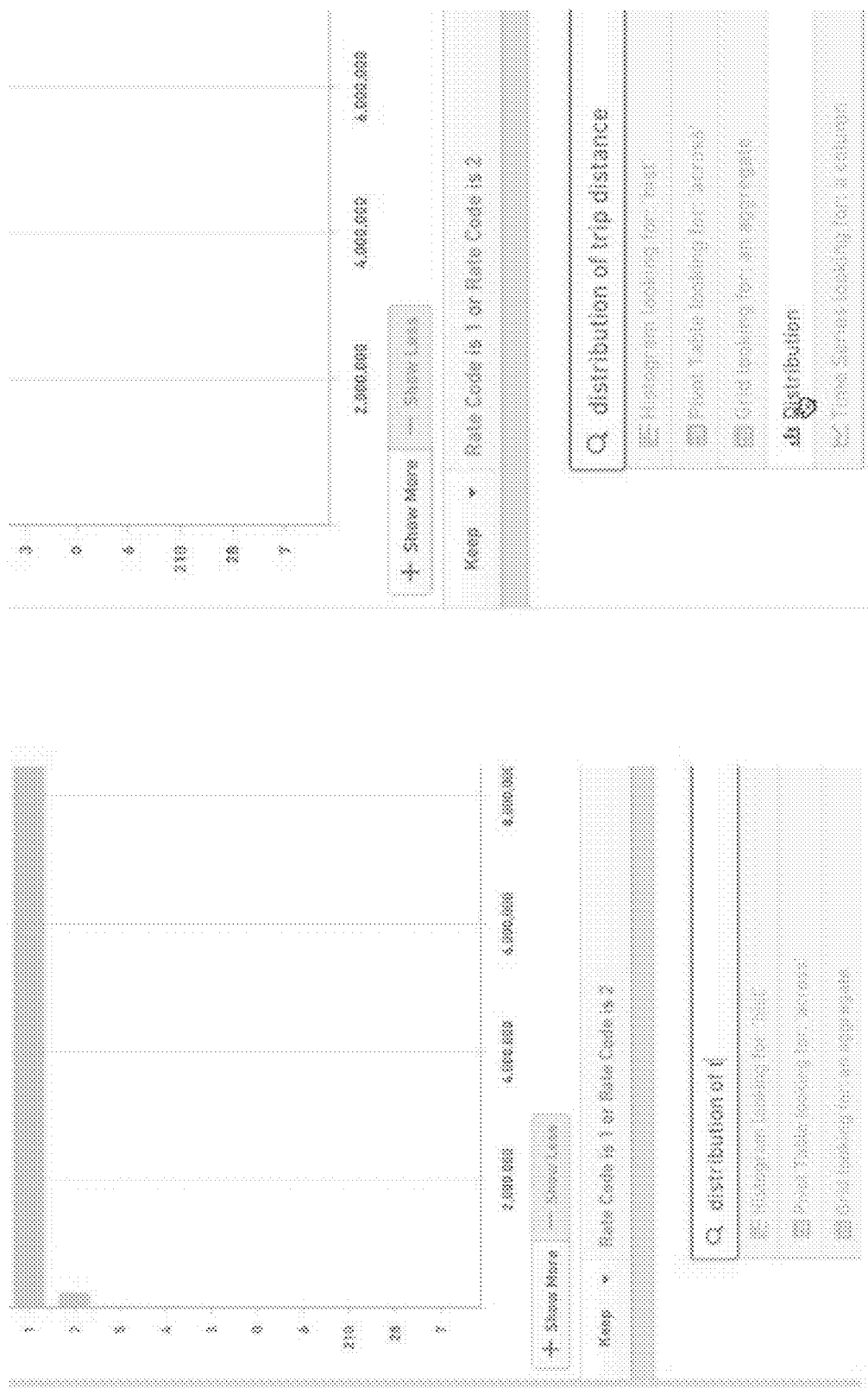

1000

New Analysis | Paths | Report  1002  Open ...

Path of IP Address Analysis
Last updated 11/29/2016 at 5:31PM

1004 — IP Address
600 Rows, 11 Columns

1006 — SUMMARY
600 Rows, 11 Columns

1008 — TABLE
ƒx  Anonymize values in column Type 1
    Rename column Time to GMT Time
    Rename column Dest to Destination IP 1010 — HISTOGRAM
▽ Keep rows where source
  is 65, 50, 40, 90, Or 3 others

1012 — DISTRIBUTION

1014 — Resulting Set
202 Rows, 11 Columns
↶ Saved to test

Create new path

Path of IP Address Analysis
Last updated 11/28/2016 at 5:31PM  Open ...
1020

IP Address
600 Rows, 11 Columns

SUMMARY
600 Rows, 11 Columns

Resulting Set
600 Rows, 11 Columns

CREATE A PATH
Choose a dataset or existing analysis.
⊕ Create new path

1016 — Dataset is out-of-date. Click to rebuild

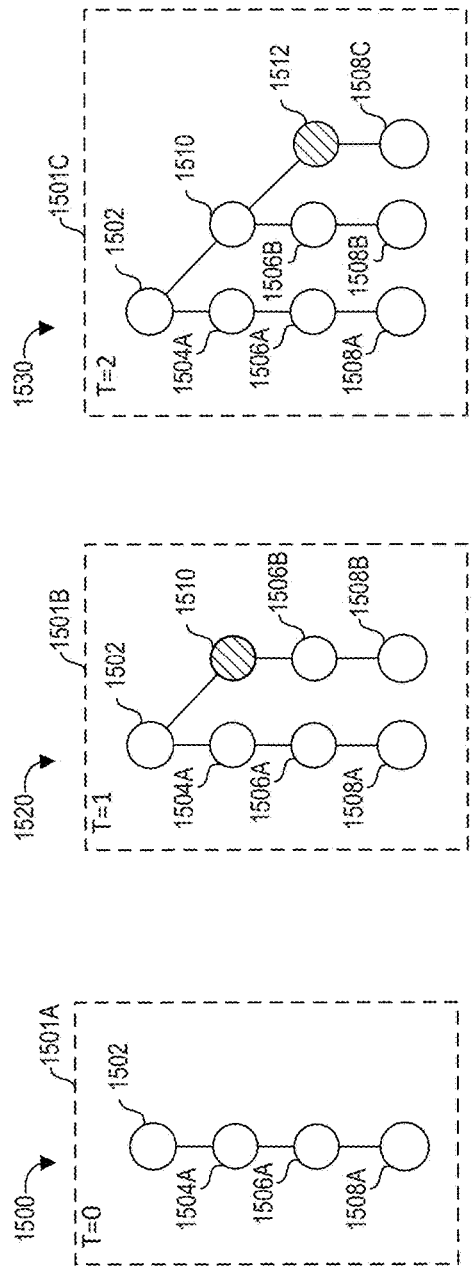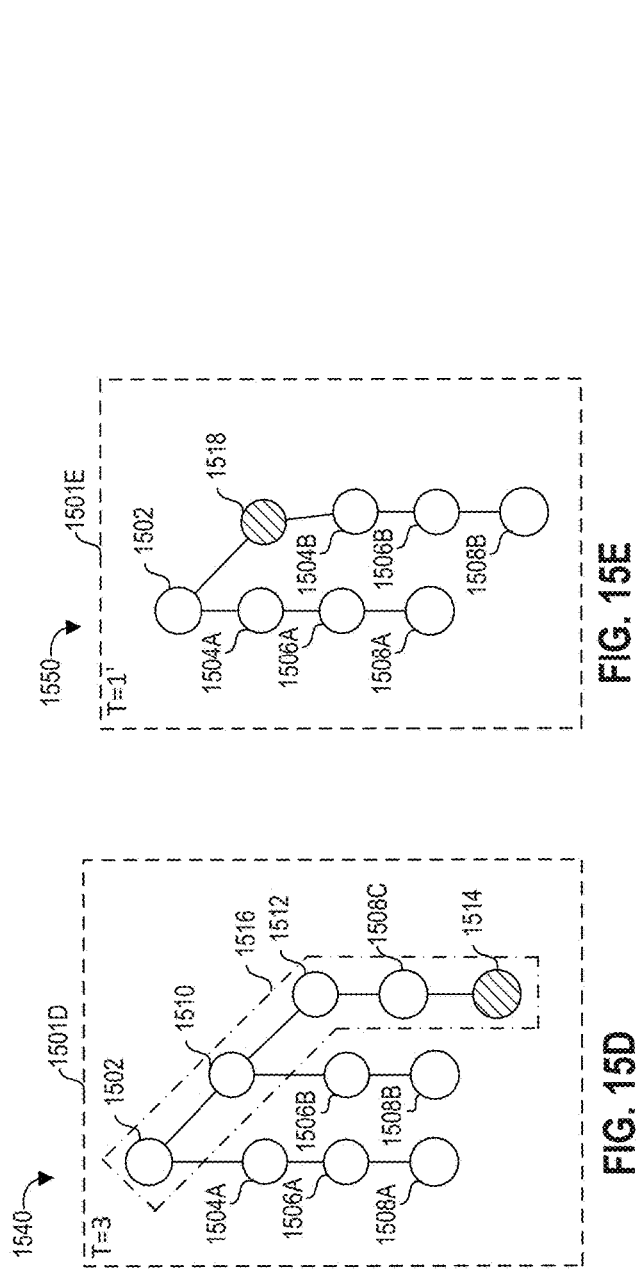
FIG. 15A FIG. 15B FIG. 15C FIG. 15D FIG. 15E

INTERACTIVE USER INTERFACE FOR DYNAMICALLY UPDATING DATA AND DATA ANALYSIS AND QUERY PROCESSING

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application is a continuation-in-part of U.S. patent application Ser. No. 15/092,964, filed on Apr. 7, 2016, which is a continuation of U.S. patent application Ser. No. 14/858,647, filed on Sep. 18, 2015, which claims priority from U.S. Provisional Patent Application No. 62/097,327, filed on Dec. 29, 2014. This application also claims benefit of U.S. Provisional Patent Application Ser. No. 62/436,906 filed Dec. 20, 2016. Each of the above identified applications is hereby incorporated by reference herein in its entirety and for all purposes.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Exploration, mining, and analysis of high-volume data sources and data warehouses can be a time and resource intensive process, both for the user and for the underlying computing systems which provide data analysis features. Large volumes of data contribute to high consumption of computer memory, and processing of such large volumes of data can require extremely powerful computer processors and processing time. Users such as data analysts often face a seemingly insurmountable task of attempting to locate discrete pieces of information from data sources which can include or primarily consist of innocuous or noisy data which provides little probative value. Often, many iterations to explore such data are required, with each iteration having an associated cost in time and resources.

SUMMARY

One embodiment includes a computer-implemented method comprising: receiving, via a user interface, a request to update a first data node, wherein a first data analysis graph comprises the first data node and one or more additional nodes; identifying an active path from the first data analysis graph; generating duplicate one or more additional nodes from the one or more additional nodes and the active path; generating an updated first data node; generating a second data analysis graph comprising the updated first data node and the duplicate one or more additional nodes; and causing presentation of the second data analysis graph in the user interface.

In some embodiments, the computer-implemented method of the preceding paragraph can include a combination or sub-combination of features. The one or more additional nodes can correspond to a user interface visualization and can comprise at least one of: a summary node, a table node, a histogram node, a distribution node, a time series node, a grid node, a heatmap node, a pivot table node, a filter node, a column editor node, an enrich node, a link node, a set math node, or an export node. The computer-implemented method can further comprise identifying, in the first data analysis graph, a parent node of the first data node; and generating a link between the parent node and the updated first data node. The one or more additional nodes can comprise at least two linked nodes according to a first order, the computer-implemented method can further comprise: generating a first link between the updated first data node and the duplicate one or more additional nodes; and generating, according to the first order, a second link between the duplicate one or more additional nodes comprising at least two nodes. Identifying the active path can comprise: accessing historical user interaction data associated with the first data analysis graph; identifying, from the historical user interaction data, a current node from the first data analysis graph; and identifying, as the active path, one or more nodes from the first data analysis graph based at least in part on a dependency of the current node.

Another embodiment includes a non-transitory computer storage medium storing computer executable instructions that when executed by a computer hardware processor perform operations comprising: retrieving a first data analysis graph comprising a plurality of nodes; identifying an active path from the first data analysis graph; generating duplicate one or more additional nodes from the plurality of nodes and the active path; identifying, from the duplicate one or more additional nodes and the plurality of nodes, an insertion point between a first data node and a second data node; generating a third data node; generating a second data analysis graph comprising the first data node, the third data node, and the second data node; and causing presentation of the second data analysis graph in a user interface.

In some embodiments, the non-transitory computer storage medium of the preceding paragraph can include a combination or sub-combination of features. The operations can further comprise: receiving a node insertion request comprising data corresponding to the insertion point; generating a first link between the first data node and the third data node as indicated by the insertion point; and generating a second link between the third data node and the second data node as indicated by the insertion point. The plurality of nodes can comprise the first node and the duplicate one or additional nodes can comprise the second node. Identifying the active path can comprise: accessing historical user interaction data associated with the first data analysis graph; identifying, from the historical user interaction data, a current node from the first data analysis graph; and identifying, as the active path, one or more nodes from the first data analysis graph based at least in part on a dependency of the current node. The operations can further comprise: identifying a non-transformation node from the active path; identifying, from the active path, subset of nodes that excludes the non-transformation node; identifying an abridged data analysis graph as the subset of nodes; and causing presentation of the abridged data analysis graph in a user interface. Identifying the non-transformation node from the active path can further comprises: determining a node type from a node in the active path; determining that the node type corresponds to a non-transformation node type. Presentation of the second data analysis graph can comprise a workflow visualization.

Another embodiment includes a computer system comprising: one or more computer processors configured to execute software code to: retrieve a first data analysis graph comprising a first data node and one or more additional nodes; identify an active path from the first data analysis graph; generate duplicate one or more additional nodes from the one or more additional nodes and the active path; generate an updated first data node; generate a second data analysis graph comprising the updated first data node and the duplicate one or more additional nodes; and cause presentation of the second data analysis graph in a user interface.

In some embodiments, the computer system of the preceding paragraph can include a combination or sub-combination of features. The one or more computer processors can be further configured to execute the software code to: receive a request to update the first data node; identify, in the first data analysis graph, a parent node of the first data node; and generate a link between the parent node and the update first data node. The one or more additional nodes can comprise at least two linked nodes according to a first order, and the one or more computer processors can be further configured to execute the software code to: generate a first link between the updated first data node and the duplicate one or more additional nodes; and generate, according to the first order, a second link between the duplicate one or more additional nodes comprising at least two nodes. Identifying the active path can comprise: accessing historical user interaction data associated with the first data analysis graph; identifying, from the historical user interaction data, a current node from the first data analysis graph; and identifying, as the active path, one or more nodes from the first data analysis graph based at least in part on a dependency of the current node. The one or more computer processors can be further configured to execute the software code to: identify a non-transformation node from the active path; identify, from the active path, subset of nodes that excludes the non-transformation node; identify an abridged data analysis graph as the subset of nodes; and cause presentation of the abridged data analysis graph in a user interface. Identifying the non-transformation node from the active path can further comprise: determining a node type from a node in the active path; and determining that the node type corresponds to a non-transformation node type. The one or more computer processors can be further configured to execute the software code to: join a first data set and a second data set to determine a third data set; and store the third data set as a node in the second data analysis graph. The one or more computer processors can be further configured to execute the software code to: access a data set from a node in the second data analysis graph; access report configuration data associated with the node; and generate, in the user interface, a report comprising data from the data set based at least in part on the report configuration data.

BRIEF DESCRIPTION OF THE DRAWINGS

FIGS. 1A-1M illustrate an example data analysis workflow performed using several interactive data analysis user interfaces, as generated using one embodiment of the data analysis system of FIG. 6.

FIG. 10 illustrates an example user interface of the data analysis system that presents a workspace, according to some embodiments of the present disclosure.

FIG. 11 illustrates an example user interface of the data analysis system that enables data editing, according to some embodiments of the present disclosure.

FIGS. 15A-15E illustrate example representations of data analysis graphs, according to some embodiments of the present disclosure.

DETAILED DESCRIPTION

Overview

Figure 1A:
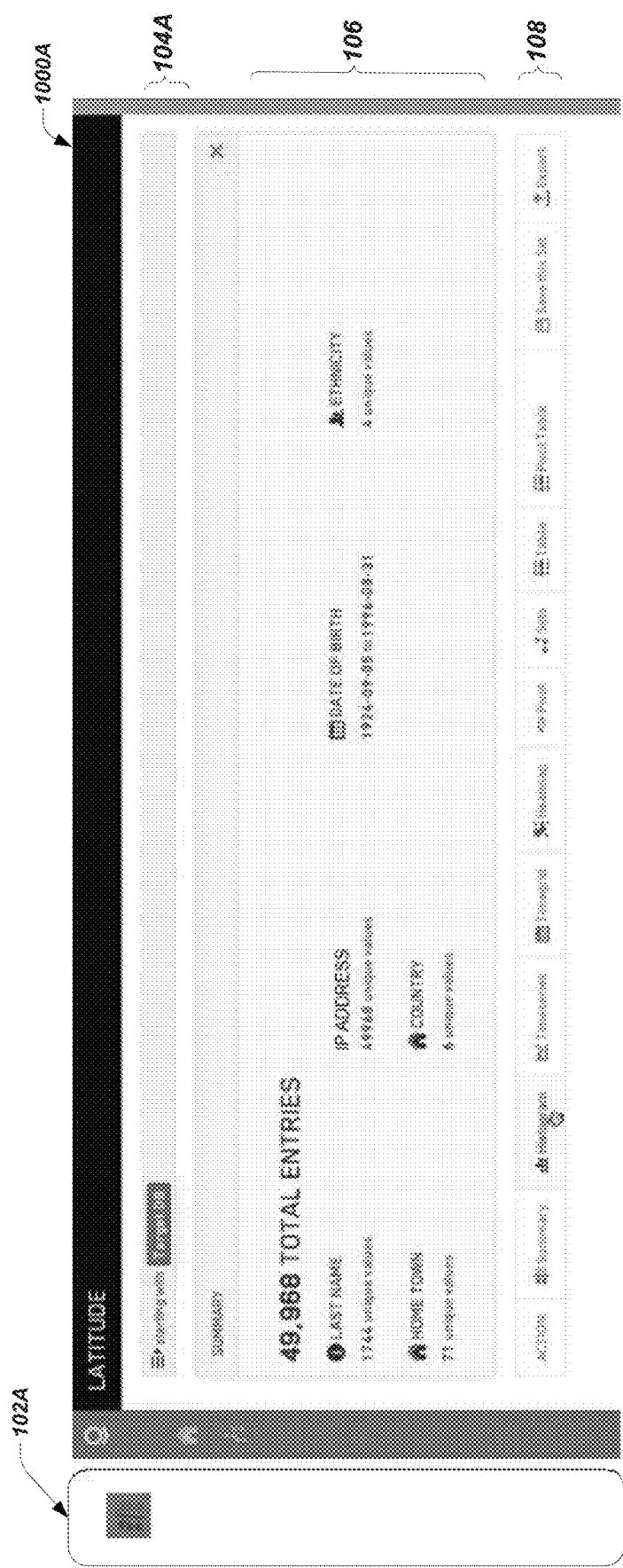

Data analysts face a daunting challenge when tasked with exploring a large volume of data to identify discrete pieces of information and intelligence—a veritable needle-in-a-haystack problem. In some cases a data analyst may have a lead on something she wishes to investigate. For example, knowing that a particular bad actor was involved in an incident may be a starting point from which the data analyst can begin to investigate other individuals who may have been involved. However, in many cases the data analyst has little information or, at best, only some contextual information on which to base an investigation. For example, the data analyst might know that a website was hacked at a certain time but have little else to go on to identify the individuals involved. However, data analysts might need to explore multiple analysis paths, many of which lead to "dead ends" or results that do not answer the search premise, by sorting and filtering through a massive volume of (for example) Internet proxy traffic data, cyber security data, telephone data, and/or any other type of data. The data analyst's path through the data is often multi-directional, in that the analyst may approach a problem from the top-down, bottom-up, and/or in either direction over the course of a given data analysis path and investigation. For example, the data analyst may begin with a large set of data, submit one or more queries which may lead to smaller sets of data results or filtered data results, and then merge or join smaller sets of data results to formulate larger sets of data, exclude subsets of data, and so on in as many iterations as the data analysts desires or finds useful.

The systems and methods described herein provide highly dynamic and interactive data analysis user interfaces which enable the data analyst to quickly and efficiently explore large volume data sources. In particular, a data analysis system, such as described herein, may provide features to enable the data analyst to investigate large volumes of data over many different paths of analysis while maintaining detailed and retraceable steps taken by the data analyst over the course of an investigation, as captured via the data analyst's queries and user interaction with the user interfaces provided by the data analysis system. For example, one data analysis path may begin with a high volume data set, such as Internet proxy data, which may include trillions of rows of data corresponding to Internet communication events even over a short period of time. The data analyst may pursue a data analysis path that involves applying a filter, joining to another table in a database, viewing a histogram, manipulating a pivot table, and finally viewing a summary of the entries located which match the parameters of the data analysis path. The summary may not provide the data analyst with the results she was hoping to find and thus she may decide to investigate another data analysis path. However, rather than start over from scratch, she may wish to return to another point in the first data analysis path. For example, perhaps while viewing the histogram she noted other points to explore later.

In an embodiment, a main data analysis workflow user interface provided by the data analysis system provides the data analyst with a set of highly interactive data visualization tools with which the data analyst can explore sets of data. Data visualization tools provided by the data analysis system can include, for example, a data summary view; a time series view; a time grid view; a heat map view; a pivot table view; an ability to link to another table in a database; and options to add, remove, or keep only selected results from a data view.

Each of these data visualization tools may include rich UI controls which are configured to respond to user interaction and input in a manner that allows the non-technical user to quickly and intuitively create complex data set queries. For example, in a histogram view data visualization UI, when a user selects (e.g., by clicking on, touching, speaking, etc.) a column in the histogram, a query filter may be automatically determined and applied to a subsequent query to be processed by the data analysis system. Or, in another example, an interactive heat map overlaid on a geographic region may allow the user to click and/or touch-and-drag to select a region of interest, and in response a query filter may be automatically generated which specifies the region of interest as a matching parameter. Subsequent queries may be easily built and executed to automatically apply the filter specified by the user interaction with the various data visualizations, providing a highly responsive, intuitive, and immersive user experience.

In one embodiment, the data analysis system maintains a session history for the analyst's data analysis paths and may provide various user interface features to allow the analyst to quickly and easily return to any prior point in the data analysis path, including the histogram view in the hypothetical example above. When a new data analysis path is started the session history is updated to include a new branch path from the original path.

As the analyst builds a data set query using these data visualization tools, the corresponding query result is added to the main data analysis workflow UI (for example, appended to the bottom of the workflow), and the session history is updated. This analysis interaction process may proceed over as many data set queries as the analyst wishes to investigate, with each subsequent query result added to the main data analysis workflow UI and the session history being updated.

In one embodiment, the main data analysis workflow UI provides the ability for the data analyst to scroll up or down within the current data analysis path, for example to re-display various data set query results and associated data visualizations appearing earlier in the current data analysis path (which, for example, may no longer fit in a displayable area of a display screen). The data analyst user may then decide to investigate a new data analysis path based on an earlier query result/visualization.

To assist the data analyst user in navigating these multiple data analysis paths, data query sets, and results, the data analysis system can provide a variety of path navigation user interface tools. For example, in one embodiment, an interactive breadcrumb path UI control may be generated and displayed (e.g., at the top of the main data analysis workflow UI, as shown in the example user interfaces herein; or in any position). Each "crumb" in the breadcrumb path UI control may indicate a summary of a respective data query and/or filter submitted over the course of the current data analysis path that is displayed in the main data analysis workflow UI. Further, each crumb may be selectable by the data analyst. Selecting a crumb may automatically update the main data analysis workflow UI to re-display the associated data set query and data visualization of the associated results.

In another embodiment, an interactive tree view UI control may be generated and displayed (e.g., at the right side of the main data analysis workflow UI, as shown in the example user interfaces herein; or in any position). Each "node" in the tree view path UI control may indicate a summary of the respective data queries submitted over the course of the current data analysis path that is displayed in the main data analysis workflow UI. For example, when a user positions a cursor or pointer over a node in the tree view, a popover UI element may appear next to the node, where the popover UI element includes a summary of the data query. Further, each node may be selectable by the data analyst. Selecting a node may automatically update the main data analysis workflow UI to re-display the associated data set query and data visualization of the associated results. The data analyst may then, for example, jump to another point, save the associated data set, or begin a new branched data analysis path.

The tree view UI control may be displayed in a variety of ways. In one embodiment, a single-path tree view UI control may be displayed corresponding to the current data analysis path. For example, suppose the current data analysis path (and the main data analysis workflow UI) includes a filter with a histogram view; a join with a table view; and a filter with a time series view. Then, the single-path tree view UI control may include one path comprising three nodes: filter-join-filter. In some embodiments the different associated data visualization elements may be indicated by representative icons, such the data analyst can view at-a-glance that the current analysis path comprises filter-join-filter.

In another embodiment, an all-paths tree view UI control may be displayed to present the user with all analysis paths explored for the current session. For example, suppose the current data analysis path is as described above with two additional branch paths: a heat map view branched from the join; and a time grid view branched from the first filter.

Then, the all-paths tree view UI control may include five nodes corresponding to the three paths: filter-join-filter (the current path); filter-histogram; and filter-time grid. In one embodiment, the single-path tree view UI control may be displayed concurrently with the main data analysis workflow UI and display the current data analysis path. A user-selectable option to view the all-paths tree view UI control may be presented, and upon selection the all-paths tree view UI control may displayed such as in a popover UI element. The all-paths tree view UI control may be configured to support full user interaction in a similar manner to the single-path UI control. Thus, the data analyst may switch to the all-paths tree view UI control, select a node from the all-paths tree, and in response the main data analysis workflow UI will re-display the associated data set query and data visualization of the associated results.

The breadcrumb path UI control and the tree view path UI control can thus each be used to jump from any first point in the data analysis path to any second point in the data analysis path, with the main data analysis workflow UI being updated to match the selected point. However, in certain embodiments, when the user jumps from point to point in this manner, the associated data query may not need to be executed again. Rather, a cached copy of the previously generated data visualization may be re-displayed, or a cached copy of the associated data query results may be accessed and used to generate or update the data visualization.

The data analysis system described herein provides a variety of additional features and benefits. In certain embodiments, the data analysis system and provided user interfaces may enable the data analyst user to save data query set results at any stage in the analysis path; and/or export data query set results, for example to another database or another format such as a presentation software format (e.g., PowerPoint), as further described below.

Saving a data query set may allow the data analyst to return to an analysis path in progress at a later time for further exploration. In some instances the data query set may be saved such that the full analysis path taken to reach the particular data query set is saved as well, which can enable the analyst to re-explore the full path at a later time. In some cases, the data query set may be saved in a "clean" state, such that the analysis path taken to reach the particular data query set is not saved. This may be of benefit, for example, if the analysis path was particularly long or convoluted and saving the path provides little value to the analyst. The system may provide an option for the analyst to choose whether a data set should be saved with or without the full analysis path.

Several types or varieties of data sets may be saved in accordance with this feature. One example data set is a materialized saved set, which is a particular set of records that matches the exact set of records that an analyst currently observes, and can be retrievable in the same precise form at a later date. A materialized saved set may have different versions that are refreshable or updatable at a later date, and as such information can also be stored describing, among other things, how a refresh may be performed, when the last refresh was conducted, and who performed the refresh. Another example data set is a dynamic saved set, which is a workflow definition that will produce a set applying some saved criteria. Another example data set is a parameterized saved sets, which is a workflow definition that will produce a set applying some saved criteria against with sets of the same shape (e.g., column definitions) as the original saved definition input sets. Many other types of saved sets may be possible as well.

Exporting a data query set may allow the data analyst to extract a data query set, for example, for importing into another data source separate from the original, high-volume data source. This feature may be of particular benefit if, for example, the original, high-volume data source comprises data which is very noisy or may otherwise be of little value in more focused or specialized databases. Using the example above with reference to Internet proxy traffic data, the vast majority of such data is normal, everyday traffic which is likely not to be of particular interest. Rather than import the full set of Internet proxy data into a more specialized database, the data analyst can use the data analysis system herein to explore and filter down the high-volume data. Once a filtered data query set is obtained which appears to be of interest or relevance to the specialized database, the data set can be exported.

Another benefit to the export feature is that it may reduce the costs involved in maintaining and searching a high-volume data source by keeping that data source separate. For example, the cost (both financially and physical resource-wise in terms of memory, response time, processing speed, efficiency, power consumption, etc.) of maintenance, duplication, backups, and other redundancy measures for specialized databases can grow exponentially if copious amounts of noisy data are imported. Thus, using the data analysis system and export features herein, the specialized databases can remain specialized, while the high-volume data sources may still be explored to identify and extract valuable data.

The data analysis systems and methods described herein may also include various features for query optimization on the backend or server-side. For example, a query backend module may be configured to analyze user selections and interactions with the data set query results and associated data visualizations and, based on those selections and interactions, determine what data the user is actually interested in, and translate the query into an efficient or optimized search query string. For example, the user might produce a workflow or analysis path which involves linking or joining a first large data set to a second large data set, and then filtering the resulting linked data set. An optimized search query string may then be generated which applies the filter operation prior to the link or join operation, such that the resources required to perform the join operation would be greatly reduced (i.e., since the link or join operation would be performed on smaller data sets resulting from the filter being applied first).

Another query optimization feature which may be provided by the data analysis system includes logic to evaluate a query, such as a JOIN operation, will be and, based on the expense, determine whether a temp table should be created in order to improve the performance of subsequent queries using the data query result set. For example, in some cases a temp table may "cost" less in terms of computer processing or memory requirements than re-executing the JOIN operation. Another query optimization feature related to the use of such temp tables which may be provided by the data analysis system includes connection pooling, whereby temp tables may be mapped to different connections or users to facilitate efficient re-use of temp tables for the respective user's analysis workflow. These and other features described herein are of particular value in the context of processing and querying high-volume data, where physical hardware costs and resources are constrained.

In some embodiments, the data analysis system may be configured to defer execution of a query until a particular analytic view is rendered. This can provide additional efficiency, for example, when users are simply trying to construct complex set-based queries, and enables non-technical users to create complex queries without actually understanding the underlying query language (like SQL). Users might find benefit from the data analysis system as a tool that enables construction of complex reporting queries, even without visual feedback (but with the benefit of optionally including such visual feedback on demand). In some instances, the data analysis system may provide users with the ability to define filters without visual feedback, and do so incrementally and intuitively as a logical "next step" in a workflow for filtering, triaging, linking, and so on.

Example User Interfaces

Figure 6:
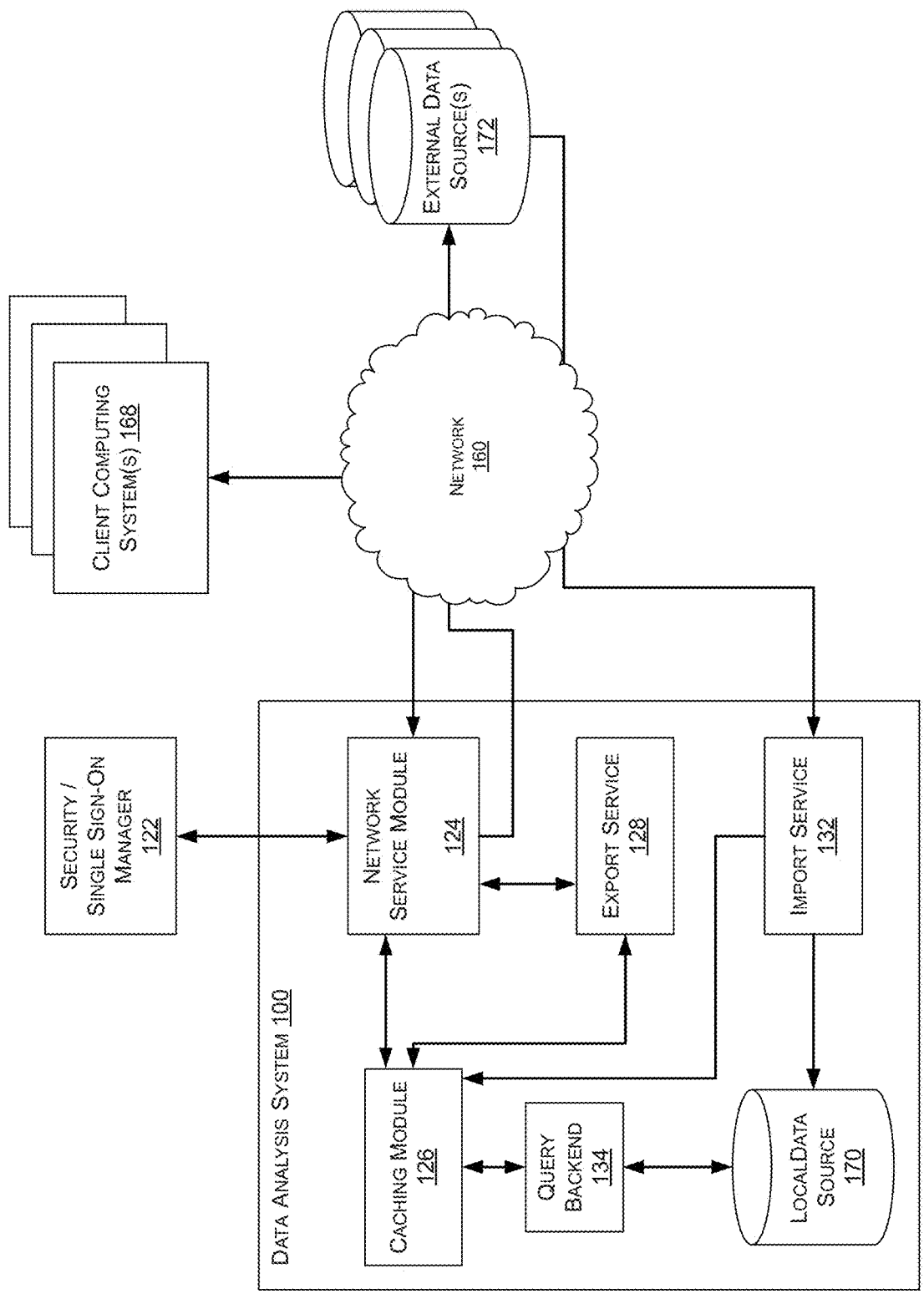
FIG. 6 is a block diagram of an implementation of an illustrative data analysis system.

FIGS. 1A-1D and 2A-2B illustrate example user interfaces and UI components, as used in one or more embodiments of the data analysis system 100 of FIG. 6. The sample user interfaces may be displayed, for example, via a web browser (e.g., as a web page), a mobile application, or a standalone application. In some embodiments, the sample user interfaces shown in FIGS. 1A-1D and 2A-2B may also be displayed on any suitable computer device, such as a cell/smart phone, tablet, wearable computing device, portable/mobile computing device, desktop, laptop, or personal computer, and are not limited to the samples as described herein. The user interfaces include examples of only certain features that a data analysis system may provide. In other embodiments, additional features may be provided, and they may be provided using various different user interfaces and software code. Depending on the embodiment, the user interfaces and functionality described with reference to FIGS. 1A-1D and 2A-2B may be provided by software executing on the individual's computing device, by a data analysis system located remotely that is in communication with the computing device via one or more networks, and/or some combination of software executing on the computing device and the data analysis system. In other embodiments, analogous interfaces may be presented using audio or other forms of communication. In an embodiment, the interfaces shown in FIGS. 1A-1D and 2A-2B are configured to be interactive and respond to various user interactions. Such user interactions may include clicks with a mouse, typing with a keyboard, touches and/or gestures on a touch screen, voice commands, physical gestures made within a proximity of a user interface, and/or the like.

FIG. 1A illustrates an example data analysis user interface 1000A, as generated using one embodiment of the data analysis system 100 of FIG. 6. The data analysis UI 1000 may comprise, for example, a main data analysis workflow user interface for a user, such as a data analyst, to dynamically build data sets and queries and to view query set results. The query set results may be generated by the data analysis system 100 in response to user queries, and presented via highly interactive user interface UI display elements and controls. The data analysis UI 1000 may include a tree view UI control 102A, breadcrumb UI control 104A, and a data visualization UI element 106, which in FIG. 1 comprises a summary data view presenting a summary of data set results. Also shown is an action menu 108 which provides a list of data analysis tools and options available for the user, including: summary view; histogram; time series; time grid; heat map; pivot table; a set viewer; a table view; a pivot table; and options to save a set and to export a set. Additional actions and options not shown can also be included. In response to selection of these various data analysis tools the data analysis UI 1000 may be updated to add a new UI display panel presenting the selected analysis tool at the bottom of the workflow area. The user may then use the selected analysis tool to build and run a subsequent query to obtain a next data query result set.

Each time a selected data analysis tool is used by the user to build a query, the data analysis system 100 may update the associated session history for the user to track the user's analysis path. In some embodiments, the session history may be updated as the user builds the query, but before the query is executed, in order to capture the user's work in progress. In some embodiments, the session history may be updated when the query is executed and query results are obtained. As the session history is updated, the tree view UI control 102A and the breadcrumb UI control 104A may also be updated to reflect the updated analysis path. This is described in more detail with reference to FIGS. 1B-1D as the example workflow progresses; as well as with respect to the process 400 of FIG. 4 herein. For example, the breadcrumb UI control 104A may be appended with a description of the query parameters and/or type of operation performed (e.g., as may be indicated by an icon). Similarly, the tree view UI control 102A may be updated to include an additional node on the current branch or path, corresponding to the additional analysis step (including either a query-in-progress or a query result set generated and added to the main workflow).

As the analysis path grows or the user begins to backtrack and create new branches, the tree view may become too large to persistently display in the main data analysis workflow user interface. Thus, in some embodiments, the tree view UI control 102A-D may comprise a single series of nodes representing the current analysis path in the session. The tree view UI control 102A-D may include an expand option which the user can select to view the full or expanded tree view. The full or expanded tree view may be presented as a popover UI control overlaid on the main data analysis workflow user interface or in a separate window or user interface. More detailed examples of the expanded tree view are illustrated and described with respect to FIGS. 2A and 2B herein.

With continued reference to FIG. 1A, the hand cursor over the histogram icon in the actions menu 108 indicates that the user is selecting a histogram data visualization, which is illustrated and described next in FIG. 1B.

Figure 1B:

FIG. 1B illustrates an example data analysis user interface 1000B, which may be a continuation of the workflow shown in user interface 1000A. Once the user has selected the histogram option, a histogram menu 110 may be displayed by which the user can select one or more query parameters specifying the desired output result and format. Other data visualization elements described herein may have similar or other menu options for the user to specify query parameters for the respective data visualization.

When the user is satisfied with the selection, e.g., of count_distinct, hometown, country, and quantity parameters in the example of FIG. 1B, the "compute" button may be selected. In response the data analysis system 100 receives the request and query parameters and processes a query against the current query result set. The output results may be used to generate the histogram data visualization and displayed in the main data analysis workflow user interface, as FIG. 1B shows. Also shown in user interface 1000B, the view UI control 102B may be updated to add an additional node indicating the histogram has been added to the current analysis path. In some embodiments, the visualization, e.g., the histogram, is updated in real time as the various parameters are each individually selected.

The histogram data visualization may be interactive and provide functionality for the analyst to quickly and intuitively begin developing another query. For example, in response to the user selecting one or more bars in the histogram, a query filter display 114B may appear and dynamically update to include each of the one or more bars selected by the user. When the user wishes to continue the analysis beyond the histogram, another action may be selected from the action menu 108B. If any query filter criteria are still selected from the user interaction with the histogram, these may be gathered and applied to the next query processed by the data analysis system for the current workflow.

Figure 1C:
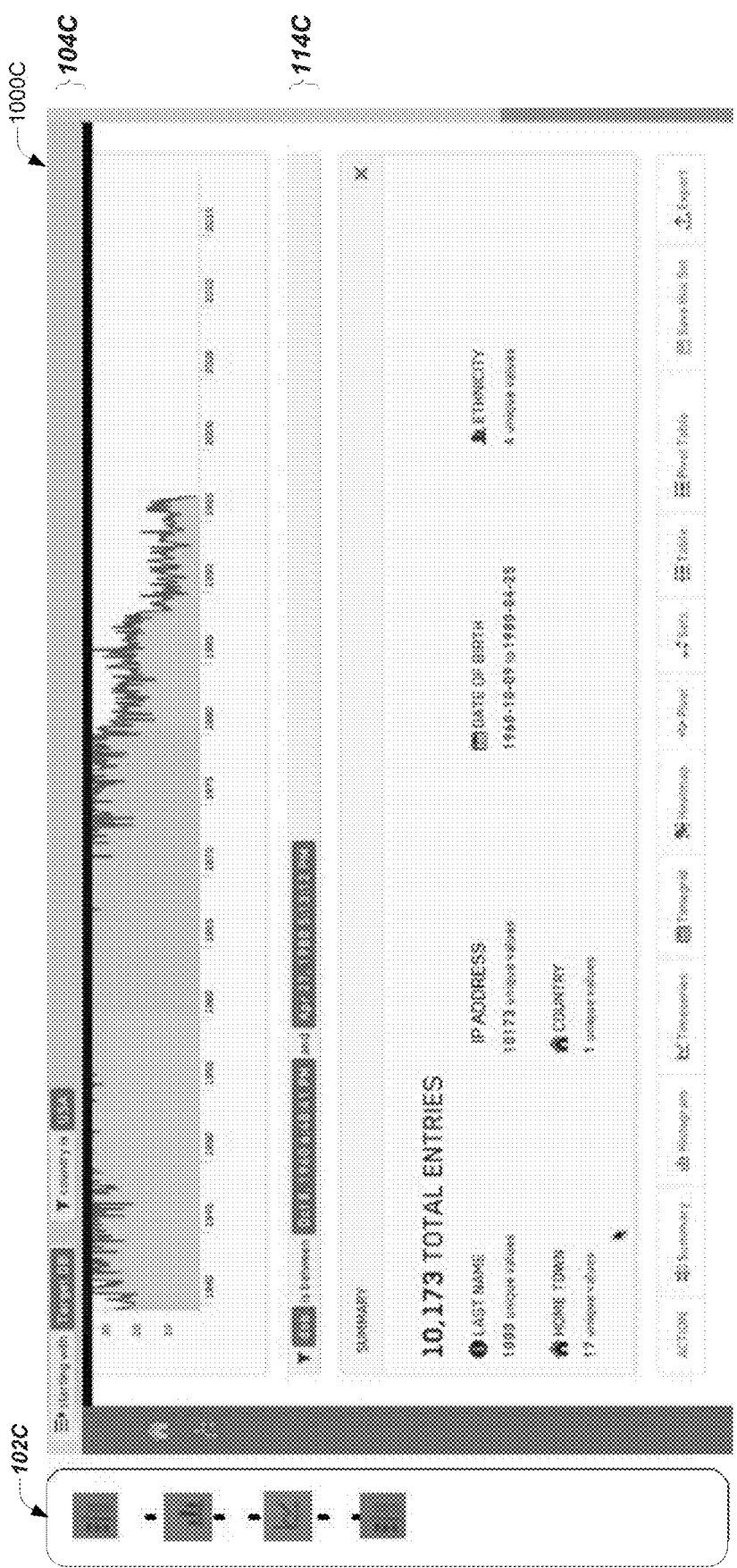

FIG. 1C illustrates an example data analysis user interface 1000C, which may be a continuation of the workflow shown in user interface 1000B. In this continued example of the workflow which started in FIG. 1A, the data analyst has progressed a couple of steps further in the analysis path. The view UI control 102C has been updated to indicate that subsequent to the histogram discussed above, a time series query was processed by the system and the associated time series data visualization (shown partially visible in the user interface 1000C) was generated and displayed. At any point in the analysis the user may use the fully interactive view UI control 102C to navigate to an earlier step in the analysis path; in response, the main data flow user interface may scroll up or otherwise cause representation of the data visualization corresponding to the selected node.

The user interface 1000C also demonstrates the breadcrumb UI control 104C being updated to reflect the user's earlier selection from the histogram to filter on the country "USA." As with the tree view UI control 102C, the user may select any crumb in the breadcrumb UI control 104C to navigate to the corresponding step in the analysis path.

The time series data visualization, like the histogram, may provide several interactive features. For example, in response to the user selecting a segment of the time series, the query filter display 114C may dynamically update to specify a query filter corresponding to the user selection (here, a date range). As user interface 1000C further illustrates, a summary view has been selected again by the data analyst so that she can assess at a glance whether the query filters applied so far in the analysis path have yielded any interesting query results.

Figure 1D:

FIG. 1D illustrates an example data analysis user interface 1000D, which may be a continuation of the workflow shown in user interface 1000C. In this continued example of the workflow which started in FIG. 1A, the analyst has selected a heat map data visualization element 116. The view UI control 102D has been updated to indicate that subsequent to the histogram and time series discussed above, a summary view, a pivot table, and finally the heat map currently displayed were processed by the data analysis system. As before, at any point in the analysis the user may use the fully interactive view UI control 102D to navigate to an earlier step in the analysis path.

The user interface 1000D also demonstrates the breadcrumb UI control 104C being updated to reflect the user's earlier selection from the histogram to filter on the country "USA," as well as several additional interim filters and operations which have been applied during the current analysis path. As with the breadcrumb UI control 104C, the user may select any crumb in the breadcrumb UI control 104D to navigate to the corresponding step in the analysis path.

The heat map data visualization, like the histogram and the time series, may provide several interactive features. For example, in response to the user drawing a circle or otherwise circumscribing an area on the map, the query filter display 114C may dynamically update to specify a query filter corresponding to the user selection (here, a geographic range and a center point).

In the example shown, the user has selected a region roughly corresponding to the New England area, with New York as the center focus. For instance, the query results data may indicate a high degree of activity, such as Internet traffic, satisfying the query parameters in the New York area. The data analyst/user may quickly make this determination from studying the heat map, and then uses the map selector to zoom in on the region of interest. In response the data analysis user interface may interpret the user's map selection as a desire to build a new query and immediately add a query filter, shown below the map in this example, to filter the results to the selected region. The user can then select one of the actions 108D and execute the query filter to view a subsequent data set, where the filter is applied to the query results from the heat map.

FIGS. 1E-1M illustrate additional user interface features that may be implemented in some embodiments in order to selection actions, visualizations, and/or data sets upon which new visualizations should be generated. In this example, a text input control 123 receives text entry from the user in a natural language format; although in other embodiments the text entry may be in a coded, shorthand, or abbreviated format. The text entered by user may then be parsed by the system in order to predict another visualization of interest to the user and/or further filter parameters of interest to the user, such as that might be applied to another visualization.

Figures 1E, 1F:
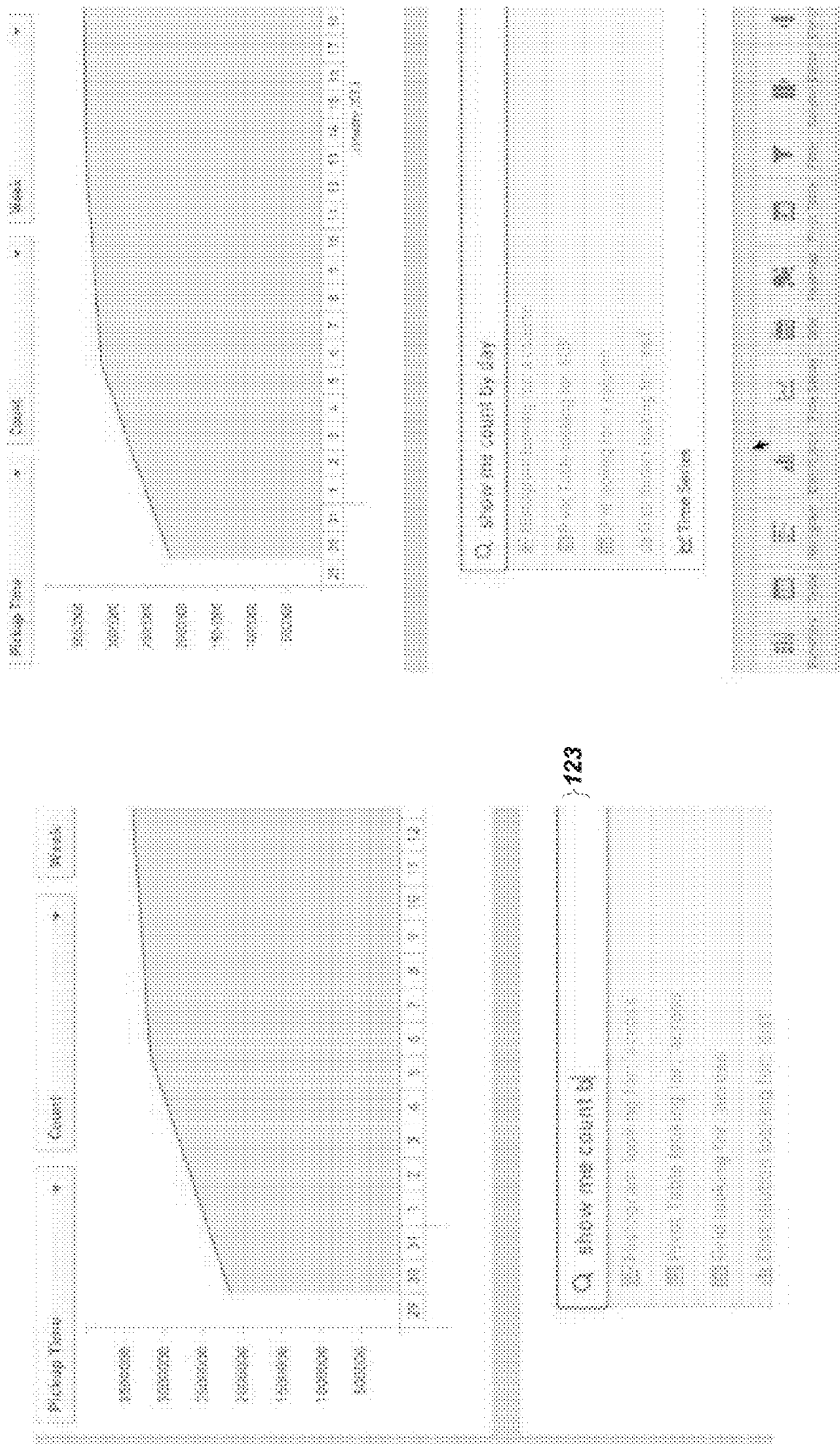

For example, in the example of FIG. 1E, the user has begun typing a query such as "show me count by day." However, before finishing the text, each of the visualizations shown below the input control 123 are grayed out (e.g., not selectable) as the system is processing the text data to determine which visualization is associated with the provided text. In some embodiments, the system provides suggestions of visualizations/or filtering associated with those visualizations before an entire search string is entered. For example, the system may predict characters that are going to be typed by the user. Returning to the example in the figures, when the text has been entered, as in FIG. 1F (or prior to completion of the full text query in some implementations), the dropdown list of visualizations is updated to provide one or more predicted or suggested data visualization elements relevant to the provided text entry. In the example of FIG. 1F, the prediction or suggestion may be based on a real-time analysis of the user input and scanning for certain keywords which may indicate or otherwise suggest that the user is interested in a particular set of data which may be well suited for one or more data visualization types. For example, the word "count" in the user input may signal to the system that the user is probably interested in viewing a time series, and thus this particular data visualization option or thumbnail in the dropdown list may be highlighted so that the user can see that the "time series" data visualization is recommended and/or available for the particular user input or query. As another example, the user input may be "histogram rate code" which may in turn signal the system that the user is probably interested in viewing a histogram; then the histogram option or thumbnail may be highlighted for the user to more easily select.

Figure 1G:
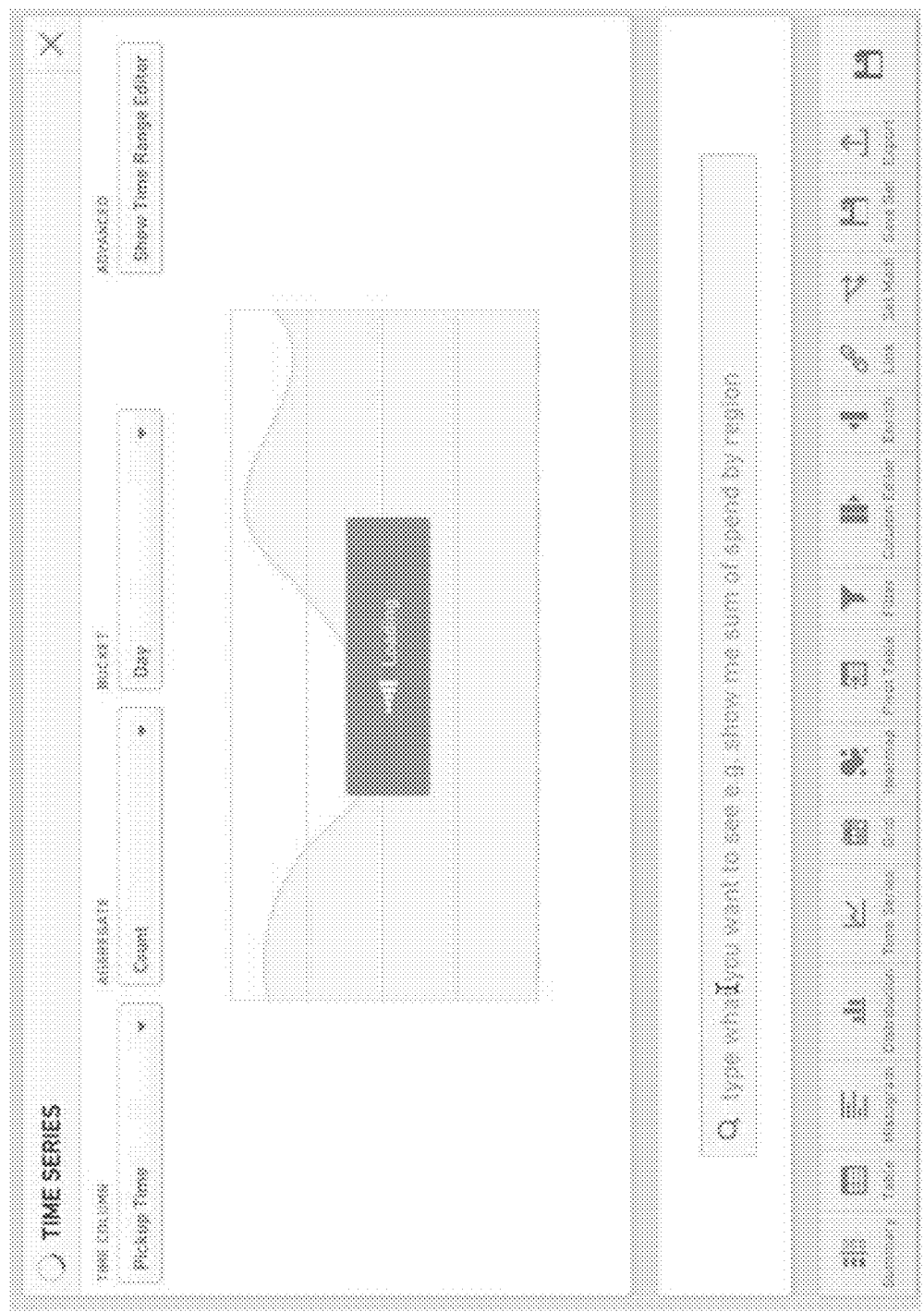
Figure 1J:
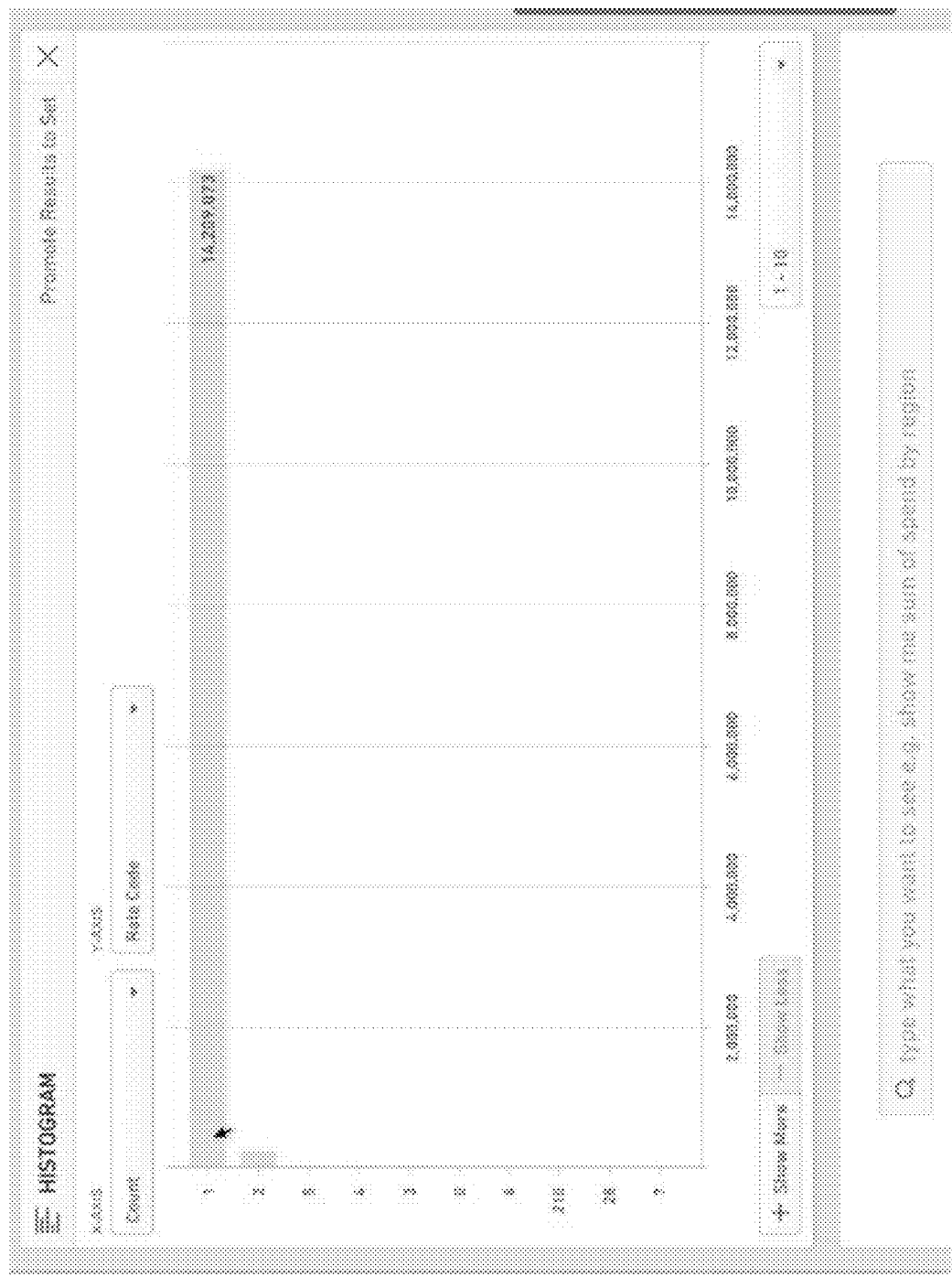

The user can then select any of the available visualizations (e.g., time series in example of FIG. 1) for display in the user interface, such as is shown in FIG. 1G. FIG. 1G also includes an input control 123B that provides the same or similar functionality to the input control 123; that is, free-form text may be entered in order for the system to predict which visualization the user is interested in viewing next and/or additional parameters for filtering the data set in the recommended visualizations. However, the visualization prediction provided in response to text provided into input control 123B may further be influenced by the time series that was previously displayed in response to the previous selection made with reference to FIG. 1G, for example. Thus, as with other examples discussed herein, filtering of the data set and subsequent visualizations based on such filtering may build upon one another in a sequential fashion to provide various granularities, types, and sets of information to the user in various available visualizations.

In the example of FIG. 1H, the user has started typing a new free-form search query, but the system has not yet identified a most appropriate visualization and/or parameters for the visualization. Moving to FIG. 1I, the user has completed entering "histogram rate code", such that a histogram visualization is unlocked for selection, and the system has automatically determined that the "rate code" should be the main input parameter of the histogram. Thus, when the Histogram visualization is selected, a new visualization, such as in FIG. 1J, including a histogram showing rate counts, is added to the user interface.

Figure 1M:
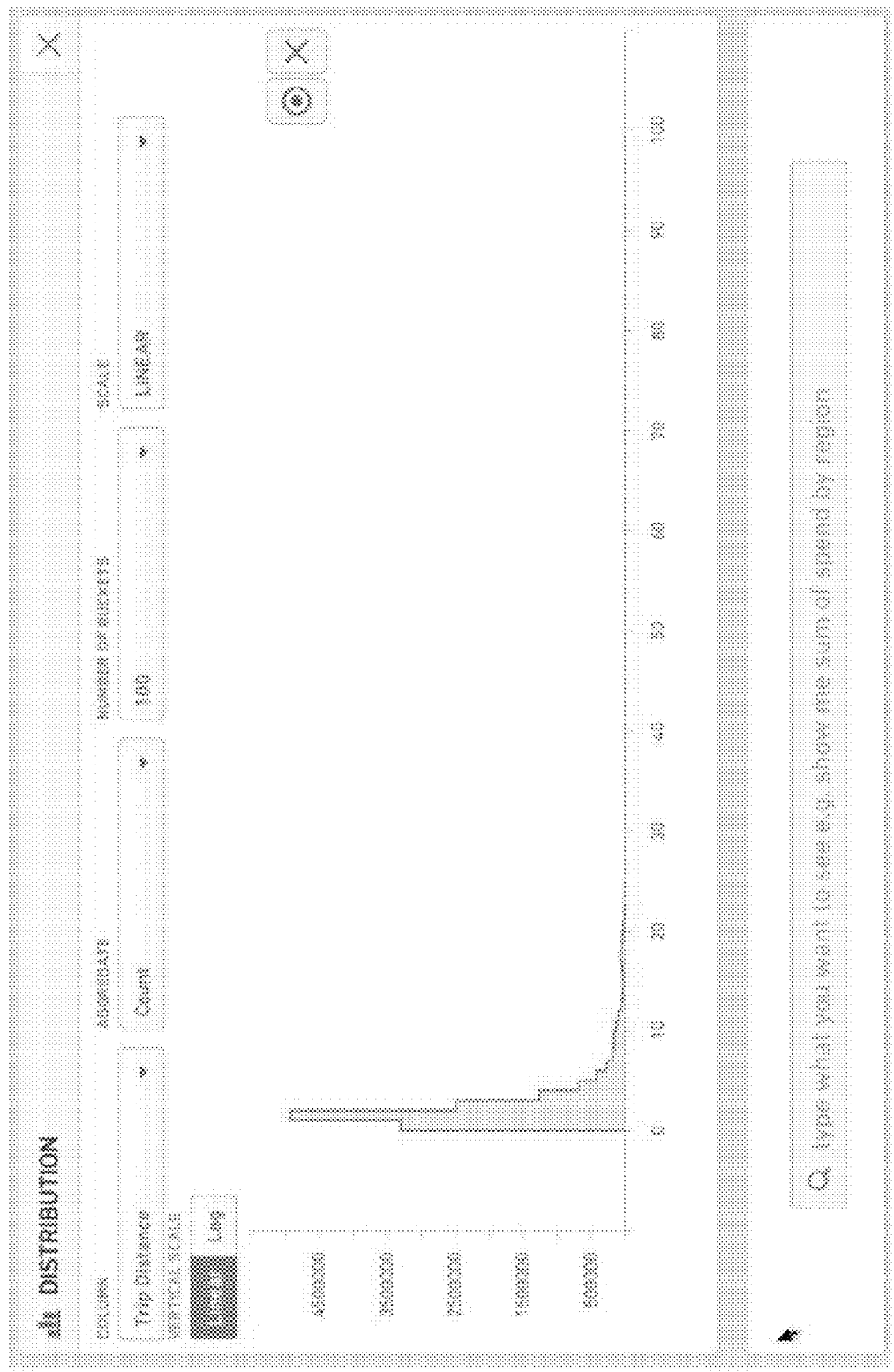

FIGS. 1K-1M illustrate yet another example of parsing of free-form text in order to provide a particular visualization and primary attribute for display in the visualization. In this example, the user has indicated that a distribution visualization is desired, such that the system automatically begins precalculating (in some embodiments) a distribution visualization based on a "trip distance" parameter of the data set, resulting in display of the distribution visualization of FIG. 1M in response to the user's selection of the Distribution visualization (in FIG. 1L).

In some instances, the dropdown list (or other user interface display element listing one or more options for user selection) may display or include a hint for the user to indicate one or more keywords or data types which, if included in the text input, would enable or highlight the particular data visualization element. For example, the list may indicate that, for a pivot table, the system is "looking for" the keyword "across." Then, if the user inputs the term "across" in the text input control, the system may infer that the user is interested in viewing a pivot table and correspondingly enable or recommend the pivot table data visualization. Other examples may include: Grid is looking for the keyword "an aggregate"; Histogram is looking for the keyword "hist"; Distribution is looking for the a data type of "a column," and Time Series is looking for the keyword "time."

Additional keywords may be used or suggested, and more than one keyword may be "looked for" by a particular data visualization to signal the system to generate, enable, or otherwise recommend the particular data visualization to the user. In addition, the data visualization highlighted or recommended by the system may change in real-time as the user provides more input. For example, the system may initially recommend one data visualization such as a Time Series in response to identifying the keyword "time" in the user input; but then update to recommended a different data visualization such as Pivot Table in response to identifying other keywords or structure to the user input that may indicate the user is more likely interested in something other than the initially recommended Time Series data visualization.

Figure 2A:
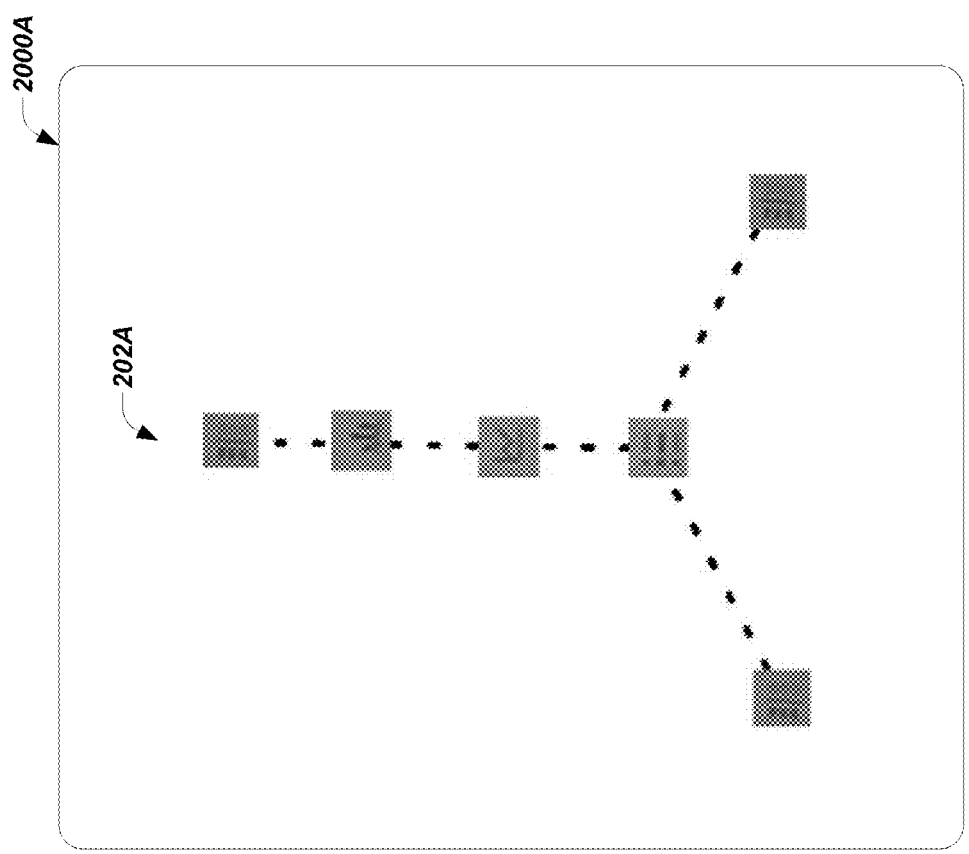
FIGS. 2A-2B illustrate example data analysis path tree view user interfaces, as generated using one embodiment of the data analysis system of FIG. 6.
Figure 2B:
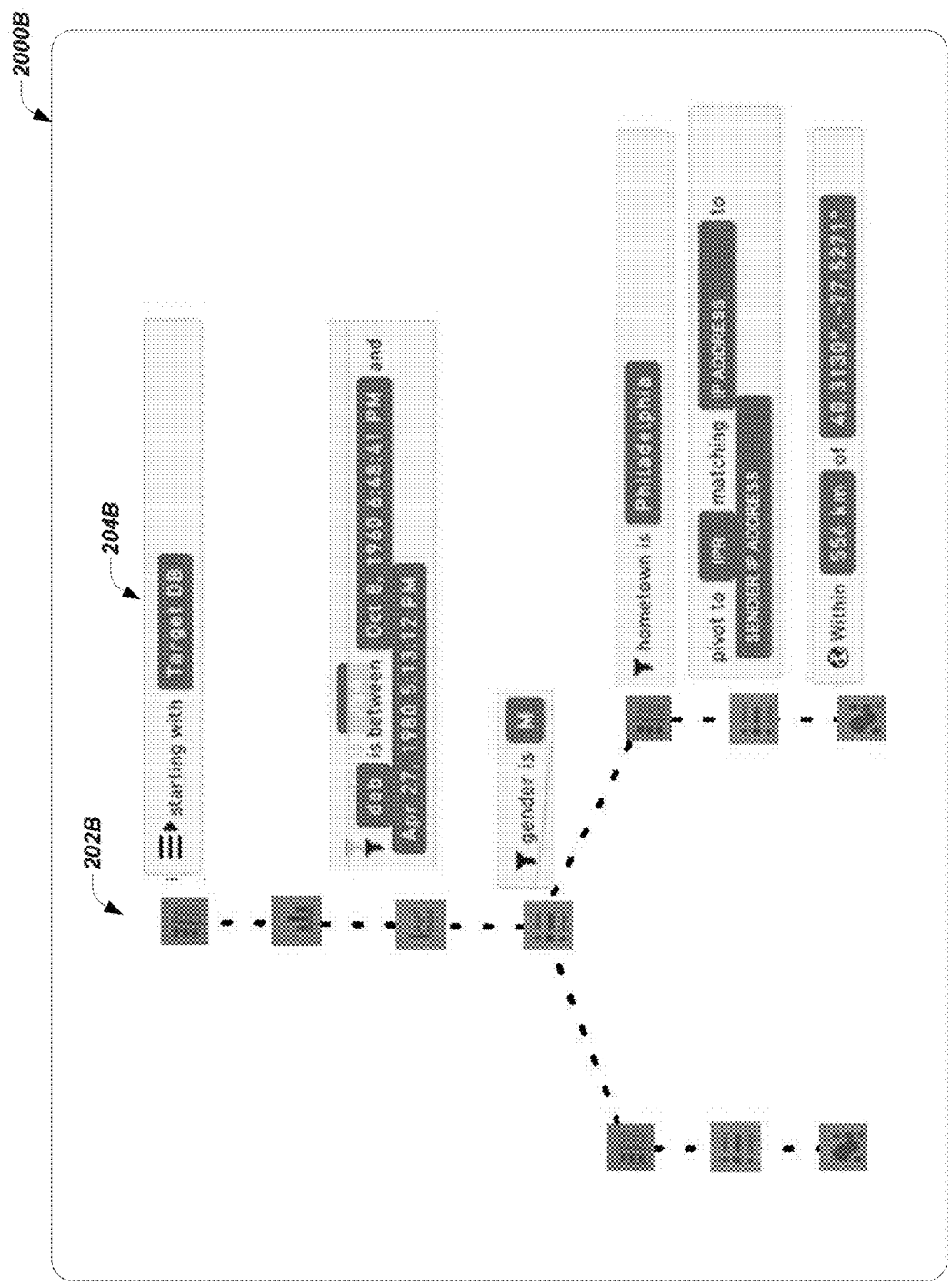

FIGS. 2A-2B illustrates example data analysis path tree view user interfaces, as generated using one embodiment of the data analysis system 100 of FIG. 6. The tree view 202A of FIG. 2A or the tree view 202B of FIG. 2B may be displayed in response to a user selection from the main data workflow user interface. Nodes in each tree view 202A, 202B may be represented by icons indicating the types of query operations or data visualization performed or accessed at the particular node. For example, the tree view 202A includes a summary node, a histogram node, a time series node, a pivot table node, and a summary node on each of two branches from the pivot table node. The tree view 202A may correspond, for example, to some of the analysis path and tree view 102C described in FIG. 1C.

In FIG. 2B, the tree view 202B corresponds to the same analysis path represented in tree view 202A but includes several additional nodes, indicating that the analysis path has grown. For example, the tree view 202B includes the same nodes as tree view 202A, with additional nodes for each of the two branches—namely a table view node and a histogram node.

As further illustrated in FIG. 2B, popover UI elements 204B may be displayed to show query detail (e.g., the associated query parameters and/or type of operation performed). The popover UI elements 204B may be displayed to the right (or left, etc.) of the tree, such as when the user positions a pointer or cursor over a node in the tree view 202A. In some embodiments, only some nodes of tree view 202B display the associated query detail, perhaps indicating certain key nodes in the analysis path. For example, a node's query detail might be selected for display based on a user flag or marker indicating the query result was one of interest for later data exploration; or, the query detail might be selected for display based on a determination made by the data analysis system, such as a based on a number of results returned, or other factors.

In certain embodiments, the tree views 202A, 202B may be interactive such that the user may select a node in order to return to that point in the analysis path. Selection of the node may cause the main data analysis workflow user interface to re-display the associated data query set result and/or visualization control, which the user can view and optionally from which the user can launch a new analysis path.

Although the tree views 202A and 202B shown in FIG. 2A-2B illustrate two branched analysis paths for the current session, in certain embodiments other tree views may be generated to show any number of paths. For example, in one embodiment, a single-path tree view UI control may be presented to show only the current analysis path, for example in a side panel on the main data analysis workflow user interface. An expanded or all-paths tree view UI control may then be displayed in response to user selection of an option presented in one of the data system user interfaces to view the expanded or all-paths tree. In other instances, depending on the depth and complexity of the analysis path, the tree view UI may be generated to display only a local portion of the analysis path, or include a zoom in/zoom out feature to allow the user to navigate the tree view and different analysis path.

In various embodiments, the tree view represents a computation graph (for example, Directed Acyclic Graph) of input sets. Some operations take as input more than just the parent set, and thus form the nodes of a compute graph. Other compute graphs can be used as input at these junctions, and with the added feature of constructing saved sets, these compute graphs can be quite complicated. Thus, one benefit provided by the tree views discussed herein is to allow non-technical users to construct large compute graphs with semantically labeled sets. The data analysis system may be configured to perform some caching on the back-end to optimize the compute profile of particular graphs. This caching can be performed across multiple users, such that if multiple users request the same graph, the result of that compute graph may be cached for speedier or more efficient execution. Elements of the total computation may be optimized by replacing a particular node in the graph with its materialized saved set result (for example, in cases in which the materialization data set remains valid).

Examples of Processes Performed by Data Analysis Systems

Figure 3:
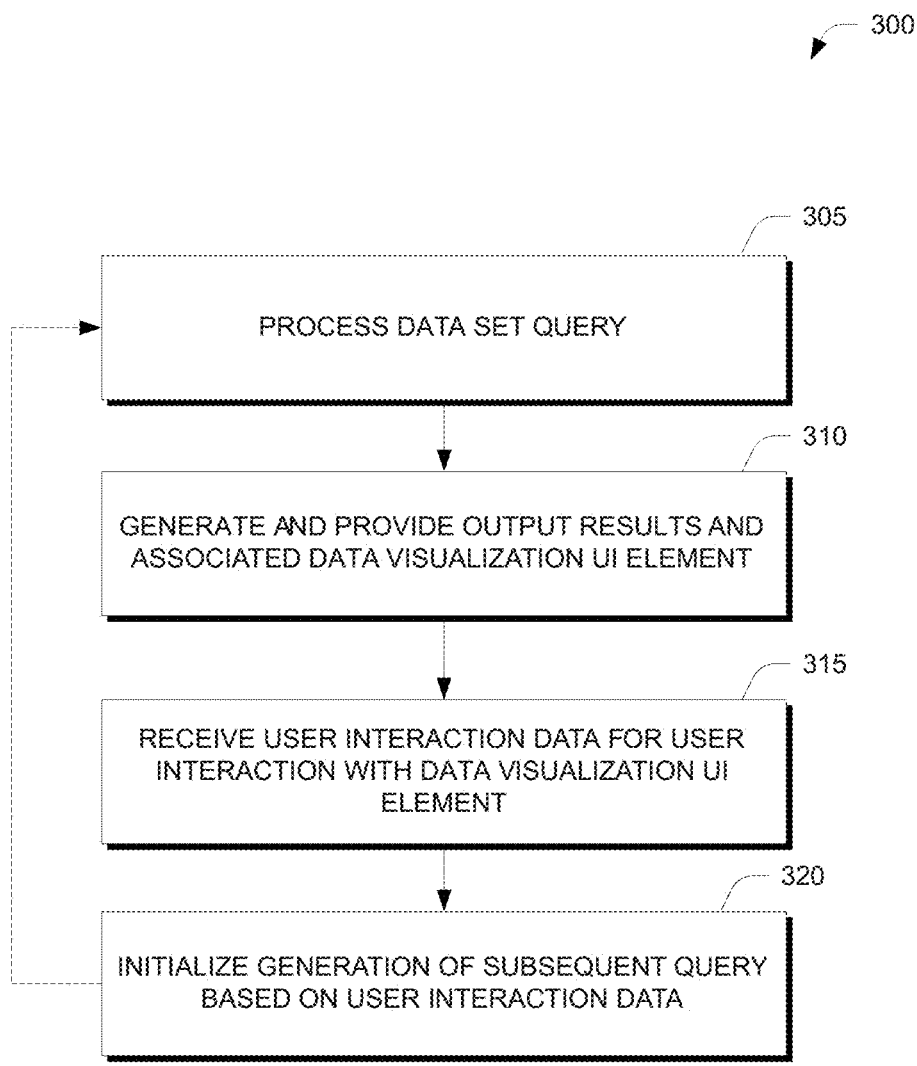
FIG. 3 is a flowchart illustrating one embodiment of an example process for processing data set queries using an interactive data analysis user interface, as used in one embodiment of the data analysis system of FIG. 6.
Figure 4:
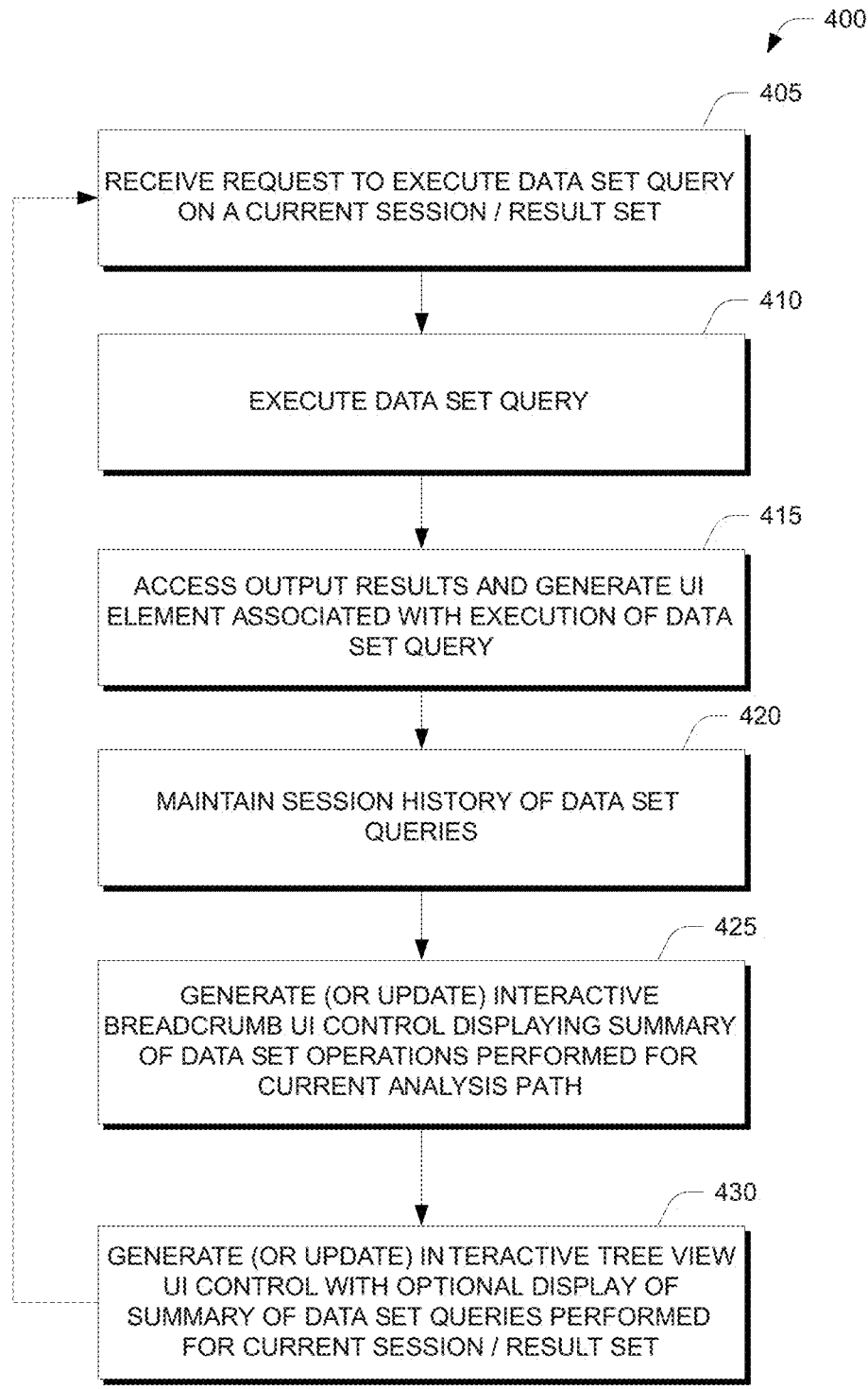
FIG. 4 is a flowchart illustrating one embodiment of an example process for generating an interactive breadcrumb and/or an interactive tree view representing a data analysis path for display in a data analysis user interface, as used in one embodiment of the data analysis system of FIG. 6.
Figure 5:
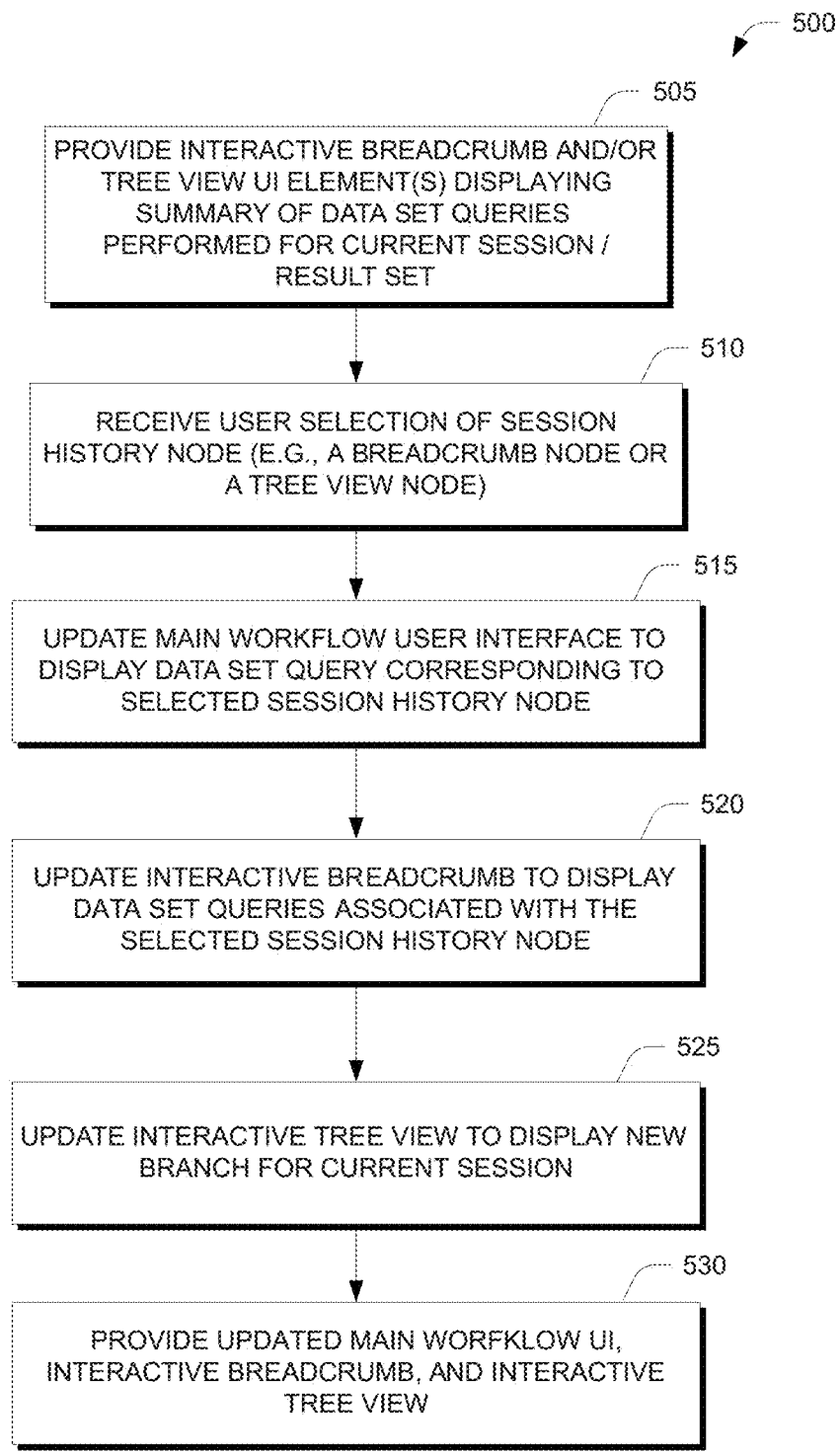
FIG. 5 is a flowchart illustrating one embodiment of an example process for navigating a data analysis path using an interactive breadcrumb and/or an interactive tree view representing the data analysis path in data analysis user interface, as used in one embodiment of the data analysis system of FIG. 6.

FIGS. 3, 4, and 5 are flowcharts illustrating various embodiments of data analysis system processes. In some implementations, the processes are performed by embodiments of the data analysis system 100 described with reference to FIG. 6 and/or by one of its components, such as the network service module 124, the caching module 126, the export service 128, the import service 132, and/or the query backend 134 shown in FIG. 6. For ease of explanation, the following describes the services as performed by the data analysis system 100. The example scenarios are intended to illustrate, but not to limit, various aspects of the data analysis system 100. In one embodiment, the processes can be dynamic, with some procedures omitted and others added.

FIG. 3 is a flowchart illustrating one embodiment of a process 300 for processing data set queries using an interactive data analysis user interface, as used in one embodiment of the data analysis system 100 of FIG. 6. Depending on the embodiment, the method of FIG. 3 may include fewer or additional blocks and/or the blocks may be performed in an order that is different than illustrated.

At block 305, the data analysis system 100 processes a data set query on a data set. The data set may be an unfiltered data set, such as a set of proxy data logs that the user wishes to analysis or may be a filter portion of a data set, such as a subset of the proxy data that was previously processed.

At block 310, the data analysis system 100 generates and provides output results for the data set query, which may include an associated data visualization UI element such as those described herein. The output results and data visualization UI element may be displayed, for example, via one of the example user interfaces 1000A-D discussed above.

At block 315, the data analysis system 100 receives user interaction data for user interaction with the data visualization UI element. For example, the user may interact with the data visualization UI element by selecting one or more bars, lines, or other portions indicating a selection of some subset of the data represented by the data visualization. The selections may then be interpreted as query filters for a subsequent query result set. Several examples of these types of interactions are described with reference to FIGS. 1A-1D.

At block 320, the data analysis system 100 initializes generation of the subsequent query based on the user interaction data. For example, a query filter display may be presented and dynamically updated to include each of the user's selections. Once the user's selections have been received and the user elects to calculate or submit the query, the process 300 may return to block 305 and repeat again. In this way, the user can drill down (and/or up) in various manners to view different subsets of the data in various ways.

FIG. 4 is a flowchart illustrating one embodiment of a process 400 for generating an interactive breadcrumb and/or an interactive tree view representing a data analysis path for display in a data analysis user interface, as used in one embodiment of the data analysis system 100 of FIG. 6. Depending on the embodiment, the method of FIG. 4 may include fewer or additional blocks and the blocks may be performed in an order that is different than illustrated.

At block 405, the data analysis system 100 receives a request to execute a data set query on a current session or result set. The request may be received, for example, via one of the user interfaces 1000A-D described previously, for example over the course of an analysis workflow.

At block 410, the data analysis system 100 executes the data set query, for example by using the caching module 1226 and/or accessing the local data source 170 to run the query. Some or all of the query execution may be performed by, for example, the query backend 134, which may apply some of all of the query optimization techniques described herein.

At block 415, the data analysis system 100 accesses the output results and generates a UI element (e.g., a data visualization control) associated with the execution of the data set query. For example, the type of UI element generated may be based on a user selection from the actions menu 108 illustrated and described with reference to FIG. 1A.

At block 420, the data analysis system 100 maintains or updates a session history of the data set queries executed for the current session. The session history includes the query details associated with each respective data set query, such as query parameters and/or a type of operation performed. The query details may be used, for example, in order to provide a visual reminder to the user about the data set query, as well as to enable re-execution of the query in some instances.

At block 425, the data analysis system 100 generates or updates an interactive breadcrumb UI control (such as the breadcrumb 104A-D to display the summary of the query detail information for data set queries performed for the current analysis path.

At block 430, the data analysis system 100 generates or updates an interactive tree view UI control (such as the tree view 102A-D or 202A-B), which may be configured to optionally display the summary of the query detail information for data set queries performed for the current analysis path (e.g., the query detail information may be displayed in response to a user interaction such as positioning a cursor, gesturing with a finger or hand near the screen, etc.).

Once the interactive breadcrumb and/or tree view UI controls have been updated, the user interfaces 1000, 2000 may be updated or refreshed to display the current view, and the user may continue to build and execute data set queries.

FIG. 5 is a flowchart illustrating one embodiment of a process 500 for navigating a data analysis path using an interactive breadcrumb and/or an interactive tree view representing the data analysis path in data analysis user interface, as used in one embodiment of the data analysis system 100 of FIG. 6. Depending on the embodiment, the method of FIG. 5 may include fewer or additional blocks and the blocks may be performed in an order that is different than illustrated.

At block 505, data analysis system 100 provides for display in a data analysis workflow user interface, an interactive breadcrumb and/or tree view UI element each of which may display summary information about data set queries performed for the current session, analysis path, or result set.

At block 510, data analysis system 100 receivers a user selection of a session history node, such as a crumb in the breadcrumb or a node in the tree view.

At block 515, data analysis system 100 updates the main workflow user interface to display the data set query and results corresponding to the selected session history node.

At block 520, data analysis system 100 updates the interactive breadcrumb to display the data set queries or detail associated with the selected session history node.

At block 525, data analysis system 100 updates the interactive tree view to provide an indication that the current position in the analysis path has changed, and to optionally display a new branch for the current session.

At block 530, data analysis system 100 provides or updates the main workflow user interface as generated at block 515, the interactive breadcrumb as updated at block 520, and the interactive tree view at block 525.

Example System Implementation and Architecture

FIG. 6 is a block diagram of one embodiment of a data analysis system 100 in communication with a network 160 and various systems, such as client computing systems(s) 168, external data source(s) 172. The data analysis system 100 may be used to implement systems and methods described herein, including, but not limited to the process 300 of FIG. 3, the process 400 of FIG. 4 and the process 500 of FIG. 5.

Data Analysis System

In the embodiment of FIG. 6, the data analysis system 100 includes a network service module 124, a caching module 126, an export service 128, an import service 130, a query backend 134, and a local data source 170.

The security/single sign-on manager 122 provides capabilities to ensure that users are properly authenticated with the data analysis system 100, as well as other security measures and protocols which may be used by the data analysis system 100.

The network service module 124 provides capabilities related to generation, presentation, and in some cases display of the user interfaces, UI components, and related features, such as those illustrated and described with reference to FIGS. 1A-1D and 2A-2D herein.

The caching module 126 provides capabilities related to, among other things, caching of query results generated for analysis workflow sessions. The caching module 126 may also be configured to manage connection pooling for the data analysis system 100, such that users of the system are mapped to temp tables created for their respective analysis workflows. Among other benefits this may help improve response times for the users as they may utilize the same connection and same temp tables many times over a single session.

The export service 128 processes requests to export data from the data analysis system 100 to, for example, the external data sources(s) 172, working in association with the caching module 126 to access data and provide it to the network service module 124 for export.

The import service 132 may periodically poll or be notified by the external data source(s) 172 when new data may be available for import. When new data is available for import, the import service 132 may update the local data store 170 and provide an indication to the caching module 126 that new data is available. In response the caching module 126 may purge or invalidate outdated data.

The query backend 134 provides capabilities related to query optimization including analyzing query filters received from the network service module 124.

Each of these components may be stored in a mass storage device as executable software codes that are executed by a central processing units ("CPU"). These and other modules in the data analysis system 100 may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. In the embodiment shown in FIG. 6, the data analysis system 100 is configured to execute the modules recited above to perform the various methods and/or processes herein (such as the processes described with respect to FIGS. 3, 4, and 5 herein).

The data analysis system 100 and/or its subcomponents may include, for example, a server, workstation, or other computing device. In one embodiment, the exemplary data analysis system 100 includes CPUs, which may each include a conventional or proprietary microprocessor. The data analysis system 100 further includes one or more memories, such as random access memory ("RAM") for temporary storage of information, one or more read only memories ("ROM") for permanent storage of information, and one or more mass storage devices, such as a hard drive, diskette, solid state drive, or optical media storage device. Typically, the modules of the data analysis system 100 are connected to the computer using a standard based bus system. In different embodiments, the standard based bus system could be implemented in Peripheral Component Interconnect ("PCI"), Microchannel, Small Computer System Interface ("SCSI"), Industrial Standard Architecture ("ISA"), and Extended ISA ("EISA") architectures, for example. In addition, the functionality provided for in the components and modules of data analysis system 100 may be combined into fewer components and modules or further separated into additional components and modules.

The data analysis system 100 and/or its subcomponents are generally controlled and coordinated by operating system software, such as Windows XP, Windows Vista, Windows 7, Windows 8, Windows Server, UNIX, Linux, SunOS, Solaris, iOS, Blackberry OS, or other compatible operating systems. In Macintosh systems, the operating system may be any available operating system, such as MAC OS X. In other embodiments, the data analysis system 100 may be controlled by a proprietary operating system. Conventional operating systems control and schedule computer processes for execution, perform memory management, provide file system, networking, I/O services, and provide a user interface, such as a graphical user interface ("GUI"), among other things.

Network

In the embodiment of FIG. 6, the data analysis system 100 is electronically coupled to a network 160, which comprises one or more of a LAN, WAN, and/or the Internet, for example, via a wired, wireless, or combination of wired and wireless, communication link. The network 160 communicates with various computing devices and/or other electronic devices via wired or wireless communication links.

According to FIG. 6, in some embodiments information may be provided to or accessed by the data analysis system 100 over the network 160 from one or more external data source(s) 172. The local data store 170 and/or external data source(s) 172 may include one or more internal and/or external data sources. In some embodiments, one or more of the databases or data sources may be implemented using a relational database, such as Sybase, Oracle, CodeBase, MySQL, and Microsoft® SQL Server as well as other types of databases such as, for example, a flat file database, an entity-relationship database, and object-oriented database, and/or a record-based database.

Other Embodiments

Each of the processes, methods, and algorithms described in the preceding sections may be embodied in, and fully or partially automated by, code modules executed by one or more computer systems or computer processors comprising computer hardware. The code modules may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the programming notebook system 100, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. For example, a general purpose computer comprising one or more processors should not be interpreted as excluding other computer components, and may possibly include such components as memory, input/output devices, and/or network interfaces, among others. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

While certain example embodiments have been described, these embodiments have been presented by way of example only, and are not intended to limit the scope of the disclosure. Thus, nothing in the foregoing description is intended to imply that any particular element, feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

Additional Embodiments

Additional embodiments of the data analysis system 100 include features that may correspond to refreshing one or more nodes in a data analysis graph, modifying a data analysis graph, determining and/or presenting an abridged data analysis graph, a user interface for editing data corresponding to one or more nodes in a data analysis graph, a user interface for constructing one or more joins, a report user interface, a chart user interface, and/or an expression language for modifying a data node in a data analysis graph. The systems and methods described herein may improve existing computer technology and/or may be intrinsically tied to computer technology. Moreover, the systems and methods described herein may improve upon existing graphical user interfaces.

A data analysis graph may correspond to a data structure that represents the interactive data analysis user interfaces of the data analysis system 100, as described herein. There may be advantages for the systems and methods described herein to correspond to an immutable data model. A non-limiting example advantage of immutability is the ability to efficiently backtrack, e.g., using breadcrumbs and/or an undo/redo function, in a data analysis graph or path based on immutable nodes (for example, since every user interface selection is represented by a new versioned node, backtracking may be efficiently determined by following the data analysis graph and accessing previous versions of nodes and/or by following the current traversal within the data analysis graph). In the example, each step of the data analysis graph is represented by an immutable node, where each node is a data structure representation of (i) the user interactions with the user interfaces described herein and/or (ii) the data sets of the user interfaces described herein. The example immutable nodes may include the user interface options and the underlying data sets of the data analysis system 100. In the example, the nodes are immutable in that once they are generated they may not be deleted or updated. The example nodes are stored in the data source 170 and/or another data source of the data analysis system 100. However, performing certain actions such as refreshing data sets and/or modifying data analysis graphs (e.g., inserting a new node) may be technically challenging where the nodes are immutable.

The technical solutions described herein to implement features such as refreshing data sets and/or modifying data analysis graphs, such as in the context of immutable nodes, may correspond to generating one or more duplicate nodes from a data analysis graph, generating updated nodes, and linking at least some of the one or more duplicate nodes with the updated nodes in a new graph, thereby giving the illusion of refreshing or modifying, among other details, which are described in further detail herein. In the example, dynamically refreshing a data set and/or data analysis graph may be accomplished by determining an active path in the data analysis graph, copying one or more nodes in the active path, identifying or generating an updated version of the original data set as a new node, and the new node is linked to at least some of the copied one or more nodes, which provides the illusion of refreshing the data set. If a dataset is refreshed the graph can be refreshed as well. The active path can be duplicated and the starting node can point to the refreshed version of the dataset. As another example, inserting a new node (for example, a visualization node) in an existing data analysis graph may be accomplished by inserting an intermediate node in an existing graph and then copying the children nodes to the branch with the intermediate node. The technical solutions regarding improved computer graph nodes is described in further detail with respect to FIGS. 15 and 16.

Terms

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide example definitions.

Data Analysis Graph: Any data structure including one or more nodes that correspond to workflow user interfaces. Two or more nodes in the data structure may be connected and/or linked. One example data analysis graph is a tree data structure. In some embodiments, an example data analysis graph has two or more parent nodes. In the context of a data analysis graph: a "root node" is a top node in a graph; a "child node" and/or "sub-node" is a node that directly descends from a higher node; a "parent node" is the converse of a child; a child node has a "dependency" on a parent node; and a "descendent" is a node reachable by traversing from parent to child. A parent node may have one or more children. In some embodiments, an example data analysis graph is a directed graph and/or a directed acyclic graph. As described herein, the data structure can be visually represented in a user interface as a workflow. Further, the example data structure includes data representing user interactions with the workflow user interfaces and/or the data sets of the user interfaces. The terms "data analysis graph," "graph," "computer graph," and "tree view" may be used interchangeably and/or synonymously in the present disclosure. A data analysis graph may include two or more connected data analysis graphs. An abridged data analysis graph corresponds to a subset of two or more nodes from a data analysis graph. In some embodiments, the abridged data analysis graph excludes nodes that are non-transformative and/or do not modify data. In some embodiments, the abridged data analysis graph includes data set nodes and/or nodes that transform data and/or correspond to a source data set. The terms "abridged data analysis graph" and "data set recipe" may be used interchangeably and/or synonymously in the present disclosure.

Node (Data Node): Any data structure representation of user interactions with the user interfaces described herein and/or the data sets of the user interfaces. A node may be linked to one or more other nodes. In some embodiments, the link between two nodes can be directed. A node may include configuration data regarding the presentation of its underlying data set. In some embodiments, a node is immutable. However, in other embodiments, the data of a node may be modified. The terms "node," "data node," and "board" may be used interchangeably and/or synonymously in the present disclosure.

Active Path: One or more nodes of a data analysis graph. The active path represents a user's current and/or previously traversed workflow. In an example where the active path contains two or more nodes, the active path also contains the connected edges and/or links of the two or more nodes. The terms "active path" and "data analysis path" may be used interchangeably and/or synonymously in the present disclosure.

Additional Example User Interfaces

FIGS. 7-14 illustrate additional example user interfaces of the data analysis system 100, according to some embodiments of the present disclosure. In various embodiments, aspects of the user interfaces may be rearranged from what is shown and described below, and/or particular aspects may or may not be included.

Figure 7:
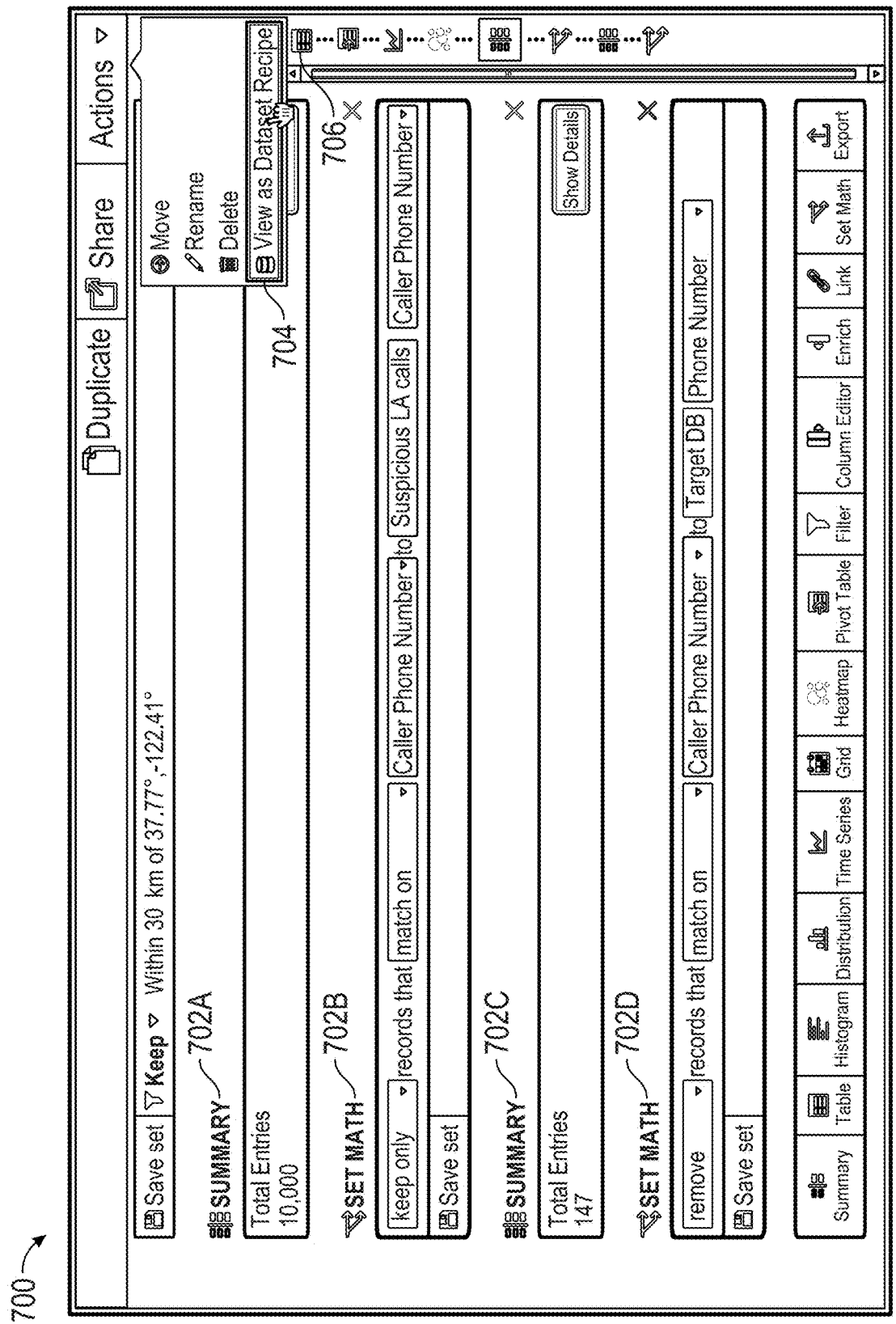
FIG. 7 illustrates another example workflow user interface of the data analysis system, according to some embodiments of the present disclosure.

FIG. 7 illustrates an example user interface 700 that presents a visualization of an example data analysis graph. The example user interface 700 may be similar to other user interfaces described herein, such as the user interfaces described in further detail with respect to FIGS. 1A-1M. For example, the user interface 700 includes elements 702A-702D that correspond to respective nodes from the data analysis graph. The example user interface 700 further includes control 706 that presents a summary of the data analysis path with respective visualization indicators (e.g., icons) for each node of the data analysis path. Accordingly, the example user interface 700 presents a workflow visualization to the user. As illustrated, the user interface 700 includes a view control 704 that when selected by user causes the data analysis system 100 to present an abridged data analysis graph, as described herein.

As described herein, example nodes may correspond to summary, table, histogram, distribution, time series, grid, heatmap, pivot table, filter, column editor, enrich, link, set math, export, and/or chart visualization. The following are descriptions of example nodes.

Summary Node: The example summary node presents the number of entries, such as rows, in the data set for the node. Additional features of the summary node include other configurable metrics that may be determined by the data analysis system 100 for the data set, such as unique values for a column; an average, standard deviation, variance, or any other statistical measure for a column, and/or a range for a column (such as a date range for a date column).

Table Node: An example table node may present a table or column view of the data set for the node. In an example table view, a configurable number of entries (such as the first 1,000) may be presented within the table node. In an example column view, column summary data may be presented for each column in the data set, such as column summary metrics including a percentage of null values, number of distinct values, and/or statistical measures such as the minimum, maximum, mean, or some of all values (in a numerical column). In some embodiments, the metrics may be precomputed or dynamically computed based on a user selection.

Histogram Node: An example histogram node aggregates the distinct values in a given column and displays the results as a chart, such as a bar chart. For example, a histogram may determine the average length of a taxi ride by which Chicago neighborhood it started in.

Distribution Node: An example distribution node presents the distribution of a numerical variable for an aggregate metric. The example distribution node may be similar to the histogram node, but may present aggregated data based on ranges of values, rather than specific values. In one example, a distribution node presents data about individuals" ages and ages are divided into ten ranges (or "buckets").

Time Series Node: An example time series node allows a user to group data by time intervals and calculate aggregate metrics on that data. In one example, given a data set with personal information about individuals, the time series node computes the number of people born on each day.

Grid Node: An example grid node may be similar to the histogram node, but the grid node aggregates data by two columns rather than one, and presenting a heat grid chart of the results. In some embodiments, for more than two columns, an example pivot table node may be used. In one example, a grid node compares education level to yearly income. The example grid node may be similar to the following SQL query: "SELECT [x-axis-column], [y-axis-column], <AGGREGATE_METRIC>([aggregate-column]) FROM <PARENT_NODE> GROUP BY [x-axis-column], [y-axis-column]."

Heatmap Node: An example heatmap node presents geo-coded data on a map, which may be color-coded to represent the values. In some embodiments, the heatmap dataset may include coordinate data that may correspond to latitude and longitude data or a geohash.

Pivot Table Node: An example pivot table node may enable a user to efficiently compute multiple aggregate values of a data set across multiple dimensions. In one example, given a dataset with demographic information about individuals, an example pivot table computes how many individuals (by age) are married females, married males, single females, or single males.

Filter Node: An example filter node applies customizable filters to the dataset for the node. In some embodiments, although a user may apply filters in other nodes (e.g., distribution, histogram), an example filter node allows a user to compile complex filters involving multiple variables in a single node. In an example filter node, if a user uses a list, the list may be similar to a "WHERE IN (x,y,z)" clause in SQL. The example filter node can efficiently handle lists of thousands of items (or larger).

Column Editor Node: The column editor node enables a user to remove columns from the corresponding data set and add new columns. Subsequent nodes will consume the resulting set of columns from the column editor Node. Removing columns via the example column editor node is similar to selecting column names in SQL. For example, given a table that has 5 columns, A-E, the following SQL statement, which is similar to the corresponding column editor operation, removes columns D and E: "SELECT columnA, columnB, columnC from tableName". Adding columns via the example column editor node is similar to using operators in SQL. For example, the following SQL statement, which is similar to the corresponding column editor operation, adds a new column for Income per person: "SELECT [Household Members], [Marital Status], [Income Column]/[Household Members] AS [Income per person] FROM [Table Name]".

Enrich Node: An example enrich node enables a user to join the current data set to another data set, and merge the matching results into the current data set. An example enrich node is described in further detail with respect to FIG. 13.

Link Node: An example link node enables a user to join to another (linked) set and return the results of that linked set. In some examples, the link node is used when data has been reduced to a set of keys that one would like to apply to another data set. For example, a user may have narrowed a list of suspicious individuals down to a few names, and the user would further want to look up those names in a different dataset containing personal information (address, phone number, etc.). Linking the rows in the original data set will select all the rows in the other dataset that match on a specified key (in this example, the key is the name). The following SQL statement may be similar to the link node operation: "SELECT [DISTINCT]<RightTable.Column1, RightTable.Column2, . . . > FROM (SELECT DISTINCT<join keys> from LeftTable) AS LeftTableKeys INNER JOIN RightTable ON <join condition 1> ([AN-D|OR]<join condition 2> [AND|OR]<join condition 3> . . . )".

Set Math Node: An example set math node enables a user to alter the current data set based on another set. Thus, a user can filter the data set to keep data that exists in the other dataset (e.g., "keep only"), append data from another dataset ("add"), and/or remove data based on the results of another dataset ("remove"). An example set math node is the set math node 920 of FIG. 9. The example "keep only" operation filters records in the current data set to records that either appear in or match ("match on") another data set. The "keep only-match on" operation may be similar to the left semi-join statement in SQL, such as: "SELECT L.* FROM L INNER JOIN (SELECT DISTINCT <join column> FROM R) AS R_KEY ON L.<join column>=R_KEY.<join column>". The "add" operation adds records from another data set to the current data set. The example "add" operation may be similar to the union statement in SQL. The example "remove" operation removes records in the current data set that either appear in or match ("match on") another data set. The "remove-match on" operation may be similar to the left outer join statement where the join keys do not match in SQL, such as: "SELECT L.* FROM L LEFT OUTER JOIN R ON L.<join column>=R.<join column> WHERE R.<join column> is null".

Export Node: An example export node enables a user to download the current data set in one or more formats such as a delimited format (e.g., CSV) or a spreadsheet data format.

Chart Node: An example chart node enables a user to generate a chart. An example chart node is described in further detail with respect to FIG. 14.

Figure 8:
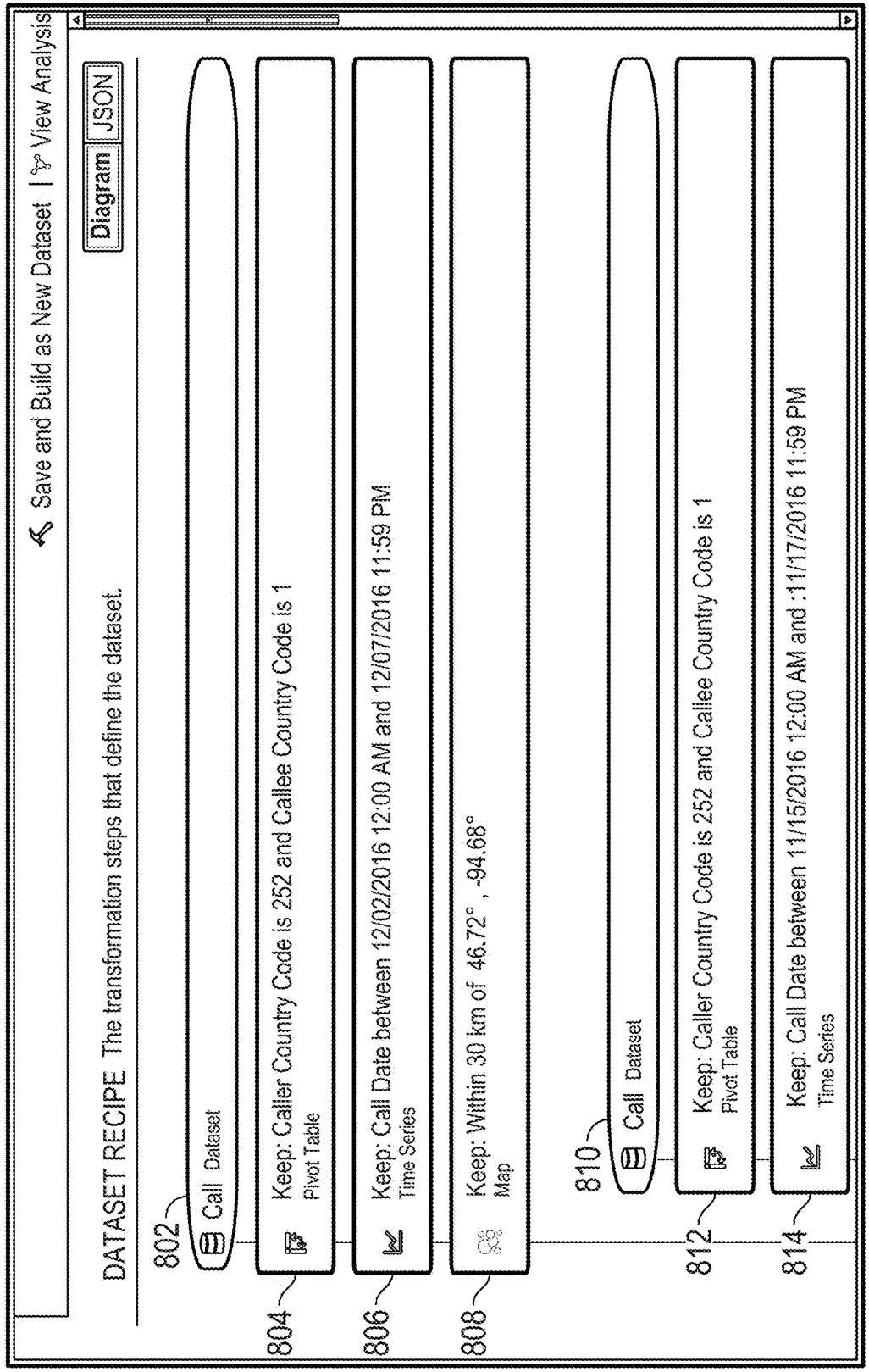
FIGS. 8 and 9 illustrate an example user interface of the data analysis system that presents an abridged data analysis graph, according to some embodiments of the present disclosure.

FIG. 8 illustrates an example user interface 800 that presents a visualization of an example abridged data analysis graph. In the example, the data analysis system 100 presents the abridged data analysis graph in response to a user selection of the view control 704 of FIG. 7. Accordingly, the example abridged data analysis graph of FIG. 8 corresponds to the example data analysis graph of FIG. 7. The example abridged data analysis graph includes the nodes 802, 804, 806, 808, 810, 812, and 814. As described herein, the example abridged data analysis graph corresponds to the nodes of a data analysis graph that correspond to data sets and/or transformations of data sets. Continuing with the example, non-transformation nodes and/or data set nodes would be removed in the presentation of the abridged data analysis graph.

In FIG. 8, the abridged data analysis graph begins with node 802 that corresponds to a data set of phone call records. From node 802, the next node 804 is a pivot table operation that transforms the data set from node 802 to keep records with a caller country code 252 (for Somalia) and a callee country code 1 (for the United States). From node 804, the next node 806 is a time series operation that further transforms the data set from node 804 to keep records with a call date between "Dec. 2, 2016 12:00 AM" and "Dec. 7, 2016 11:59 PM". From node 806, the next node 808 is a geographic map operation that transforms the data set from node 806 advantages to keep records with geographic locations within 30 km of the latitude and longitude coordinates of 46.72 degrees and −94.69 degrees (which roughly corresponds to New York City). The abridged data analysis graph also includes node 810 that corresponds another data set of phone call records. From node 810, the next node 812 again is a pivot table operation that transforms the data set from node 810 to keep records with a caller country code 252 (for Somalia) and a callee country code 1 (for the United States). From node 812, the next node 814 is a time series operation that further transforms the data set from node 812 to keep records with a call date between "Nov. 15, 2016 12:00 AM" and "Nov. 17, 2016 11:59 PM," which is a different time frame than the time frame of node 806.

Figure 9:
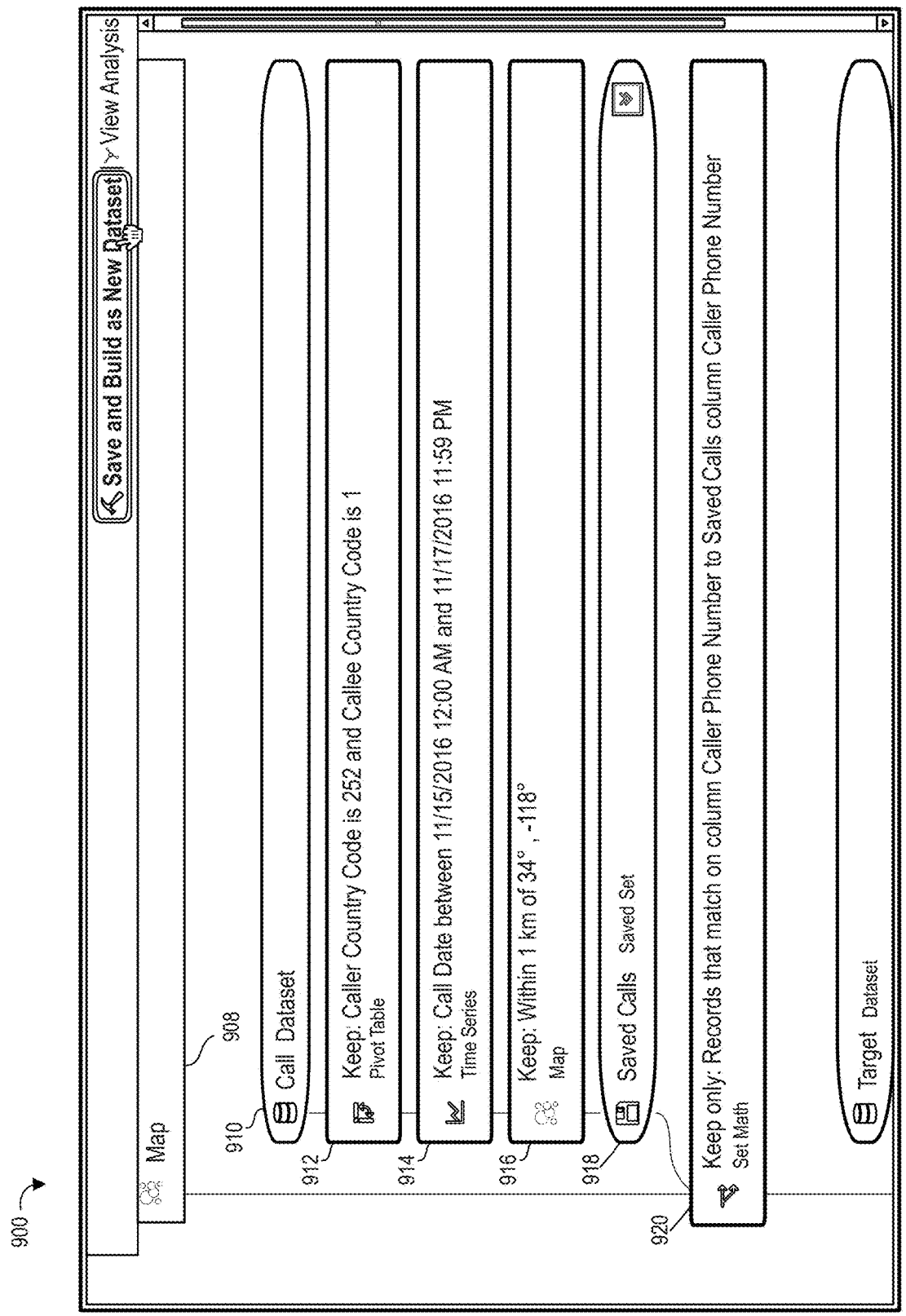

FIG. 9 illustrates an example user interface 900 that presents a continuation of the visualization for the example abridged data analysis graph shown in FIG. 8. For example, the nodes 808, 810, 812, and 814 of FIG. 8 correspond to the nodes 908, 910, 912, and 914 of FIG. 9, respectively. Continuing with the example of FIG. 8, from node 914, the next node 916 is a geographic map operation that transforms the data set from node 914 to keep records with geographic locations within 1 km of the latitude and longitude coordinates of 34 degrees and −118 degrees (which roughly corresponds to Los Angeles). From node 916, the next node 918 is a save operation to store the data set from node 916 as "Suspicious LA Calls." From node 918, the next node 920 is a set math operation to keep records that "match on" the column "Caller Phone Number" to the saved data set "Suspicious LA Calls" from node 918. In some embodiments, the set math operation at node 920 merges matching records from the "Suspicious LA Calls" data set at node 918 and the data set from node 908.

Advantages of the abridged data analysis graph shown in FIGS. 8 and 9 include presenting a condensed and/or efficient view of the current data analysis path. For example, the data analysis graph shown in FIG. 7 includes many non-transformation and/or non-data-set nodes. Accordingly, it may be difficult for a reviewer of the data analysis graph of FIG. 7 to efficiently understand the particular operations that resulted in the current data analysis paths and/or data sets. In contrast, the abridged data analysis graph shown in FIGS. 8 and 9 condenses the presentation of nodes to the nodes that correspond to the underlying data sets and/or the transformation nodes that manipulate those data sets. Thus, the presentation of the abridged data analysis graph provides an efficient view of the data analysis path.

In some embodiments, paths can be linked. A new path can be started from the resulting path of another path, such as by a user. The user can link, enrich, and/or join to the resulting set of a path just like dataset. A user can add layers in charts from resulting sets of other paths.

FIG. 10 illustrates an example user interface 1000 that presents a data analysis workspace. The data analysis workspace enables a user to organize multiple data analysis graphs. For example, a user may group two or more data analysis graphs that bear some relation to one another. The data analysis workspace may include some of the following features. As illustrated, the data analysis workspace includes a first presentation area 1002, which presents a visualize summary of a first data analysis graph, and a second presentation area 1020, which presents a visualize summary of a second data analysis graph. The first presentation area 1002 includes elements 1004, 1006, 1008, 1010, 1012, and 1014 that correspond to nodes of the first data analysis graph. Another feature of the example workspace is to provide a staleness alert 1016 that when selected by a user causes the data analysis system 100 to refresh the node, as described herein. Another advantage of the example workspace is to enable a user to generate a report from data from one or more data analysis graphs (reports from multiple data analysis graphs are supported).

In some embodiments, the refresh control 1016 can override the logic that creates a new data set in the external data source(s) 172 corresponding to the resulting set of a path in a data analysis graph. In other words, a user can save the resulting set of a path in a data analysis graph to a new data set in the external data source(s) 172. If a user changes the path in a data analysis graph, the logic may be out of date. Accordingly, user selection of the refresh control 1016 can update the logic to create that new data set in the external data source(s) 172.

In some embodiments, the data analysis workspace of user interface 1000 enables a user to open a data analysis graph, such as the example data analysis graph 1002. As described herein, presentation of a data analysis graph may correspond to the user interfaces described in further detail herein with reference to FIGS. 1A-1M and/or 7. Continuing with the example, a user may select a presented node, such as the nodes from FIGS. 1A-1M and/or 7, to further edit the data set for the node. For example, the data analysis system 100 may enable a user to edit the data set corresponding to the table node 1008 of FIG. 10.

Figure 11:
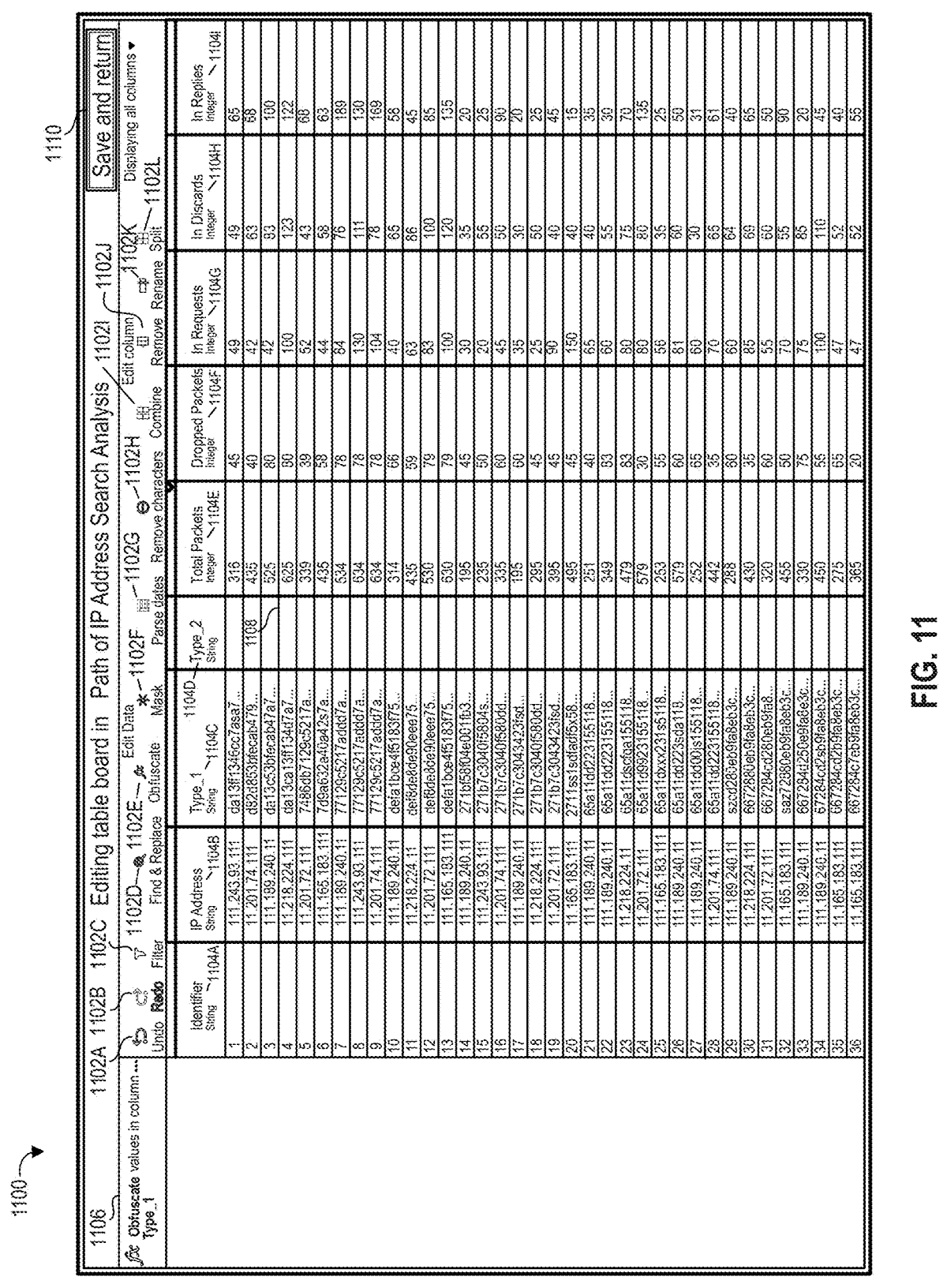

FIG. 11 illustrates an example user interface 1100 that enables a user to edit a data set. The example user interface 1100 includes function selectors 1102A-1102L. The example function selectors include an undo function selector 1102A, a redo function selector 1102B, a filter function selector 1102C, a find and replace function selector 1102D, an obfuscate function selector 1102E, a mask function selector 1102F, a parse dates function selector 1102G, a remove characters function selector 1102H, a combine column function selector 1102I, a remove column function selector 1102J, a rename column function selector 1102K, and a split column function selector 1102L. In some embodiments, the example user interface 1100 includes other spreadsheet functions. The example user interface 1100 further includes columns 1104A-1104I and rows that represent the data set for the node. As illustrated, user selection of the obfuscate function selector 1102E as applied to the "Type_1" column 1104C causes the data analysis system 100 to obfuscate the data. An example of anonymization of data includes the data analysis system 100 replacing original data values with replacement data values. An example replacement data value is a randomized or pseudo-randomized character and/or number string, such as a hash string and/or a Globally Unique Identifier (GUID). The example user interface 1100 further includes summary representations of applied functions, such as the summary element 1106 that indicates that the obfuscate function was applied to the "Type_1" column 1104C. In some embodiments, the user interface 1100 can show the entire path. The save selector 1110 enables a user to save the modifications to the data set. Additionally or alternatively, the user interface 100 can include an autosave feature. Accordingly, in some embodiments, the user interface 100 does not include the save selector 1110. As described herein, modifications to the data set may be saved as a new node in the data analysis system 100.

Figure 12:
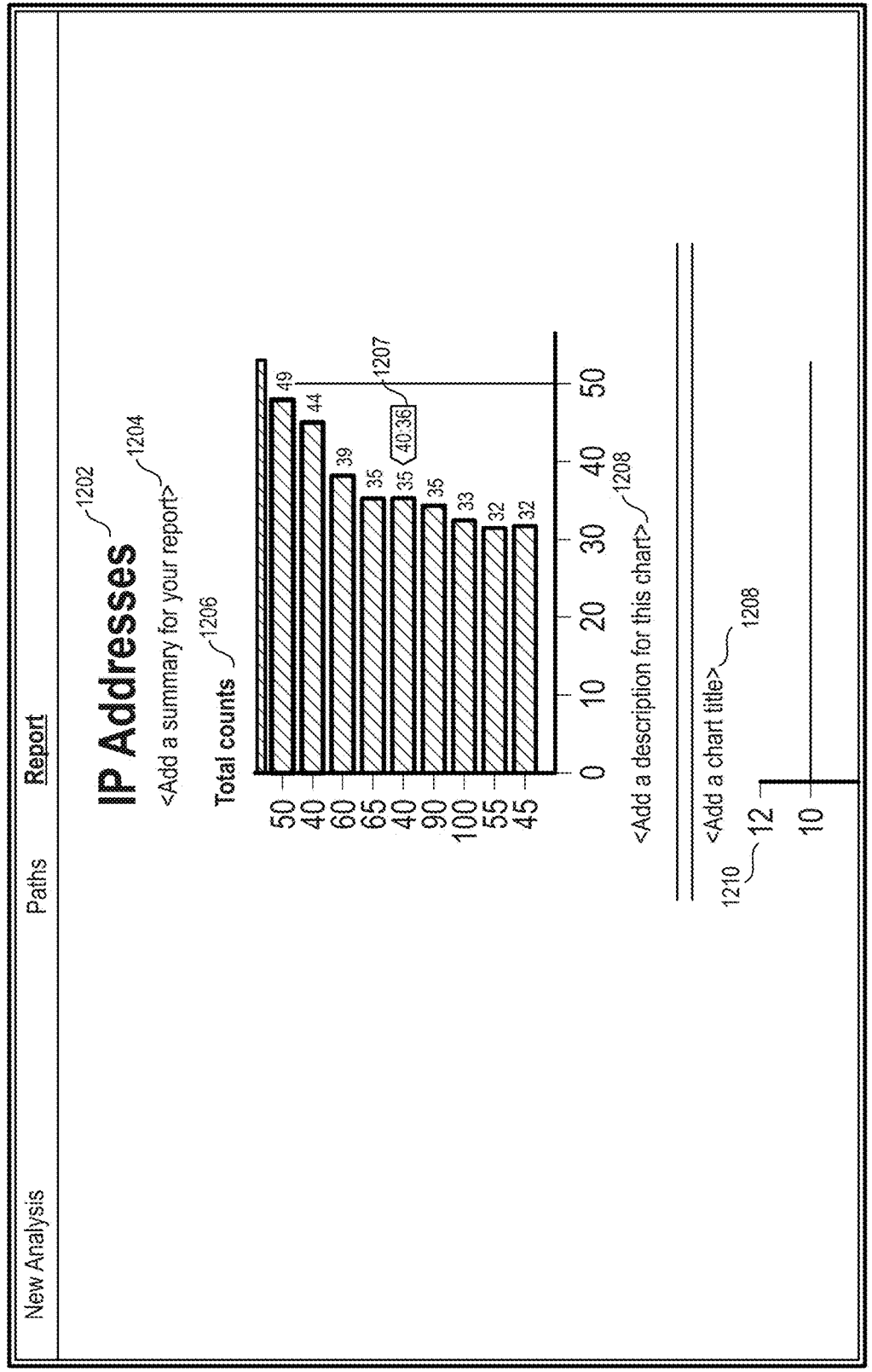
FIG. 12 illustrates an example report user interface of the data analysis system, according to some embodiments of the present disclosure.

FIG. 12 illustrates an example report user interface 1200 that enables a user to generate a dynamic and/or interactive report from one or more data analysis graphs. The example report includes charts 1206 and 1208, and text elements 1202, 1204, and 1208. The example text elements 1202, 1204, and 1208 are headers or chart descriptors that are editable by a user. A user may add or remove charts. Example charts include bar charts, multi-bar charts, line charts, scatter plot charts, pie charts, tables, pivot tables, and/or other types of charts. The example chart 1206 is interactive where a user may zoom in, zoom out, click and drag, and/or obtain additional information for the entire chart or portions of the chart. Example additional information is the element 1207 that is presented based on a user selection of the x-axis of the example chart 1206. The example chart 1206 can be dynamic in that if the underlying data set for the chart has been updated, then the data analysis system 100 presents the chart 1206 with a staleness indicator that a user may select to automatically refresh the chart, as described herein. In some embodiments, a user can set the whole report to auto-refresh whenever there is new data and/or the staleness indicator may not be shown.

While not illustrated in FIG. 12, in some embodiments, the report user interface 1200 may include additional features. A user may view the data in a chart in a table below the chart. A user may filter the data in the table by making a selection in the chart. A user may export the table to another format, such as a delimited format that includes CSV. A user may generate a new analysis graph from the chart where the path from root up to that chart will be copied and added to a new analysis graph and/or workspace for further exploration.

Figure 13:
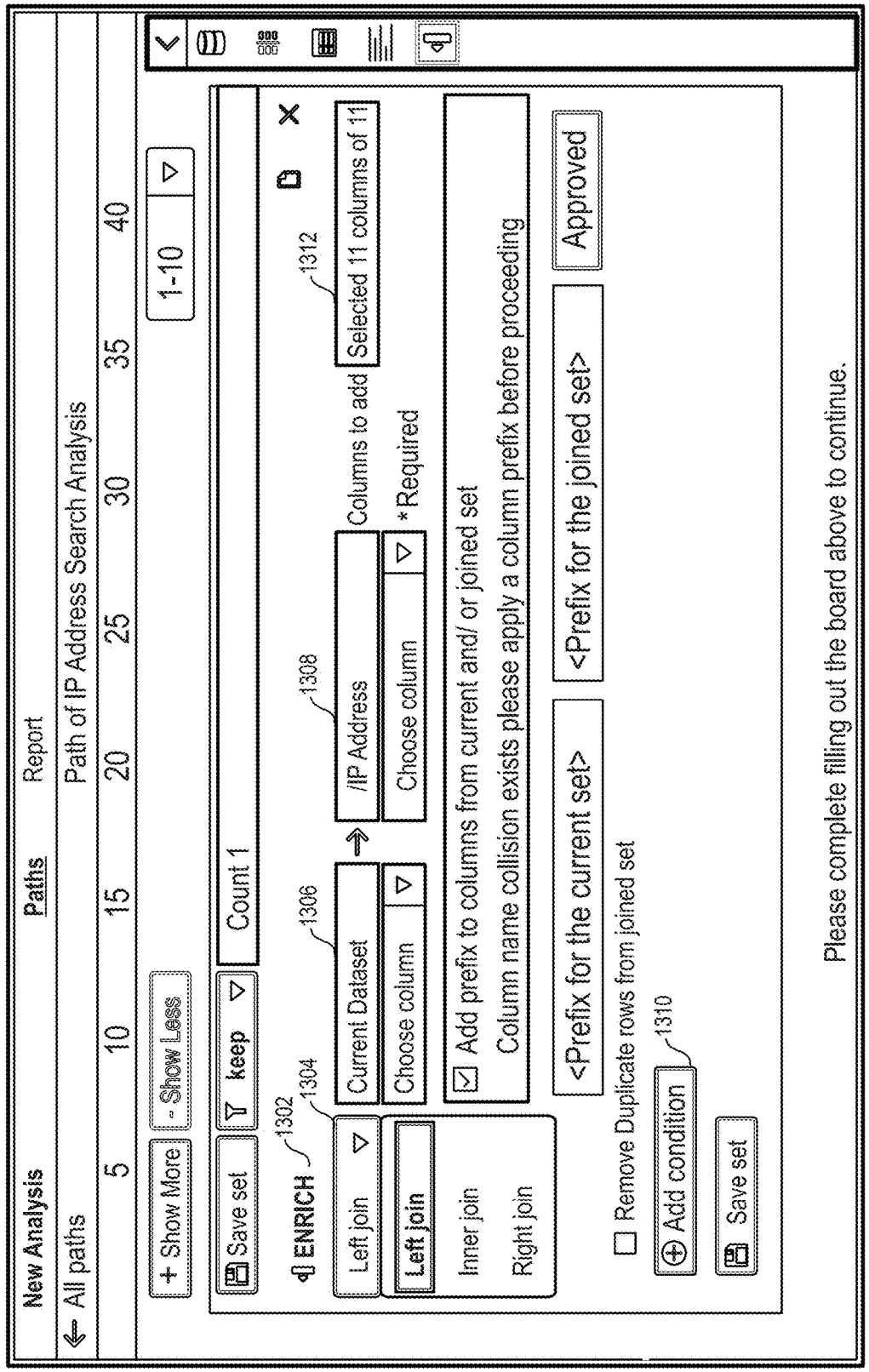
FIG. 13 illustrates an example enrichment user interface of the data analysis system, according to some embodiments of the present disclosure.

FIG. 13 illustrates an example user interface 1300 with a data analysis path that includes an example enrich node interface 1302. As described herein, an example enrich node enables a user to join the current data set to another data set, and merge the matching results into the current data set. As illustrated, a user can select join selector 1304 that includes the example "left join," "inner join," or a "right join" options.

An example inner join generates a new data set by combining two data sets that satisfy the join condition. An example left join (or left outer join) similarly generates a new data set by combining two data sets; however, for data sets A and B, the generated data set contains entries of the "left" data set (A), even if the join condition does not find any matching entry in the "right" data set (B). The example left join returns the entries from an inner join plus the entries in the left table that do not match to the right table, in some cases, this includes entries with NULL (empty) values. An example right join (or right outer join) generates a new data set by combining two data sets and in a similar manner as the left join, except that the data sets (A and B) are reversed. The inner, left join, and right join operations of the enrich node may be similar to the following SQL equivalent: "SELECT [DISTINCT] <Column1, Column2, . . . > FROM CurrentTable <INNER JOIN|LEFT OUTER JOIN|RIGHT OUTER JOIN> OtherTable ON <join condition 1> ([AND|OR]<join condition 2> [AND|OR]<join condition 3> . . . )".

The example enrich node interface 1302 includes the current data set 1306 and the "right" data set 1308 to be joined. In the example, the "Choose column" selectors enable a user to select a respective column from each data set to perform the join condition such that each respective column is used as a key. A user may add additional join conditions with the add condition selector 1310. In some embodiments, if a user selects to join multiple keys, the interface 1302 provides a "Match Any" and/or "Match All" conditions. The join column selector 1312 enables a user to select the columns from the other set to add to the resulting data set. Accordingly, a user can join two or more data sets using the enrich node interface 1302.

While not shown in FIG. 13, in some embodiments, the user interface 1300 can include a join user interface board that allows a user to choose from a list of fully pre-configured joins that can specify the dataset to join on, what key to join on, and/or what join type, with descriptions for ease of use.

Figure 14:
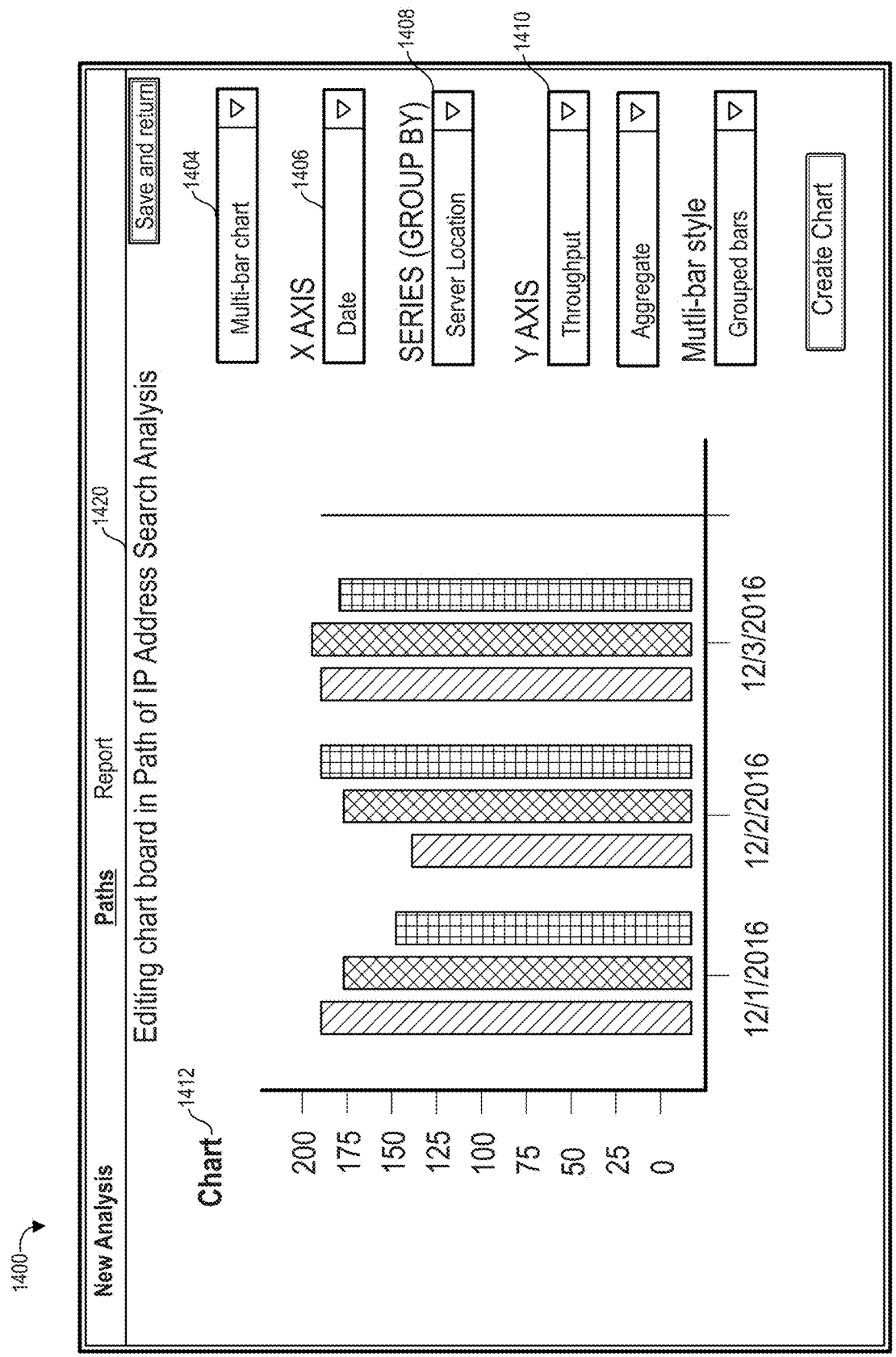
FIG. 14 illustrates an example chart user interface of the data analysis system, according to some embodiments of the present disclosure.

FIG. 14 illustrates an example user interface 1400 with a data analysis path that includes an example chart node interface 1420. As described herein, an example chart node enables a user to generate a chart from the current data set. As illustrated, a user can select multiple options to generate a chart. For example, a user can select the chart type selector 1404. Example chart types include a multi-bar chart, a line a chart, a scatter plot chart, a pie chart, and/or other charts. In the multi-bar chart example, the chart node interface 1420 includes an x-axis selector 1406, a segment by selector 1408, and a y-axis selector 1410. In some embodiments, the user interface corresponding to the chart node includes functionality similar to pivot table capabilities of spreadsheet applications.

In the example of FIG. 14, a user has selected a multi-bar chart for IP addresses as grouped by server location. The example chart visualization 1412 presents the IP address data as grouped by server location and indicates throughput (in megabytes, for example) in the y-axis and by date in the x-axis, which may correspond to the user selections of the chart type selector 1404, the x-axis selector 1406, the group by selector 1408, and the y-axis selector 1410. Additional example chart types that can be selected in the chart type selector 1404 include clustered bar charts, stacked bar charts, and relative bar charts, such as one hundred percent bar charts.

While not shown in FIG. 14, in some embodiments, additional layers can be added to a chart, such as a line overlaying bars, and presented in the user interface 1400. The new one or more layers can be configured in tabs in the configuration panel. Each layer can define the data source it uses, either the data in the current node in the current path or the resulting set of another data analysis graph or another data set.

Example Data Analysis Graph

FIGS. 15A-15E depict example representations of data analysis graphs, which may have been generated by the data analysis system 100. With respect to FIG. 15A, the data environment 1500 includes an example data analysis graph 1501A at a first time (such as T=0). The example data analysis graph 1501A includes nodes 1502, 1504A, 1506A, and 1508A. As described herein, the nodes 1502, 1504, 1506A, and 1508A are data structure representations of the user interactions and/or the data sets of the user interfaces described herein, such as any of the user interfaces described with reference to FIGS. 1A-1M and/or 7-12. For example, each of the nodes 1502, 1504, 1506A, and 1508A may correspond to visualizations described herein, such as a summary, table, histogram, distribution, time series, created, heatmap, pivot table, filter, column editor, enrich, link, set math, and/or export visualization.

In some embodiments, each of the nodes 1502, 1504, 1506A, and 1508A may be stored in one or more data formats. As described herein, the data analysis system 100 may treat each of the nodes as immutable. An example data format of the nodes 1502, 1504, 1506A, and 1508A is a JavaScript Object Notation (JSON) data format. Accordingly, each of the example nodes 1502, 1504, 1506A, and 1508A is stored in a file. Additionally or alternatively, other example data formats include a database format, eXtensible Markup Language (XML), or a format that is proprietary to the data analysis system 100.

With respect to FIG. 15B, the data environment 1520 includes an example data analysis graph 1501B. The example data analysis graph 1501B may be similar to the example data analysis graph 1501A of FIG. 15A. For example, the example data analysis graph 1501B corresponds to the same data analysis graph 1501A but at a second time (such as T=1). Continuing with the example, the node 1504A is immutable (and the other nodes as well); accordingly, if there is an update in the node configuration corresponding to the node 1504A the data analysis system 100 generates a new node 1510 with the updated node configuration. A change to the node configuration can result in a duplicate node with child nodes propagated. In the example, the data analysis system 100 further duplicates the remaining nodes 1506A and 1508A to result in the duplicate nodes 1506B and 1508B. Accordingly, the path of the data analysis graph 1501B corresponding to nodes 1502, 1510, 1506B, and 1508B may be presented to the user, which provides the changes in node configurations corresponding to the original path 1502, 1504A, 1506A, and 1508A, but a new set of nodes have been generated where one of the nodes has the refreshed data. In the example corresponding to FIGS. 15A and 15B, the immutableness of the data model is not violated.

With respect to FIG. 15C, the data environment 1530 includes an example data analysis graph 1501C. The example data analysis graph 1501C may be similar to the example data analysis graph 1501B of FIG. 15B. For example, the example data analysis graph 1501C corresponds to the same data analysis graph 1501B but at a third time (such as T=2). Continuing with the example, the node 1506B is immutable (and the other nodes as well); accordingly, if there is a change to the node configuration corresponding to the node 1506B the data analysis system 100 generates a new node 1512 with the updated data. In the example, the data analysis system 100 further duplicates the remaining node 1508B to result in the duplicate node 1508C. Accordingly, the path of the data analysis graph 1501C corresponding to nodes 1502, 1510, 1512, and 1508C may be presented to the user, which provides the changes in node configurations corresponding to the previous path 1502, 1510, 1506B, and 1508B. Again, in the example corresponding to FIGS. 15A-15C, the immutableness of the data model is not violated.

With respect to FIG. 15D, the data environment 1540 includes an example data analysis graph 1501D. The example data analysis graph 1501D may be similar to the example data analysis graph 1501C of FIG. 15C. For example, the example data analysis graph 1501D corresponds to the same data analysis graph 1501C but at a fourth time (such as T=3). Continuing with the example, a user may add a new visualization (or any available action or step in the data analysis system) to the active path. Accordingly, a new node 1514 corresponding to the new visualization is added to the data analysis graph 1501D. Moreover, FIG. 15D further illustrates that the data analysis system 100 identifies the current active path 1516 that includes nodes 1502, 1510, 1512, 1508C, and the new node 1514. Accordingly, the active path 1516 may be presented to the user, which may correspond to any of the user interfaces described in further detail with respect FIGS. 1A-1M, 7, and/or 10. Again, in the example corresponding to FIGS. 15A-15D, the immutableness of the data model is not violated.

As described herein, the data analysis system 100 may determine an abridged data analysis graph from the active path. For example, an abridged data analysis graph corresponds to the active path 1516 with only the nodes that correspond to data sets and/or transformations of data sets (e.g., filter, enrich, set math, pivot table, time series, and/or heatmap). In one example, if node 1514 corresponds to a presentation node (e.g., a summary type node, an export node, or a chart node) and the remaining nodes in the active path 1516 correspond to data transformation type and/or data set nodes then the data analysis system would identify the abridged data analysis graph as nodes 1502, 1510, 1512, and 1508C.

With respect to FIG. 15E, the data environment 1520 includes an example data analysis graph 1501E. The example data analysis graph 1501E may be similar to the example data analysis graph 1501A of FIG. 15A. For example, the example data analysis graph 1501B corresponds to the same data analysis graph 1501A but at another second time (such as T=1'). Continuing with the example, a user may want to "insert" a new node into the data analysis graph 1501A between nodes 1502 and 1504A. Accordingly, since the nodes are immutable, the data analysis system 100 generates a new node 1518 and duplicates the nodes after the insertion point (here nodes 1504A, 1506A, 1508A are duplicated as nodes 1504B, 1506B, and 1508B, respectively). The data analysis system 100 provides the illusion of an "insertion" by connecting the new node 1518 to the first node before the "insertion" (here root node 1502) and to the first duplicated node (here node 1504B). Again, in the example corresponding to FIGS. 15A and 15E, the immutableness of the data model is not violated.

There may be technical advantages to the systems and methods for graph manipulation as described herein. For example, the use of graphs and nodes for data analysis may enable efficient addition to existing data structures without endangering current functionality. The existing data structures and schemas for the graph models described herein can be highly flexible. For example, new node types and relationships can be added to existing graph data structures.

Example User Interface and Data Analysis Processes

Figure 16:
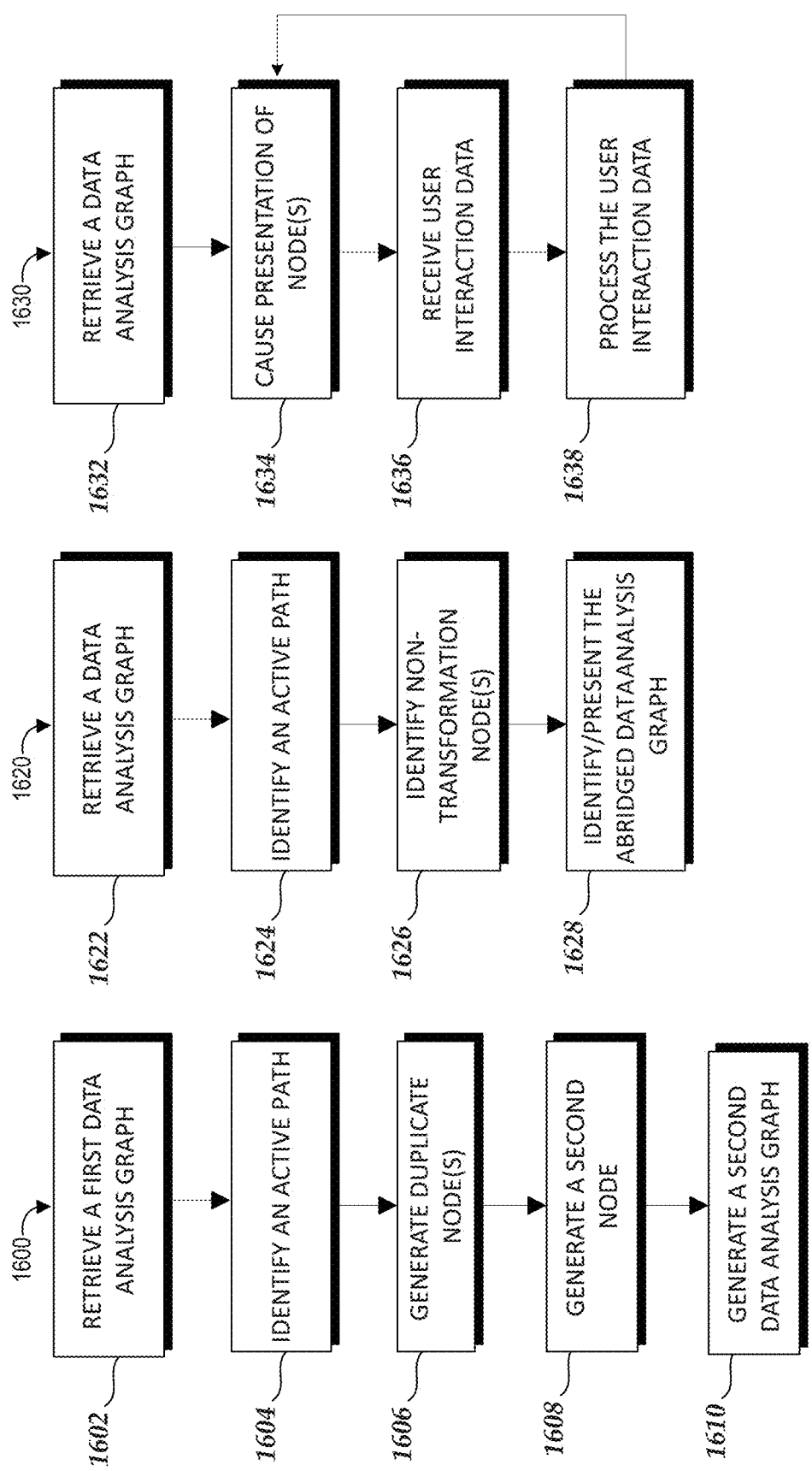
FIG. 16 illustrates flowcharts that correspond to example workflow processes, according to some embodiments of the present disclosure.

FIG. 16 includes a flowchart of an example method 1600 for "refreshing" and/or "modifying" a data analysis graph, according to some embodiments of the present disclosure. Although the method 1600 is described in conjunction with the systems of FIG. 6, any system configured to perform the method, in any order, is within the scope of this disclosure. The method 1600 may be performed by the data analysis system 100 of FIG. 6. Depending on the embodiment, the method 1600 may include fewer or additional blocks and/or the blocks may be performed in an order different than is illustrated.

At block 1602, the data analysis system 100 retrieves a first data analysis graph. An example first data analysis graph corresponds to the data analysis graph 1501A of FIG. 15A. In some embodiments, the data analysis system 100 retrieves the first data analysis graph from the data source 170. Portions of additional example data analysis graphs are presented in the user interfaces of FIGS. 7 and/or 10. Accordingly, the example method 1600 to "modify" and/or "refresh" a data analysis graph may be initiated by a user via the user interfaces of FIGS. 7 and/or 10, for example. In the "refresh" example, the user selects the "refresh" control 1016 of FIG. 10 to initiate a data refresh for the node 1014 within the data analysis graph shown within the first presentation area 1002. As described herein, the first data analysis graph may include one or more nodes.

In some embodiments, the data analysis system 100 receives a request to update and/or modify a data analysis graph. In some embodiments of the refresh example, a user may select a refresh control that transmits a refresh request to the data analysis system 100, and the refresh request may include data that indicates the data analysis graph and/or node to be refreshed. In other embodiments, the data analysis system 100 automatically refreshes the data node, which might be triggered by a determined update to the data source associated with the data node. In some embodiments of the modification example, a user, via a user interface, may select user interface options to insert and/or delete a node from a data analysis graph. An example modification request is a node insertion request. In some embodiments, the data analysis system 100 receives a node insertion request via the user interface, such as the user interface 700 of FIG. 7. In the FIG. 7 example, a user may specify to insert a node between two existing nodes of the data analysis graph. Accordingly, the example node insertion request includes data that corresponds to a node insertion point. In the example of FIG. 15E, an example insertion point is between nodes 1502 and 1504A.

In some embodiments, the data analysis system 100 determines and/or receives notifications that there has been an update to a data source that corresponds to the data set for a particular node in a data analysis graph. In some embodiments, the data analysis system 100 monitors the data sources 172 for updates to data. In other embodiments, the data analysis system 100 receives notifications from a notification service associated with the data sources 172 when there has been an update to data. In some embodiments, a node may include metadata that indicates the data source for its data set, such that when the data analysis system 100 determines and/or receives notifications that there has been an update to the data source, the data analysis system 100 may determine the corresponding affected nodes by identifying nodes that sourced data from the updated data source. As described herein, the example data analysis system 100 presents a notification to a user when there has been an update to the data source of a node and/or a node has stale data.

At block 1604, the data analysis system 100 identifies an active path of the first data analysis graph. The example active path corresponds to one or more linked nodes in the first data analysis graph that represent a user's selected traversal through the graph that is being presented within the user interface. An example active path is the active path 1516 of FIG. 15D. In some embodiments, the data analysis system 100 stores historical user interaction data, such as breadcrumb data, for each user selection of a node in a graph, which the data analysis system 100 can later access to identify the active path. For example, in the example of FIG. 15D, the data analysis system 100 stores data that indicates the user has selected nodes 1502, 1510, 1512, 1508C, and 1514 for presentation.

In some embodiments, the data analysis system 100 stores historical user interaction data that includes a current node. An example current node is a leaf node in a data analysis graph. In the example of FIG. 15B, the current node is the node 1508B. The example data analysis system 100 identifies the current node from the historical user interaction data based on metadata identifying a node as the currently selected node in a particular traversal of the data analysis graph. The example data analysis system 100 further identifies the active path as one or more nodes based on a dependency of the current node. Continuing with the example of FIG. 15B, the current node 1508B has dependencies on nodes 1506B, 1510, and 1502, which may be determined based on the links (which can be directed) between nodes 1508B, 1506B, 1510, and 1502. Accordingly, in the example of FIG. 15B, the data analysis system 100 identifies the active path as nodes 1502, 1510, 1506B, and 1508B. As another example, in FIG. 15D, the current node is node 1514, which has dependencies on nodes 1508C, 1512, 1510, and 1502, and the data analysis system 100 identifies the active path as nodes 1502, 1510, 1512, 1508C, and 1514.

At block 1606, the data analysis system 100 generates one or more duplicate nodes. The data analysis system 100 determines which nodes to duplicate based on the active path. In some embodiments of the node configuration update example, the data analysis system 100 identifies the data node to be refreshed. Continuing with the example, the data analysis system 100 duplicates one or more nodes from the first data analysis graph that follow the identified data node. In the example of FIGS. 15A and 15B, the data analysis system 100 identifies node 1504A to be refreshed. Accordingly, in the example, the data analysis system 100 duplicates nodes 1506A and 1508A as new nodes 1506B and 1508B, respectively, because the nodes 1506A and 1508A follow the identified node 1504A.

In some embodiments of the data insertion example (sometimes referred to herein as "modifying a data analysis graph"), the data analysis system 100 identifies the data node that precedes the insertion point. In some embodiments of the example of FIGS. 15A and 15E, the node insertion point within the data analysis graph 1501A is between nodes 1502 and 1504A. Accordingly, the node that precedes the insertion point is node 1502. Continuing with the example, the data analysis system 100 duplicates 1504A, 1506A, and 1508A as new nodes 1504B, 1506B, and 1508B, respectively, because the nodes 1506A, 1506A, and 1508A follow the identified node 1502.

At block 1608, the data analysis system 100 generates a second node. In the node configuration update example, the generated second node corresponds to a modified first data node. In the example of FIGS. 15A and 15B, the data analysis system 100 generates a modified first data node 1510 based on the configuration change that corresponds to user actions through the user interface. In the data insertion example, the generated second node corresponds to a new node that may be different than a new node in the node configuration update example.

At block 1610, the data analysis system 100 generates a second data analysis graph. In some embodiments, the data analysis system 100 generates the second data analysis graph from the duplicate nodes and the generated second node. In some embodiments, the data analysis system 100 connects the generated second node and the duplicate nodes to generate the second data analysis graph. Depending on the embodiment, the first and second data analysis graphs may or may not be connected and/or linked together.

In some embodiments, the data analysis system 100 connects the first data analysis graph and the second data analysis graph. In the node configuration update example, the data analysis system 100 identifies the parent node of the data node that was refreshed (e.g., the data node that precedes the data node that was refreshed). In the example of FIGS. 15A and 15B, the data analysis system 100 identified node 1502 as the parent node of the updated first data node 1510 (also referred to herein as the "generated second node"). Accordingly, the data analysis system 100 generates a link between the parent node and the updated first data node. In some embodiments, the active path of the data analysis graph, which is described herein, can be copied standalone. Accordingly, in the example of FIGS. 15A and 15B, the data analysis system 100 generates a link between the identified node 1502 and the updated first data node 1510, which is further connected to the duplicate nodes 1506B and 1508B. In the example of FIG. 15B, the first and second data analysis graphs are connected together.

Continuing with the example, the first data analysis graph includes the first data node and two or more additional nodes that are linked according to a first order. In the example of FIGS. 15A and 15B, the node 1502 is the first data node, and the nodes 1504A, 1506A, and 1508A are linked in that order. Continuing with the example, the data analysis system 100 generates a first link between the updated first node and a duplicate node. Further, the example data analysis system 100 generates a second link between the duplicate nodes (which includes at least two nodes) according to the first order. In the example of FIGS. 15A and 15B, the data analysis system 100 generates a link between the duplicate nodes 1506B and 1508B according to the order of the corresponding nodes 1506A and 1508A.

In the data insertion example, the data analysis system 100 identified the data node that preceded the insertion point. The example data analysis system 100 links the identified node to the generated second node as indicated by the insertion point, and links the generated second node to a duplicate node as indicated by the insertion point. In the example of FIGS. 15A and 15E, the data analysis system 100 identified node 1502 as the node that preceded the insertion point. Accordingly, in the example of FIGS. 15A and 15E, the data analysis system 100 links the identified node 1502 to the generated second node 1518 as indicated by the insertion point, and links the generated second node 1518 to the duplicate node 1504B as indicated by the insertion point. In some embodiments, the data analysis system 100 further connects the remaining duplicate nodes. In the example of FIG. 15E, the data analysis system 100 links the duplicate nodes 1504B, 1506B, and 1508B according to a determined order, as described herein. In the example of FIG. 15E, the first and second data analysis graphs are connected together (and in some embodiments the first and second data analysis graphs may share one or more common nodes).

FIG. 16 includes a flowchart of an example method 1620 for generating and/or identifying an abridged data analysis graph, according to some embodiments of the present disclosure. Although the method 1620 is described in conjunction with the systems of FIG. 6, any system configured to perform the method, in any order, is within the scope of this disclosure. The method 1620 may be performed by the data analysis system 100 of FIG. 6. Depending on the embodiment, the method 1620 may include fewer or additional blocks and/or the blocks may be performed in an order different than is illustrated.

At block 1622, the data analysis system 100 retrieves a data analysis graph. The block 1622 may be similar to the block 1602 of the example method 1600. In some embodiments, the data analysis system 100 retrieves the data analysis graph from the data source 170. Portions of an example data analysis graph are presented in the user interface 700 of FIG. 7. Accordingly, the example method 1620 to generate an abridged data analysis graph may be initiated by a user via the user interface 700 of FIG. 7. Continuing with the example, the user selects the view control 704 of FIG. 7 to initiate generation and/or identification of the abridged data analysis graph.

At block 1624, the data analysis system 100 identifies an active path of the data analysis graph. Block 1624 may be similar to the block 1604 of the example method 1600.

At block 1626, the data analysis system 100 identifies non-transformation node(s) from the active path. In some embodiments, the data analysis system 100 may identify non-transformation nodes based on a predetermined list of node types that do not perform transformations (such as a list including an export node type and a chart node type, for example). In the example, the data analysis system 100 identifies a non-transformation node by determining a node type from a node in the active path. Example node types include a summary node type, a table node type, a histogram node type, a distribution node type, a time series node type, a grid node type, a heatmap node type, a pivot table node type, a filter node type, a column editor node type, an enrich node type, a link node type, a set math node type, an export node type, and/or a chart node type. An example list of non-transformation node types includes an export node type and a chart node type, and, in some embodiments, the remaining example node types may correspond to transformation node types. Additionally or alternatively, the data analysis system 100 may dynamically analyze the nodes in active path determine whether the node includes a transformation operation. In the example of FIG. 15D, the data analysis system 100 identifies that the node 1514 is a non-transformation node (and not a data set node), such as an export node or a chart node.

At block 1628, the data analysis system 100 identifies the abridged data analysis graph from the active path and the identified non-transformation node(s). In some embodiments, the data analysis system 100 identifies the abridged data analysis graph by omitting the identified non-transformation node(s) from the set of nodes in the active path. In the example of FIG. 15D, the active path 1516 includes nodes 1502, 1510, 1512, 1508C, and 1514. Accordingly, the data analysis system 100 identifies the abridged data analysis graph as nodes 1502, 1510, 1512, and 1508C by omitting the non-transformation node 1514 from the set of nodes in the active path 1516. The data analysis system 100 may present the identified an abridged data analysis graph. An example presentation of an abridged data analysis graph is described in further detail with respect to FIGS. 8 and 9.

FIG. 16 includes a flowchart of an example method 1630 of generating one or more user interfaces and/or nodes, according to some embodiments of the present disclosure. Although the method 1630 is described in conjunction with the systems of FIG. 6, any system configured to perform the method, in any order, is within the scope of this disclosure. The method 1630 may be performed by the data analysis system 100 of FIG. 6. Depending on the embodiment, the method 1630 may include fewer or additional blocks and/or the blocks may be performed in an order different than is illustrated. In some embodiments, the example method 1630 may correspond to the user interfaces of FIGS. 11-14.

At block 1632, the data analysis system 100 retrieves a data analysis graph. The block 1632 may be similar to the block 1602 and/or the block 1622 of the example methods 1600 and/or 1620, respectively.

At block 1634, the data analysis system 100 causes presentation of one or more nodes. In the example user interface that enables a user to edit a data set, the data set associated with the node is presented, which is described in further detail with respect to FIG. 11. In the example report user interface, report user interfaces are presented with respect to one or more nodes, which is described in further detail with respect to FIG. 12. In the example enrich node user interface, data associated with the enrich node is presented, which is described in further detail with respect to FIG. 13. In the example chart node user interface, data associated with the chart node is presented, which is described in further detail with respect to FIG. 14.

At block 1636, the data analysis system 100 receives user interaction data. In the data editing example, example user interaction data includes one or more selected function operations and/or new data values. Example function operations on a data set include an undo function, a redo function, a filter function, a find and replace function, an obfuscate function, a mask function, a parse dates function, a remove characters function, a combine column function, a remove column function, a rename column function, a split column function, and/or other spreadsheet functions, as described herein in further detail with respect to FIG. 11. Example new data values may be received via the user interface 1100 of FIG. 11, as described herein.

In some embodiments, the user interaction data includes data corresponding to an expression language. An example data analysis system 100 enables a user to use an expression language to modify data in a data set. For example, a user may specify some two or more columns in an expression language. In another example, a user may specify conditional logic in the expression language, such as if a cell value equals value X, then perform some function. In some embodiments, expression language input may be received via the user interface 1100 of FIG. 11. The example data analysis system 100 receives expression language data via user input. For example, the expression language may data may include user input, such as the textual data "SUM (ColumnA, ColumnB)". Accordingly, the expression language may include a set of defined functions that can be selected and/or entered by a user in an expression language and be dynamically applied to the data set of a node to generate a new data set and/or new data values. Other example functions include count, count non-empty cells, count the number of characters in a cell, remove whitespace in a cell, lookup a value of a cell, if/then statements, average, and/or some combination thereof.

In the example report user interface, example user interaction data includes text data input and/or chart configuration data. For example, a user may specify textual and/or other input data to be presented within the report user interface. In another example, a user may further configure one or more charts in the report user interface. Additional details regarding user interaction data and report user interfaces are described in further detail with respect to FIG. 12.

In the example enrich node user interface, example user interaction data includes user input regarding join operations. Example user input includes the type of join operation, the data sets that are to be joined, column prefixes, and/or column selections. Additional details regarding user interaction data and report user interfaces are described in further detail with respect to FIG. 13.

In the example chart node user interface, example user interaction data includes user input regarding one or more charts. Example user input includes the type of chart, chart styles, one or more axes of the chart, and/or group by conditions. Additional details regarding user interaction data and chart node user interfaces are described in further detail with respect to FIG. 14.

At block 1638, the data analysis system 100 processes the user interaction data. In some embodiments, the data analysis system 100 generates new data nodes, as described herein, to store the received user interaction data. Additionally or alternatively, the data analysis system 100 further connects the new data nodes data analysis graph. Accordingly, the block 1638 may be similar to blocks 1604, 1606, 1608, and/or 1610 of the example method 1600. As illustrated, the data analysis system 100 may further present the new data nodes at block 1634.

In the data editing example, the data analysis system 100 applies the user interaction data, which includes the one or more selected function operations and/or the new data values, to the current data set to generate a new data set and/or node. In the reporting example, the data analysis system 100 stores the user interaction data, which includes text data input and/or chart configuration data, in a new node. Continuing with the reporting example, the data analysis system 100 presents an updated report user interface based on the data from the new node. In the example enrich node example, the data analysis system 100 applies the user interaction data, which includes user input regarding join operations, to the current data set and to the other data set to generate a new data set and/or node by executing the join operation. Continuing with the enrichment example, the data analysis system 100 presents an updated enrich node based on the data from the new data set and/or node. In the chart node example, the data analysis system 100 stores the user interaction data, which includes user input regarding one or more charts, in a new node. Continuing with the chart example, the data analysis system 100 generates and/or presents a new chart with the stored user interaction data from the new node.

As described herein, the example method 1630 may be applied in a variety of contexts such as the data editing example, the reporting example, the enrichment example, and/or the chart example.

In the data editing example, the data analysis system 100 retrieves a data analysis graph; causes presentation of one or more nodes; receives user input including new data values, expression language input, new column information, and/or function configuration data; generates a new node based on the user input; stores the new node; causes presentation of the new node; and/or some combination thereof. Continuing with the example, the data analysis system 100 generates a new node by updating the data in the data set according to the user input, such as by inserting new data values and/or overwriting existing data values, applying functions to the data set, applying expression language input to the data set, and/or modifying the column data in the data set.

In the reporting example, the data analysis system 100 retrieves a data analysis graph; causes presentation of one or more nodes; receives report configuration data for one or more nodes; accesses a data set from a node in the data analysis graph; accesses report configuration data associated with the node; generates a report in the user interface, where the report includes data from the data set, based at least in part on the report configuration data; and/or some combination thereof. Continuing with the example, the report configuration data indicates the type of report, chart configuration data, which data values from the data set to access, and/or instructions to generate the chart and/or report from the data values.

In the enrichment example, the data analysis system 100 retrieves a data analysis graph; causes presentation of one or more nodes in the data analysis graph; receives enrichment and/or join configuration data; joins a first data set and a second data set to determine a third data set; stores the third data set as a node in a data analysis graph; and/or some combination thereof.

In the chart example, the data analysis system 100 retrieves a data analysis graph; causes presentation of one or more nodes in the data analysis graph; receives chart configuration data for the node; accesses a data set from the node in the data analysis graph; accesses chart configuration data associated with the node; generates a chart in the user interface, where the chart includes data from the data set, based at least in part on the report configuration data; and/or some combination thereof. Continuing with the example, the chart configuration data indicates the type of chart, other chart configuration data, x and y-axes, what functions (such as group by) to apply, which data values from the data set to access, and/or instructions to generate the chart from the data values.

While some advantages of the systems and methods described herein are discussed in the context of immutability, some embodiments of the present disclosure may also be used and/or advantageous in the context of data objects with mutable properties. For example, in editing a data node, the property values of the data node may be changed instead of generating a new data node.

What is claimed is:

1. A computer-implemented method comprising:
    causing simultaneous presentation, in a user interface, of a plurality of user interface boards, wherein:
        each of the plurality of user interface boards is represented by a corresponding data node, of a plurality of data nodes, in a data analysis graph;
        the plurality of data nodes in the data analysis graph includes: a parent data node, a first data node that is a child of the parent data node, a second data node that is a child of the first data node, and a current data node that is a child of the second data node; and
        the current data node is associated with a most recent user interaction among the plurality of user interface boards;
    receiving, via the user interface, a request to update a first user interface board that corresponds to the first data node; and
    in response to receiving the request to update the first user interface board, automatically:
        accessing historical user interaction data associated with the data analysis graph;
        identifying, from historical user interaction data associated with the data analysis graph, the current data node of the data analysis graph;
        identifying, based on a dependency of the current data node, an active path of the data analysis graph that includes at least: the first data node, the second data node, and the current data node;
        identifying from the active path:
            an insertion point between the first data node and the parent data node; and
            one or more children data nodes of the first data node including at least the second data node and the current data node;

duplicating the one or more children data nodes to generate one or more duplicate children data nodes, wherein each data node of the one or more duplicate children data nodes is a distinct copy of a corresponding data node from the one or more children data nodes including the second data node and the current data node;

generating an updated first data node based on the request to update the first user interface board;

adding a new path to the data analysis graph comprising the updated first data node and the one or more duplicate children data nodes, wherein adding the new path to the data analysis graph comprises:

linking the updated first data node to the parent data node based on the identified insertion point;

linking the one or more duplicate children data nodes to the updated first data node; and updating the one or more duplicate children data nodes based on the updated first data node; and causing presentation, in the user interface, of:

a plurality of updated user interface boards corresponding to respective data nodes of the new path of the data analysis graph.

2. The computer-implemented method of claim 1, wherein the first data node further comprises at least one of: a summary node, a table node, a histogram node, a distribution node, a time series node, a grid node, a heatmap node, a pivot table node, a filter node, a column editor node, an enrich node, a link node, a set math node, or an export node.

3. The computer-implemented method of claim 1, further comprising:

identifying a non-transformation data node from the active path, wherein identifying the non-transformation data node further comprises:

determining a node type for a data node from the active path; and comparing the node type to a list of node types that do not perform transformations;

identifying, from the active path, a subset of data nodes that excludes the non-transformation data node;

identifying an abridged data analysis graph as the subset of data nodes; and causing presentation of the abridged data analysis graph in the user interface.

4. The computer-implemented method of claim 1, wherein the new path of the data analysis graph comprises at least two linked data nodes according to an order, and wherein causing presentation of the plurality of updated user interface boards includes causing presentation, in the user interface, of at least two user interface boards according to the order.

5. The computer-implemented method of claim 1, further comprising:

accessing a first data set from a data node in the new path of the data analysis graph;

accessing report configuration data associated with the data node; and generating, in the user interface, a report comprising data from the first data set based at least in part on the report configuration data.

6. The computer-implemented method of claim 1, wherein the first data node comprises a set math node, wherein the set math node is configured to at least: filter a first data set, append data from another data set, or remove data based at least on another data set.

7. A non-transitory computer storage medium storing computer-executable instructions that when executed by a computer hardware processor perform operations comprising:

causing simultaneous presentation, in a user interface, of a plurality of user interface boards, wherein:

each of the plurality of user interface boards is represented by a corresponding data node, of a plurality of data nodes, in a data analysis graph;

the plurality of data nodes in the data analysis graph includes: a parent data node, a first data node that is a child of the parent data node, a second data node that is a child of the first data node, and a current data node that is a child of the second data node; and the current data node is associated with a most recent user interaction among the plurality of user interface boards;

receiving, via the user interface, a request to update a first user interface board that corresponds to the first data node; and in response to receiving the request to update the first user interface board, automatically:

accessing historical user interaction data associated with the data analysis graph;

identifying, from historical user interaction data associated with the data analysis graph, the current data node of the data analysis graph;

identifying, based on a dependency of the current data node, an active path of the data analysis graph that includes at least: the first data node, the second data node, and the current data node;

identifying from the active path:

an insertion point between the first data node and the parent data node; and one or more children data nodes of the first data node including at least the second data node and the current data node;

duplicating the one or more children data nodes to generate one or more duplicate children data nodes, wherein each data node of the one or more duplicate children data nodes is a distinct copy of a corresponding data node from the one or more children data nodes including the second data node and the current data node;

generating an updated first data node based on the request to update the first user interface board;

adding a new path to the data analysis graph comprising the updated first data node and the one or more duplicate children data nodes, wherein adding the new path to the data analysis graph comprises:

linking the updated first data node to the parent data node based on the identified insertion point;

linking the one or more duplicate children data nodes to the updated first data node; and updating the one or more duplicate children data nodes based on the updated first data node; and causing presentation, in the user interface, of:

a plurality of updated user interface boards corresponding to respective data nodes of the new path of the data analysis graph.

8. The non-transitory computer storage medium of claim 7, wherein the first data node further comprises at least one of: a summary node, a table node, a histogram node, a distribution node, a time series node, a grid node, a heatmap node, a pivot table node, a filter node, a column editor node, an enrich node, a link node, a set math node, or an export node.

9. The non-transitory computer storage medium of claim 7, wherein the operations further comprise:
  identifying a non-transformation data node from the active path, wherein identifying the non-transformation data node further comprises:
    determining a node type for a data node from the active path; and
    comparing the node type to a list of node types that do not perform transformations;
  identifying, from the active path, a subset of data nodes that excludes the non-transformation data node;
  identifying an abridged data analysis graph as the subset of data nodes; and
  causing presentation of the abridged data analysis graph in the user interface.

10. The non-transitory computer storage medium of claim 7, wherein the new path of the data analysis graph comprises at least two linked data nodes according to an order, and wherein causing presentation of the plurality of updated user interface boards includes causing presentation, in the user interface, of at least two user interface boards according to the order.

11. The non-transitory computer storage medium of claim 7, wherein the operations further comprise:
  accessing a first data set from a data node in the new path of the data analysis graph;
  accessing report configuration data associated with the data node; and
  generating, in the user interface, a report comprising data from the first data set based at least in part on the report configuration data.

12. The non-transitory computer storage medium of claim 7, wherein the first data node comprises a set math node, wherein the set math node is configured to at least: filter a first data set, append data from another data set, or remove data based at least on another data set.

13. A computer system comprising:
  one or more computer processors configured to execute software code to cause the computer system to perform operations comprising:
    causing simultaneous presentation, in a user interface, of a plurality of user interface boards, wherein:
      each of the plurality of user interface boards is represented by a corresponding data node, of a plurality of data nodes, in a data analysis graph;
      the plurality of data nodes in the data analysis graph includes: a parent data node, a first data node that is a child of the parent data node, a second data node that is a child of the first data node, and a current data node that is a child of the second data node; and
      the current data node is associated with a most recent user interaction among the plurality of user interface boards;
    receiving, via the user interface, a request to update a first user interface board that corresponds to the first data node; and
    in response to receiving the request to update the first user interface board, automatically:
      accessing historical user interaction data associated with the data analysis graph;
      identifying, from historical user interaction data associated with the data analysis graph, the current data node of the data analysis graph;
      identifying, based on a dependency of the current data node, an active path of the data analysis graph that includes at least: the first data node, the second data node, and the current data node;
      identifying from the active path:
        an insertion point between the first data node and the parent data node; and
        one or more children data nodes of the first data node including at least the second data node and the current data node;
      duplicating the one or more children data nodes to generate one or more duplicate children data nodes, wherein each data node of the one or more duplicate children data nodes is a distinct copy of a corresponding data node from the one or more children data nodes including the second data node and the current data node;
      generating an updated first data node based on the request to update the first user interface board;
      adding a new path to the data analysis graph comprising the updated first data node and the one or more duplicate children data nodes, wherein adding the new path to the data analysis graph comprises:
        linking the updated first data node to the parent data node based on the identified insertion point;
        linking the one or more duplicate children data nodes to the updated first data node; and
        updating the one or more duplicate children data nodes based on the updated first data node; and
      causing presentation, in the user interface, of:
        a plurality of updated user interface boards corresponding to respective data nodes of the new path of the data analysis graph.

14. The computer system of claim 13, wherein the first data node further comprises at least one of: a summary node, a table node, a histogram node, a distribution node, a time series node, a grid node, a heatmap node, a pivot table node, a filter node, a column editor node, an enrich node, a link node, a set math node, or an export node.

15. The computer system of claim 13, wherein the operations further comprise:
  identifying a non-transformation data node from the active path, wherein identifying the non-transformation data node further comprises:
    determining a node type for a data node from the active path; and
    comparing the node type to a list of node types that do not perform transformations;
  identifying, from the active path, a subset of data nodes that excludes the non-transformation data node;
  identifying an abridged data analysis graph as the subset of data nodes; and
  causing presentation of the abridged data analysis graph in the user interface.

16. The computer system of claim 13, wherein the new path of the data analysis graph comprises at least two linked data nodes according to an order, and wherein causing presentation of the plurality of updated user interface boards includes causing presentation, in the user interface, of at least two user interface boards according to the order.

17. The computer system of claim 13, wherein the operations further comprise:
  accessing a first data set from a data node in the new path of the data analysis graph;
  accessing report configuration data associated with the data node; and
  generating, in the user interface, a report comprising data from the first data set based at least in part on the report configuration data.

18. The computer system of claim 13, wherein the first data node comprises a set math node, wherein the set math node is configured to at least: filter a first data set, append data from another data set, or remove data based at least on another data set.

* * * * *